United States Patent [19]
Uchiyama

[11] Patent Number: 5,737,285
[45] Date of Patent: Apr. 7, 1998

[54] DISK LOADING AND UNLOADING APPARATUS FOR A DISK PLAYER-CHANGER

[75] Inventor: Kouji Uchiyama, Kanagawa, Japan

[73] Assignee: Nakamichi Corporation, Tokyo, Japan

[21] Appl. No.: 631,641

[22] Filed: Apr. 10, 1996

[30] Foreign Application Priority Data

Apr. 13, 1995 [JP] Japan .................................. 7-112324

[51] Int. Cl.⁶ ...................................................... G11B 17/22
[52] U.S. Cl. ................................ 369/34; 369/36; 369/191
[58] Field of Search .............................. 369/34, 191, 178, 369/187, 33, 36, 38, 35, 37, 75.2, 77.2

[56] References Cited

U.S. PATENT DOCUMENTS

| | | | |
|---|---|---|---|
| 4,682,320 | 7/1987 | Costemore | 369/77.1 |
| 5,123,001 | 6/1992 | Nakamichi et al. | 369/36 |
| 5,177,722 | 1/1993 | Nakamichi et al. | 369/36 |
| 5,241,529 | 8/1993 | Hara et al. | 369/75.2 |
| 5,438,534 | 8/1995 | Sakiyama | 369/34 |
| 5,504,733 | 4/1996 | Nakamichi e al. | 369/191 |
| 5,594,710 | 1/1997 | Nakamichi et al. | 369/36 |

FOREIGN PATENT DOCUMENTS

| | | |
|---|---|---|
| 0558302 | 9/1993 | European Pat. Off. . |
| 0708441 | 4/1996 | European Pat. Off. . |
| 2538597 | 6/1984 | France . |
| 4134241 | 4/1993 | Germany . |
| 2227866 | 9/1990 | Japan . |
| 4013265 | 1/1992 | Japan . |
| 4038659 | 2/1992 | Japan . |
| 4038660 | 2/1992 | Japan . |
| 4038665 | 2/1992 | Japan . |
| 4038666 | 2/1992 | Japan . |
| 6131795 | 5/1994 | Japan . |

*Primary Examiner*—Tan Dinh
*Attorney, Agent, or Firm*—Morrison Law Firm

[57] ABSTRACT

Briefly, a compact disk player/changer for compact disks has an insertion aperture through which disks are inserted. Inserted disks are supported, at opposite contact points on their edges, between laterally movable left and right-side disk guides. The disk's left side contacts a belt revolved on the left-side disk guide. The disk's right side contacts a fixed wall on the right-side disk guide. The belt slides along a rigid wall that prevents bowing from pressure exerted by the disk's edge. The left and right-side disk guides move laterally to accommodate the disk as it is inserted. The spacing between the disk guides, once the disk is fully supported between the disk guides, is detected by a controller to determine when a disk has been inserted. Eject/Load keys are provided, one for each of several storage positions within the changer. When an eject/load key is pressed, a corresponding disk is recovered from a storage position and brought to an eject position at the insertion aperture. The insertion aperture has a spring loaded gate that senses the presence of a disk at the aperture. The controller is programmed to prevent any further disks from being moved from a storage position to the eject position, in response to the pressing of another eject/load key, as long as a disk is sensed at the insertion aperture.

14 Claims, 71 Drawing Sheets

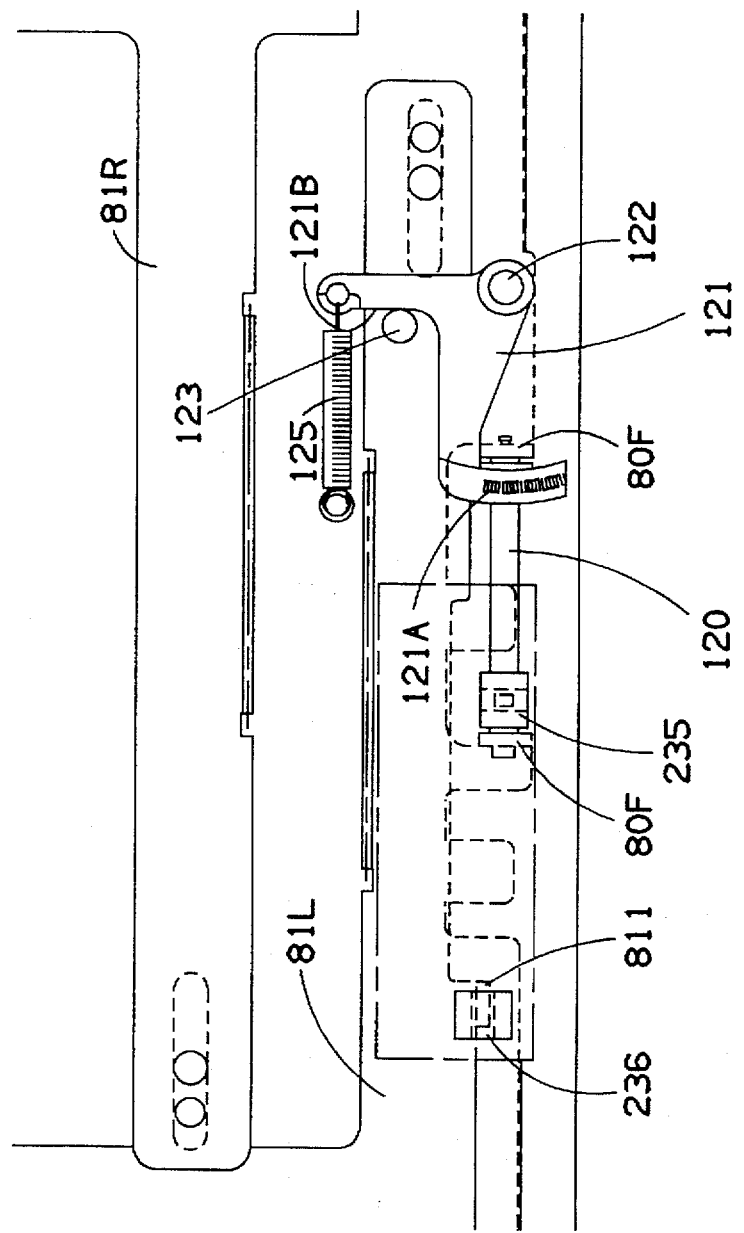

DISK LOADING AND UNLOADING APPARATUS FOR A DISK PLAYER-CHANGER

BACKGROUND OF THE INVENTION

The present invention relates to disk changers with disk storage and playback capabilities.

Japanese Examined Patent Publication No. 7-7560 (U.S. Pat. No. 5,123,001), shows a stocker-type disk playback device. This device employs a tray extended from a housing to support inserted and ejected disks. The changers described have storage for multiple disks and provides for selective playback and exchange of stored disks. The tray provides a secure means of assuring disks inserted into the disk changer do not collide since the tray only accommodates one disk at a time.

The use of a tray in this device, however, makes the configuration complex. In addition, the tray required the changer to be mounted horizontally to prevent disks from falling out of the tray. Disk transfer mechanisms that overcome these drawbacks include Japanese laid-open publication no. 2-7263 and Japanese utility model laid-open publication no. 60-106250. In those devices, a disk transferring mechanism transfers a disk inserted from a disk insertion opening using a belt that supports the disk edge. However, this disk transfer mechanism could allow a disk at the eject position to fall out of the device if the disk at the eject position is not removed before another disk is transferred to the eject position. This could result in damage to the disk or the disk changer.

OBJECT AND SUMMARY OF THE INVENTION

It is an object of the present invention is to overcome the drawbacks of the prior art.

It is another object of the present invention to provide a disk changer device that transfers a disk inserted through a disk insertion opening to a playback position within a device.

It is yet another object of the present invention to provide a disk transfer device in which the disk is ejected to a position in which its spindle hole is accessible to a user for grasping and in which the disk is securely held in position.

It is yet another object of the present invention to provide a disk changer that uses an edge drive to transfer the disk and that prevents conflicts between ejected or inserted disks and disks transferred from inside the disk changer.

Briefly, a compact disk player/changer for compact disks has an insertion aperture through which disks are inserted. Inserted disks are supported, at opposite contact points on their edges, between laterally movable left and right-side disk guides. The disk's left side contacts a belt revolved on the left-side disk guide. The disk's right side contacts a fixed wall on the right-side disk guide. The belt slides along a rigid wall that prevents bowing from pressure exerted by the disk's edge. The left and right-side disk guides move laterally to accommodate the disk as it is inserted. The spacing between the disk guides, once the disk is fully supported between the disk guides, is detected by a controller to determine when a disk has been inserted. Eject/Load keys are provided, one for each of several storage positions within the changer. When an eject/load key is pressed, a corresponding disk is recovered from a storage position and brought to an eject position at the insertion aperture. The insertion aperture has a spring loaded gate that senses the presence of a disk at the aperture. The controller is programmed to prevent any further disks from being moved from a storage position to the eject position, in response to the pressing of another eject/load key, as long as a disk is sensed at the insertion aperture.

According to an embodiment of the present invention, there is provided, a disk changer, comprising: a chassis, a disk playback device attached to the chassis, a disk storage magazine, attached to the chassis, with multiple storage positions, an insertion aperture of the chassis, a disk transporter to transport a first disk from the multiple storage positions to the insertion aperture, a disk sensor, attached to the chassis in such a position that the first disk, brought to the insertion aperture by the disk transporter and remaining at the insertion aperture, can be sensed by the disk sensor, a controller connected to the disk transporter and programmed to prevent a second disk from being transferred by the disk transporter from one of the multiple storage positions and the disk playback device to the insertion aperture when the first disk is sensed by the disk sensor.

According to another embodiment of the present invention, there is provided, a disk transfer device, comprising: a chassis, two edge supports on the chassis, each with a surface, a first disk supported between the surfaces, the surfaces engaging opposite points on an edge of first the disk, the edge supports having means for moving the first disk between a first position and an eject position in which the disk is supported between ends of the surfaces, the means for moving being effective to move the disk in a first direction along the edge supports, while the disk is supported between the surfaces, until the first disk is at the eject position, the means for moving being effective to continue to support the first disk at the eject position, a motor, drivingly connected to at least one of the surfaces, a disk sensor attached to the chassis and positioned to sense the first disk at the eject position and a controller, connected between the disk sensor and the means for moving, the controller being programmed to control the motor to cause the motor to transport a second disk from the first position to the eject position only after the first disk has been removed from the eject position.

According to still another embodiment of the present invention, there is provided, a disk changer, comprising: a chassis having an internal position and an eject position, a first disk at the eject position and a second disk at the internal position, a disk transporter with a controller, a disk sensor, connected to the controller, positioned on the chassis to allow the first disk's presence at the eject position to be sensed by the disk sensor and a user-actuatable eject actuator connected to the controller, the controller being programmed to cause the disk transporter to transport the second disk from the internal position to the eject position when the eject actuator is actuated by a user and the controller being further programmed to prevent the second disk from being transported by the disk transporter from the internal position to the eject position when the eject actuator is actuated by the user and a presence of the first disk at the eject position is sensed by the disk sensor.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 55 is a top-view of the disk insertion error preventing mechanism while the loading plates are opening.

DETAILED DESCRIPTION OF THE PREFERRED EMBODIMENTS

In a preferred embodiment of the invention, four CD-ROMs are stored within a main chassis which also houses a CD-ROM changer for selective playback of the stored disks. The entire device conforms to standard dimensions for computer peripherals with a 5-¼ inch half-height form factor.

Figure 1:
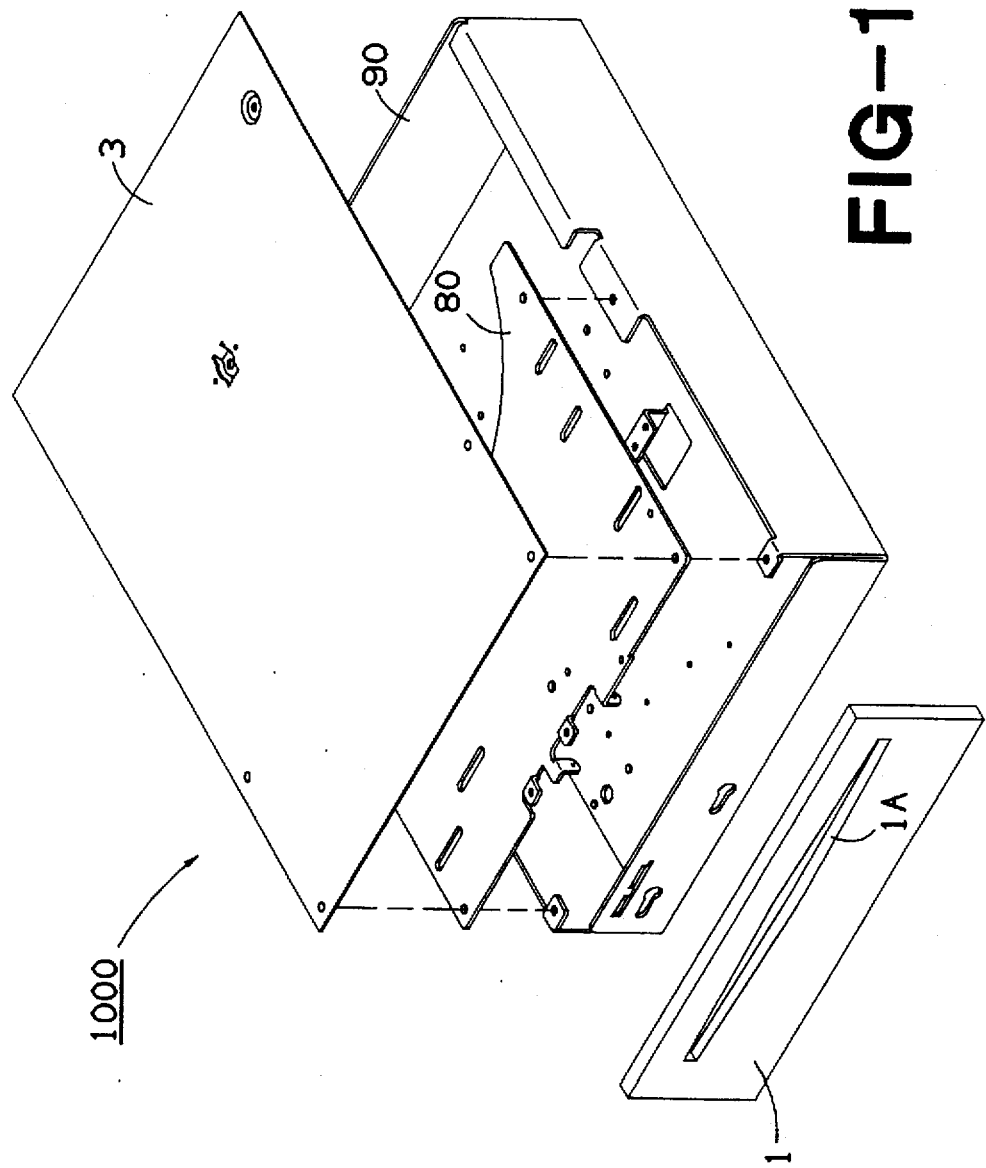
FIG. 1 is an exploded view of a chassis of a disk playback device according to an embodiment of the present invention.

Referring to FIG. 1, a housing 1000 of a disk player conforms to standard dimensions for computer peripherals having a 5-¼ inch half-height form factor. Housing 1000 has outer dimensions, 41.5 mm height×146 mm width×209 mm depth. The disk player includes a disk changer that stores four Cds for selective playback. Housing 1000 is generally box-shaped with four sides, a lower panel, and a top cover 3. A loading chassis 80 is attached to integral mounting brackets of two sides of main chassis 90 between top cover 3 and the lower panel of main chassis 90. Top cover 3 may be omitted when the disk player is mounted on a front panel of a computer (not shown in the drawings).

A front panel 1 is attached to a front one of the four sides of main chassis 90. Front panel 1 has an insertion aperture 1A for receiving and ejecting disks. Insertion aperture 1A is wider toward its center than at its ends. The shape of insertion aperture 1A insures that only the edges of disks contact front panel 1 when disks are inserted and removed. Therefore, recording surfaces of disks are prevented from contacting front panel 1, eliminating a potential cause of damage to disks during insertion and removal.

Figure 2:
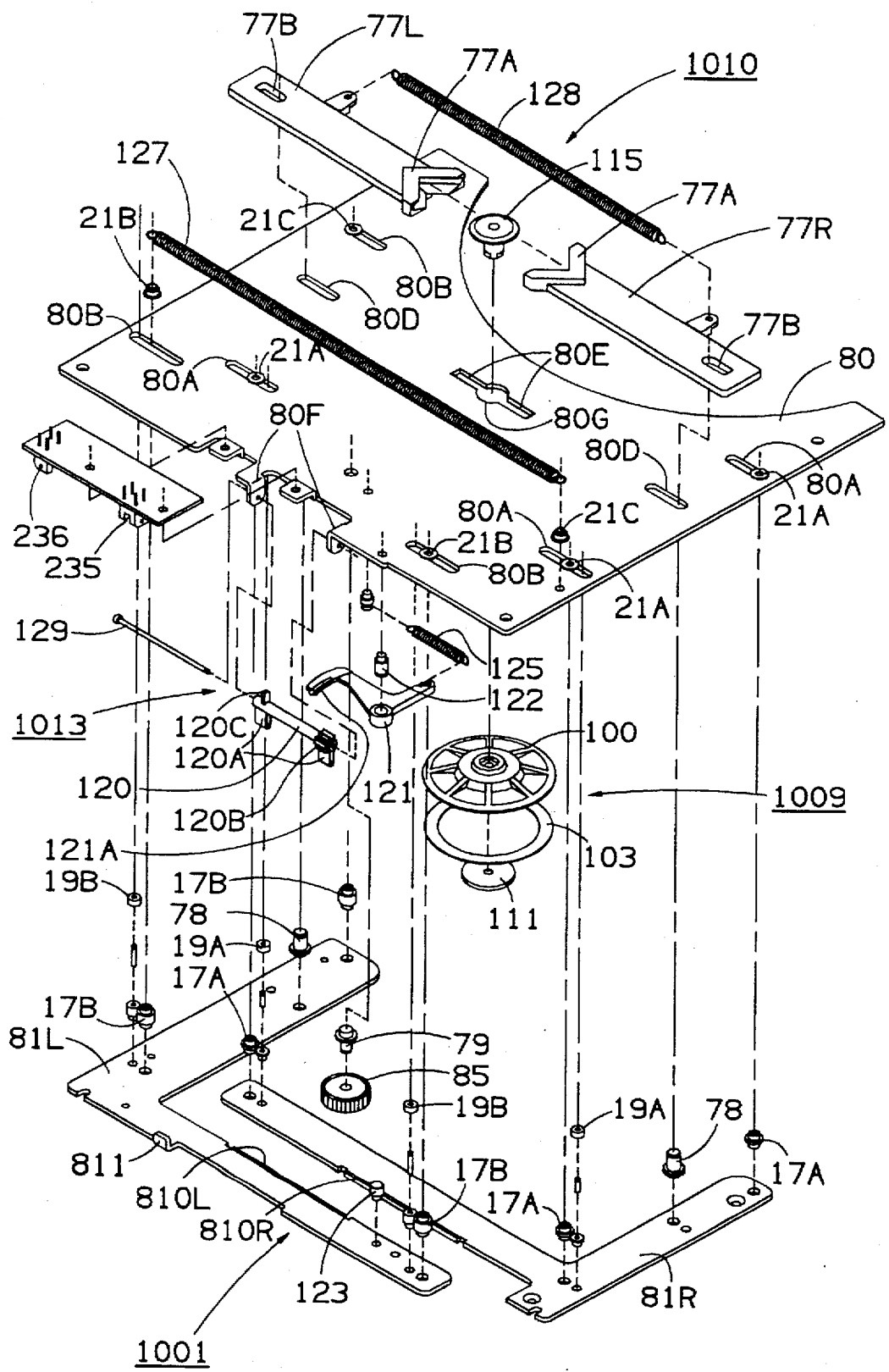
FIG. 2 is an exploded view of mechanisms attached to a loading chassis according to an embodiment of the present invention.
Figure 3:
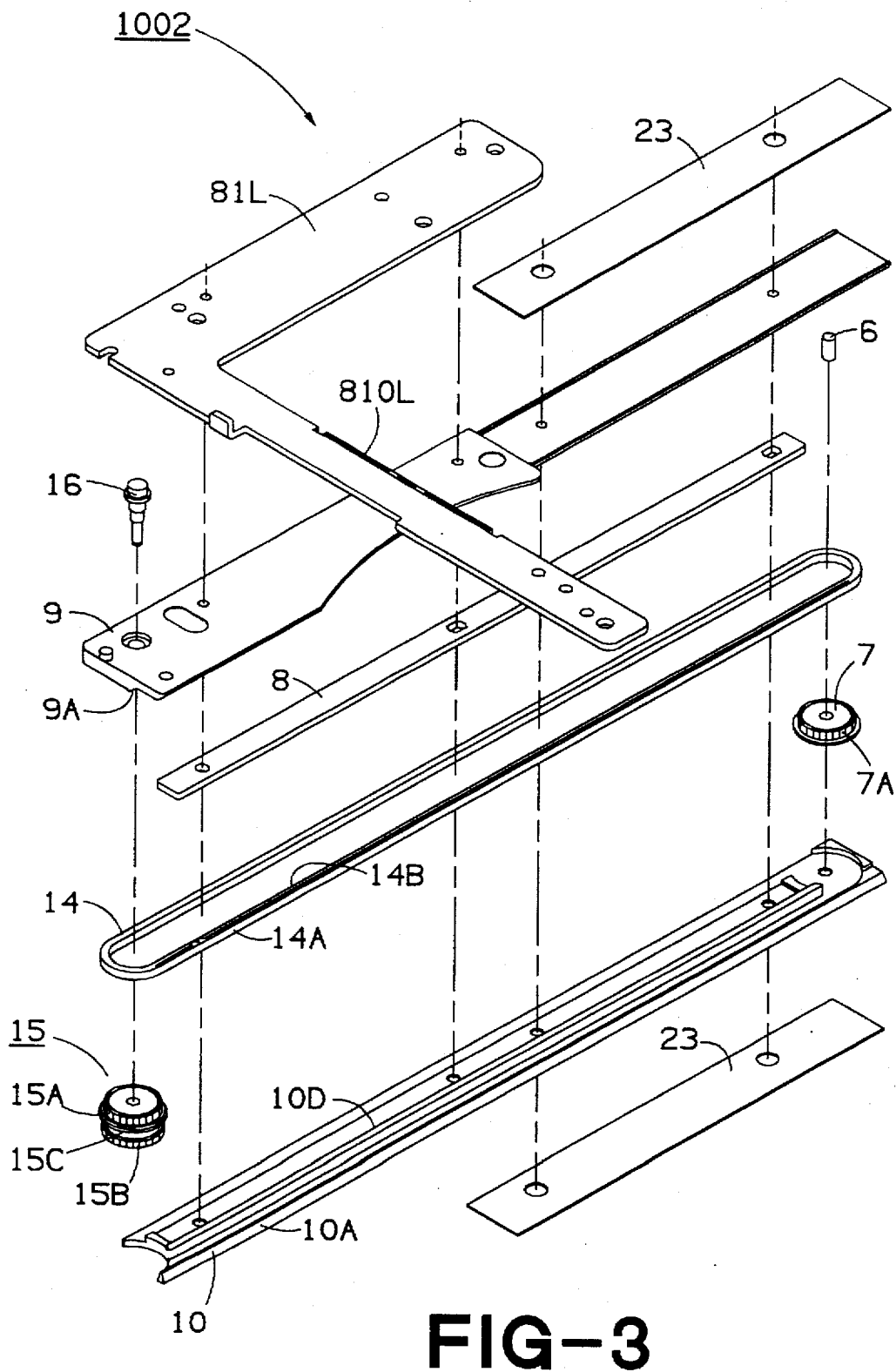
FIG. 3 is an exploded view of a drive-side disk guide according to an embodiment of the present invention.
Figure 4:
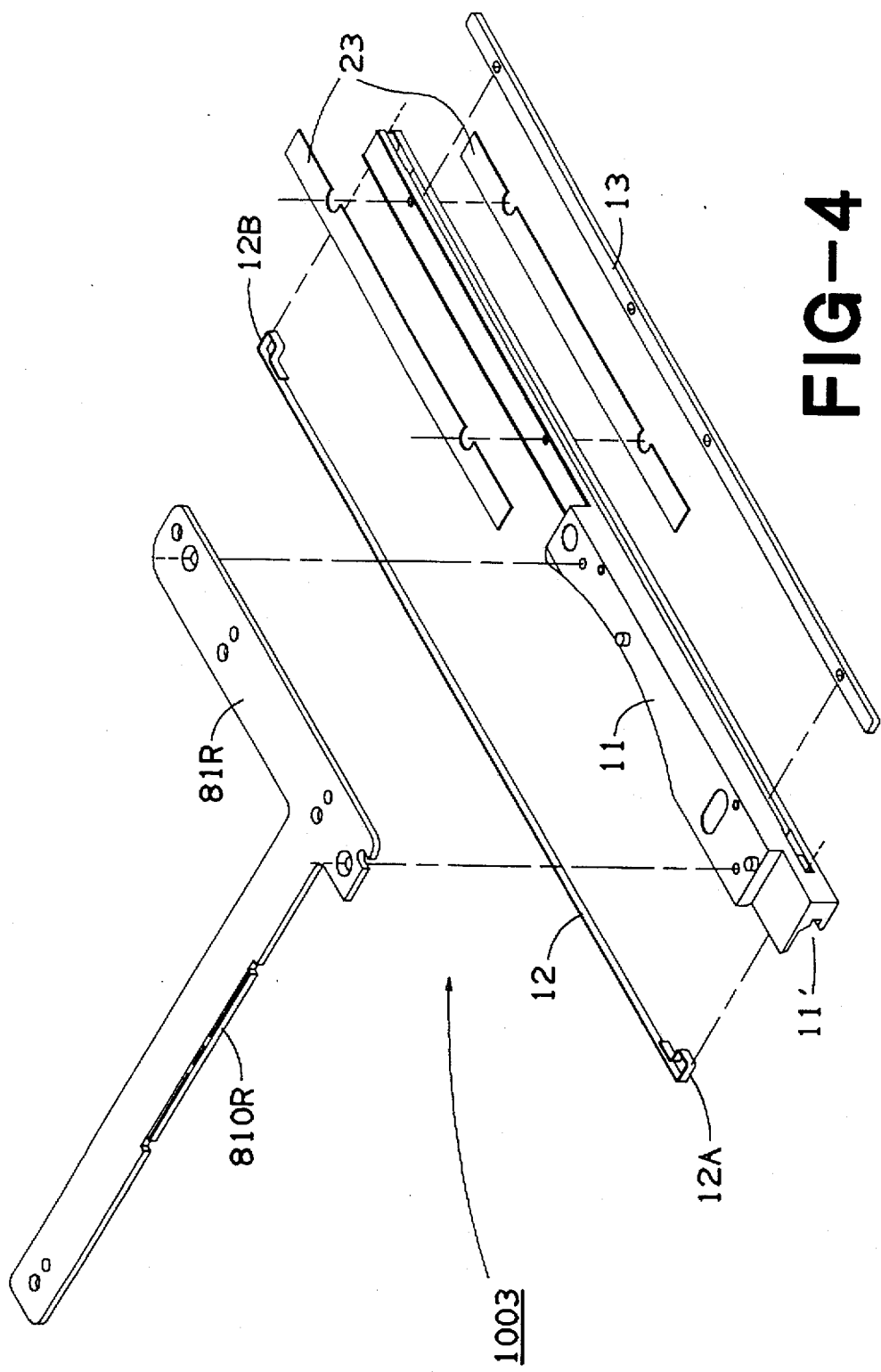
FIG. 4 is an exploded view of a fixed disk guide according to an embodiment of the present invention.

Referring to FIGS. 2–4, a disk transfer mechanism 1001 includes a drive-side disk guide 1002, slidably mounted on a lower side of loading chassis 80 on a left side of housing 1000. A fixed-side disk guide 1003 is slidably mounted on the lower side of loading chassis 80 toward a right side of housing 1000. L-shaped loading plates 81L and 81R hang on support pins 17A and 17B attached to their upper surfaces, respectively. Support pins 17A and 17B pass through respective transverse guide grooves 80A and 80B in loading chassis 80. Rings 21A and 21B, at ends of support pins 17A and 17B, respectively, prevent support pins 17A and 17B from slipping out of guide grooves 80A and 80B. Fixed and drive-side disk guides 1003 and 1002 attach to L-shaped loading plates 81R and 81L, respectively, thereby permitting fixed and drive-side disk guides 1003 and 1002, move transversely on the bottom of loading chassis 80.

Guide rollers 19A and 19B, rotatably mounted on upper surfaces of loading plates 81L and 81R, travel in guide grooves 80A, 80B in loading chassis 80. Guide rollers 19A, 19B fit closely within guide grooves 80A, 80B. Thus, guide rollers 19A and 19B insure accurate alignment of loading plates 81L and 81R throughout their respective ranges of movement. Support pins 17A are shorter than support pins 17B so that loading plate 81R is guided at a position closer to loading chassis 80 than loading plate 81L, permitting loading plates 81L and 81R to overlap.

Respective opposing sides of loading plates 81L and 81R have integral racks 810L and 810R. A pinion gear 85, which rotates on the bottom surface of loading chassis 80, engages with racks 810L and 810R. When loading plate 81L moves laterally, pinion gear 85 rotates in a direction that forces loading plate 81R to move an equal distance in the opposite direction of loading plate 81L. A spring 127 strung between a ring 21B on an upper portion of support pin 17B of loading plate 81L and pin 21C on an upper surface of loading chassis 80, urges loading plates 81L and 81R toward each other.

Figure 65:
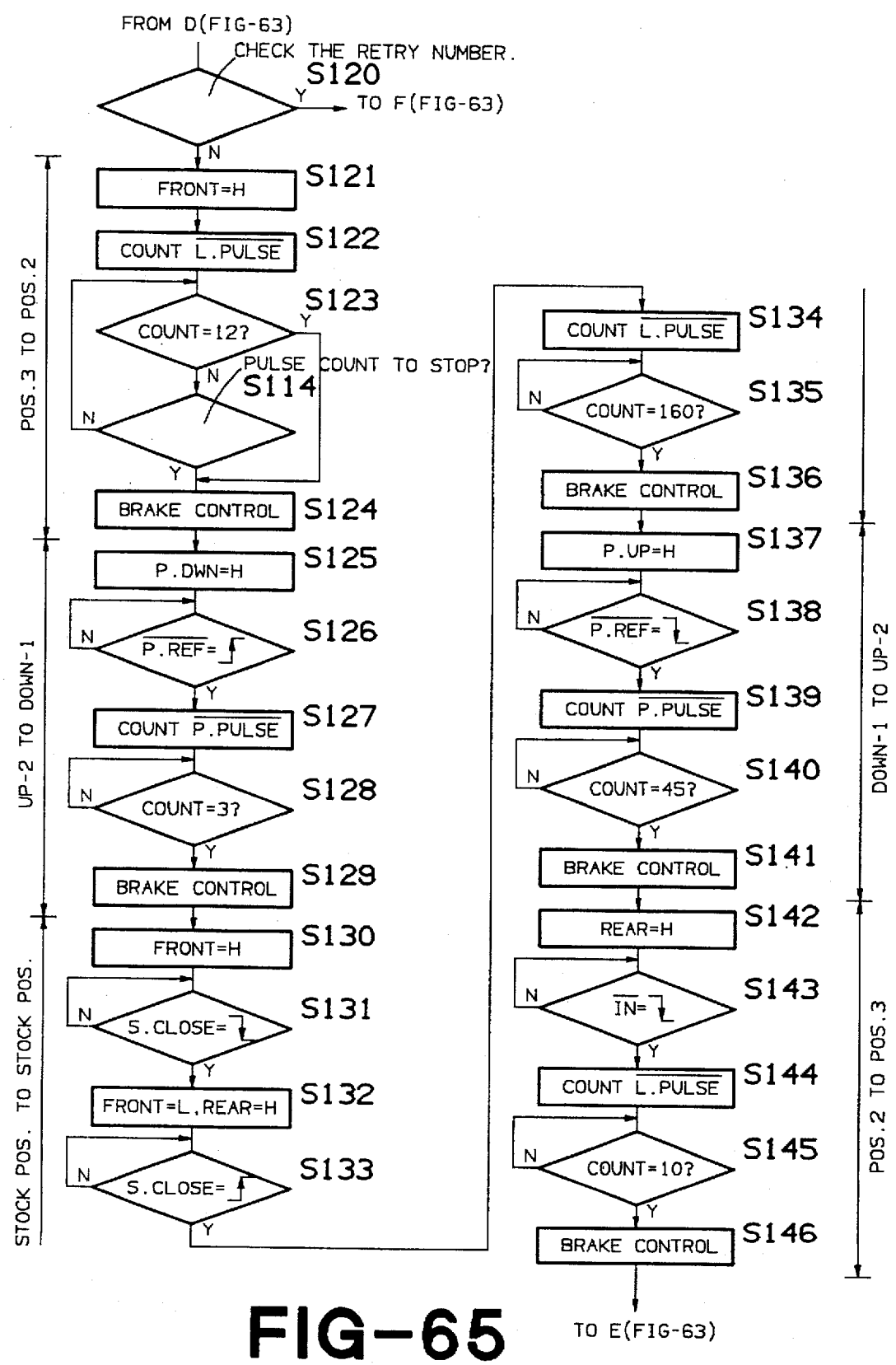
FIG. 65 is a flowchart of JOB EJECT.

A bent portion of loading plate 81L forms an integral shutter piece 811 in loading plate 81L toward the front of housing 1000. Shutter piece 811 interrupts a light beam generated, and detected, by an optical sensor 236 on the front end of loading chassis 80. Disks are supported between fixed and drive-side disk guides 1003 and 1002. Thus, the mutual spacing of fixed and drive-side disk guides 1003 and 1002 indicates whether there is a disk supported between them. Optical sensor 236 is positioned so that the light beam is broken when a disk is supported between timing and friction belts 14 and 12. Referring also to FIG. 65, a signal $\overline{IN}$, which is output by optical sensor 236, goes high (H) when a 120 mm disk is inserted separating between timing and friction belts 14 and 12 causing them to separate a distance in the range 114 mm–122 mm. Thus, signal $\overline{IN}$ indicates the presence of a disk.

Figure 5:
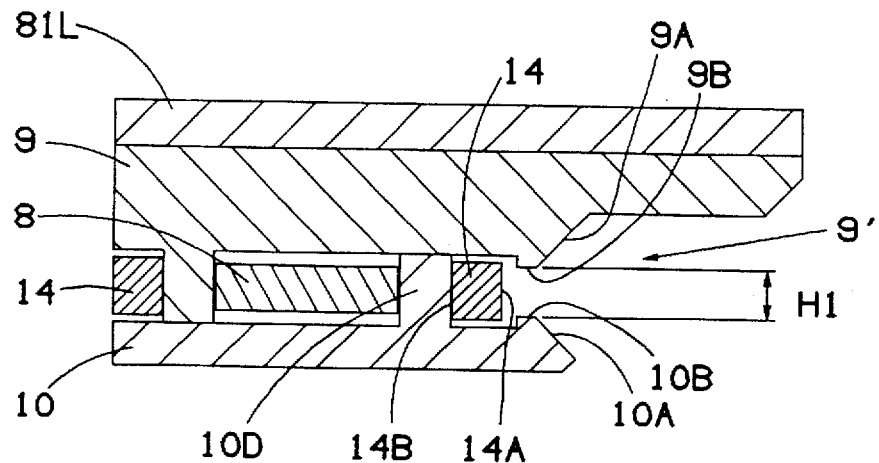
FIG. 5 is a schematic side-view of a drive-side disk guide according to an embodiment of the present invention.

Referring to FIGS. 3 and 5, drive-side disk guide 1002 includes an upper disk guide 9 of a resin having a low friction coefficient such as Duracon. A lower surface of upper disk guide 9 forms an upper half of a guide groove 9', which guides the edge of the inserted disk on the left side of housing 1000. A sloped surface 9A, with a slope of 45 degrees, runs longitudinally on a lower surface of upper disk guide 9. A projection 9B, on a bottom end of sloped surface 9A, engages the upper surface of the disk edge. A sloped surface 10A, running longitudinally on a lower disk guide 10, slopes at a 45-degree angle in a direction opposite that of sloped surface 9A. A projection 10B on an upper end of sloped surface 10A engages a lower surface of the disk edge. A gap of 1.3 mm width (H1), between projection 9B and projection 10B, is slightly wider than the thickness of a disk (1.2 mm) so that the disk edge is guided precisely.

Referring to FIG. 3, a timing pulley 15 rotates on a shaft 16 on a forward end of upper disk guide 9. Shaft 16 projects through the lower surface of upper disk guide 9. Another shaft 6 projects upwardly from the upper surface of lower disk guide 10 at its rear end. Another timing pulley 7 rotates on shaft 6. A timing belt 14 is stretched between timing pulleys 15 and 7 to form a loop with a long axis of the loop being parallel to a direction of transport of disk D. An inside surface of timing belt 14 has teeth or serrations. Outside surfaces of timing pulleys 15 and 7, adjacent corresponding portions of the inside surface of timing belt 14, also have teeth or serrations to engage the teeth or serrations of timing belt 14, thereby preventing slippage of timing belt 14 with respect to timing pulleys 15 and 7.

Friction belt 12, which engages with the right-side edge of the disk perimeter, is fixed to loading plate 81R so that the force of disk D tends to force flexible timing belt 14 to one side. This would tend to cause disk D to follow a non-straight course toward the rear of the device. Since disk transfer distance is determined based on the displacement of timing pulley 15, flexure in belt 12 can lead to errors.

Figure 72:
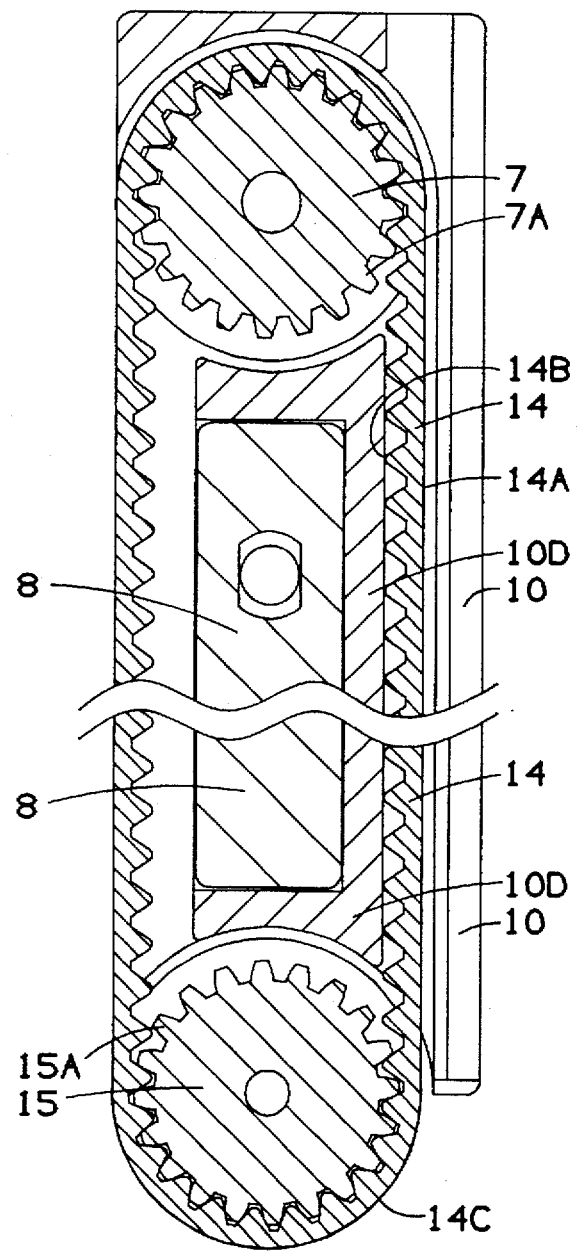
FIG. 72 is a side-view of the drive-side disk guide.

Referring momentarily to FIG. 72, lower disk guide 10 has a regulating wall 10D that slides against tooth surface 14B of timing belt 14. This prevents timing belt 14 from flexing inward when disk D is supported by it. A metal plate 8 is disposed between disk guide 9 and disk guide 10 in to reinforce disk guides 9 and 10, which are formed from resin. Disk protection sheets 23 are attached to the top and bottom surfaces of the rear side of disk guides 9, 10 in order to prevent damage to disks within a stocker 1011 which are close to disk guides 9, 10.

Figure 7:
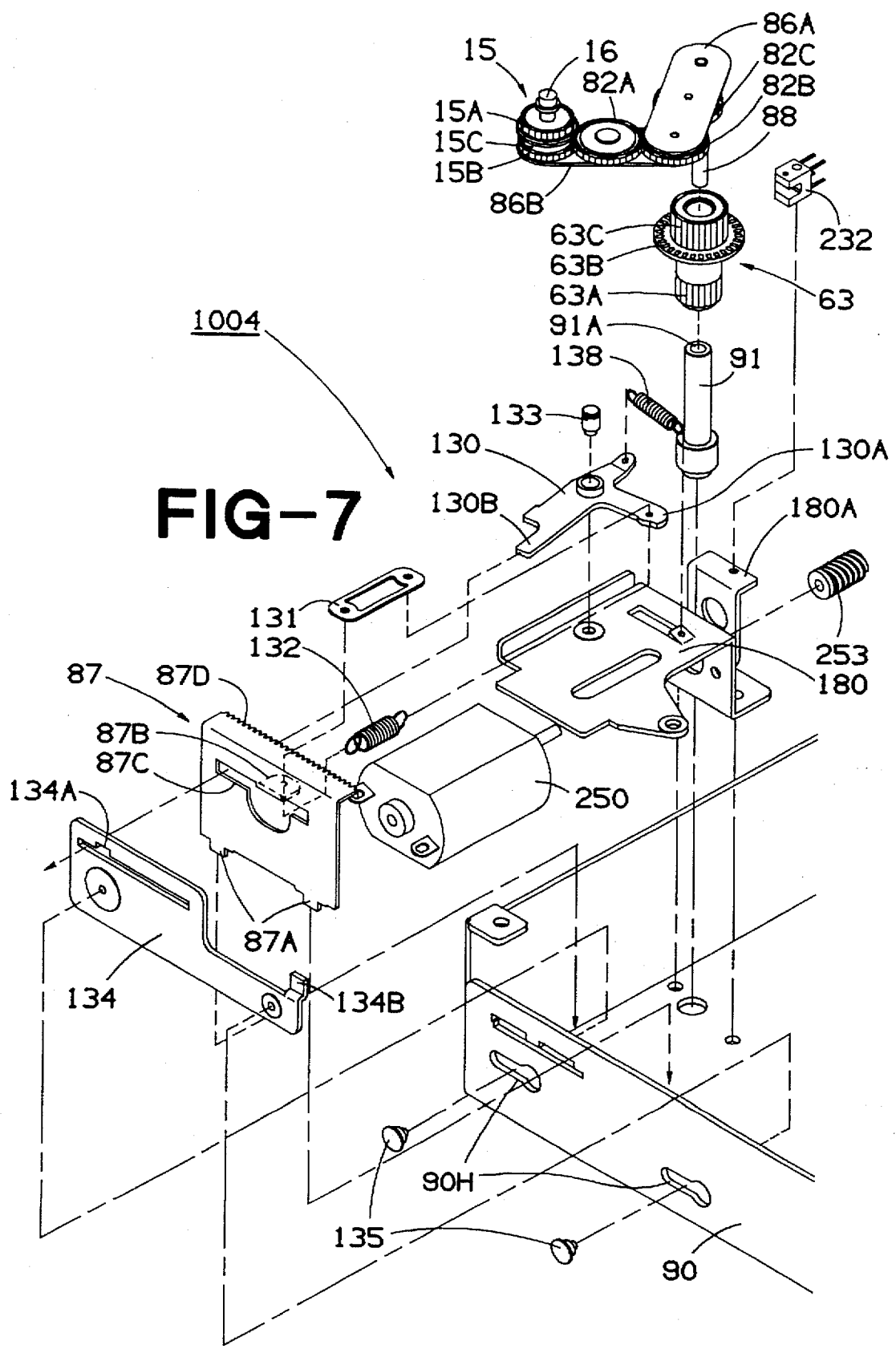
FIG. 7 is an exploded view of the configuration of an open/close mechanism for loading plates according to an embodiment of the present invention.

Referring now to FIG. 7, a loading plate open/close mechanism 1004, includes a motor 250 fixedly attached to main chassis 90 on a bracket 180. A worm gear 253 is press-fitted to a rotating shaft of drive motor 250. A gear member 63 rotates on shaft 91 attached to main chassis 90. Gear 63A on a lower portion of gear member 63, engages worm gear 253. Plate 86A is fixed to a shaft 88 which fits in a center hole 91A of shaft 91, allowing plate 86A to swing freely. A gear 82B rotates on a shaft hingeably interconnecting plates 86A and 86B. Timing pulley 15 rotates on shaft 16 protruding from a distal end of plate 86B. An intermediate gear 82C, rotating at a middle of plate 86A, meshes with both gear 63C, on an upper portion of gear member 63, and gear 82B, thereby transmitting rotation of the shaft of motor 250 to gear 82B. Rotation of gear 82B is further transmitted to timing pulley 15 by a gear 82A that rotates on a middle of plate 86B. Gear 82A meshes with gear 82B and a gear 15B on a lower portion of timing pulley 15.

Referring momentarily to FIGS. 19–23, plates 86A, 86B pivot responsively the position of timing pulley 15 as timing pulley 15 moves transversely with drive-side disk guide 1002. Thus, the rotation of motor 250 is transmitted to timing pulley 15 by an extensible transmission without moving motor 250. With such an extensible transmission, there is no need for space for movement of a bulky motor. In addition, by having an extensible transmission instead of a movable motor and transmission, the mass and weight of the drive mechanism travelling with loading plate 81L is minimized, making it possible to use a weaker spring 127 to urge loading plates 81L and 81R medially together. Disk insertion is thereby made easier and more responsive. In addition, the pressure load on timing belt 14 and friction belt 12 is reduced.

Optical sensor 232 is attached to a bend in a bracket 180A attached to bracket 180. A shutter wheel 63B on the upper portion of gear member 63 periodically interrupts a light beam detected by optical sensor 232 as gear member 63 rotates. Optical sensor 232 generates a loading pulse signal, signal L.PULSE. Because bowing of the timing belt 14 is prevented as discussed above, rotation of shutter wheel 63B is correlated in a predetermined way with movement of disk D. Therefore, signal L.PULSE can serve as an indication of disk movement. During disk transfer, one pulse in signal L.PULSE indicates a movement of 0.5 mm of the disk in the present embodiment. The same signal L.PULSE also indicates the distance moved by loading plate 81L during an operation that is described below. In this operation, one pulse indicates that loading plate 81L has moved 0.314 mm.

Figure 6:
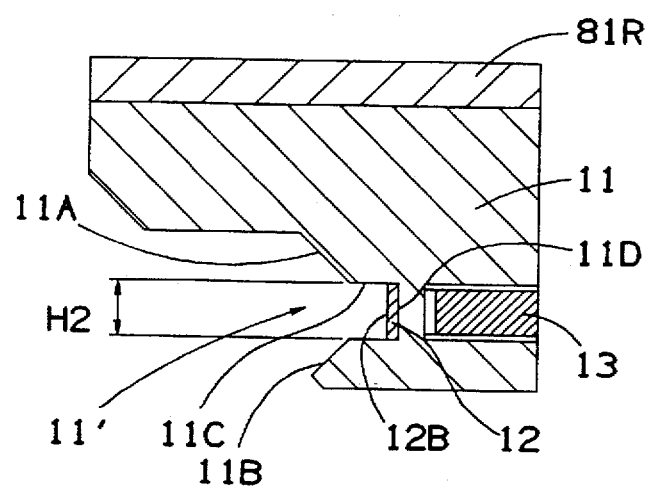
FIG. 6 is a schematic side-view of a drive-side disk guide according to an embodiment of the present invention.

Referring, now to FIGS. 4 and 6, a fixed-side disk guide 1003 supports friction belt 12. As in drive-side disk guide 1002, fixed-side disk guide 1003 has a disk guide 11 of a resin material having a low friction coefficient. A guide groove 11' is formed longitudinally on disk guide 11 to guide the disk edge opposite drive-side disk guide 1002. Guide groove 11' includes sloping surfaces 11A, 11B, and a square U-shaped groove 11C that form a channel shape with a tapered entry.

Figure 8:
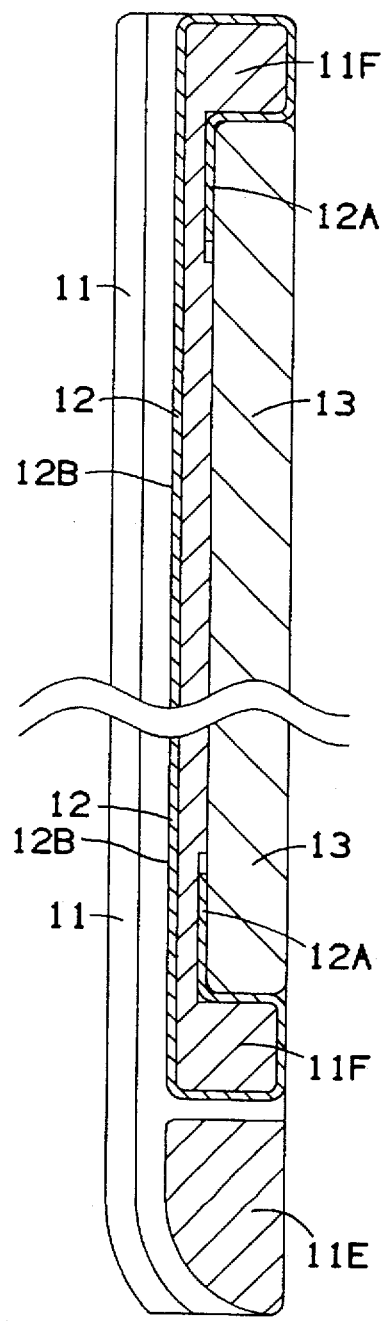
FIG. 8 is a schematic side-view of the fixed-side disk guide of FIG. 4.

Referring now also to FIG. 8, a tapered disk guide 11E is mounted toward a front end of fixed-side disk guide 1003. A gap H2 of groove 11C is 1.5 mm wide, slightly wider than the width of guide groove 9' (H1). This gap width allows the disk edge to be guided precisely without binding. Friction belt 12 is fixed to a flat wall 11D of a belt fixing piece 11F at the blind end of groove 11C. Friction belt 12 runs the length of fixed-side disk guide 1003 except for the front portion over which disk guide 11E extends. Friction belt 12 has a high friction coefficient to prevent the rim of the disk from slipping. Ends 12A of friction belt 12 are wrapped around belt fixing piece 11F and held in place by a reinforcement plate 13. Reinforcement plate 13 also supports flat wall 11D to prevent it from bowing due to the force applied by the disk running along friction belt 12.

Figure 13:
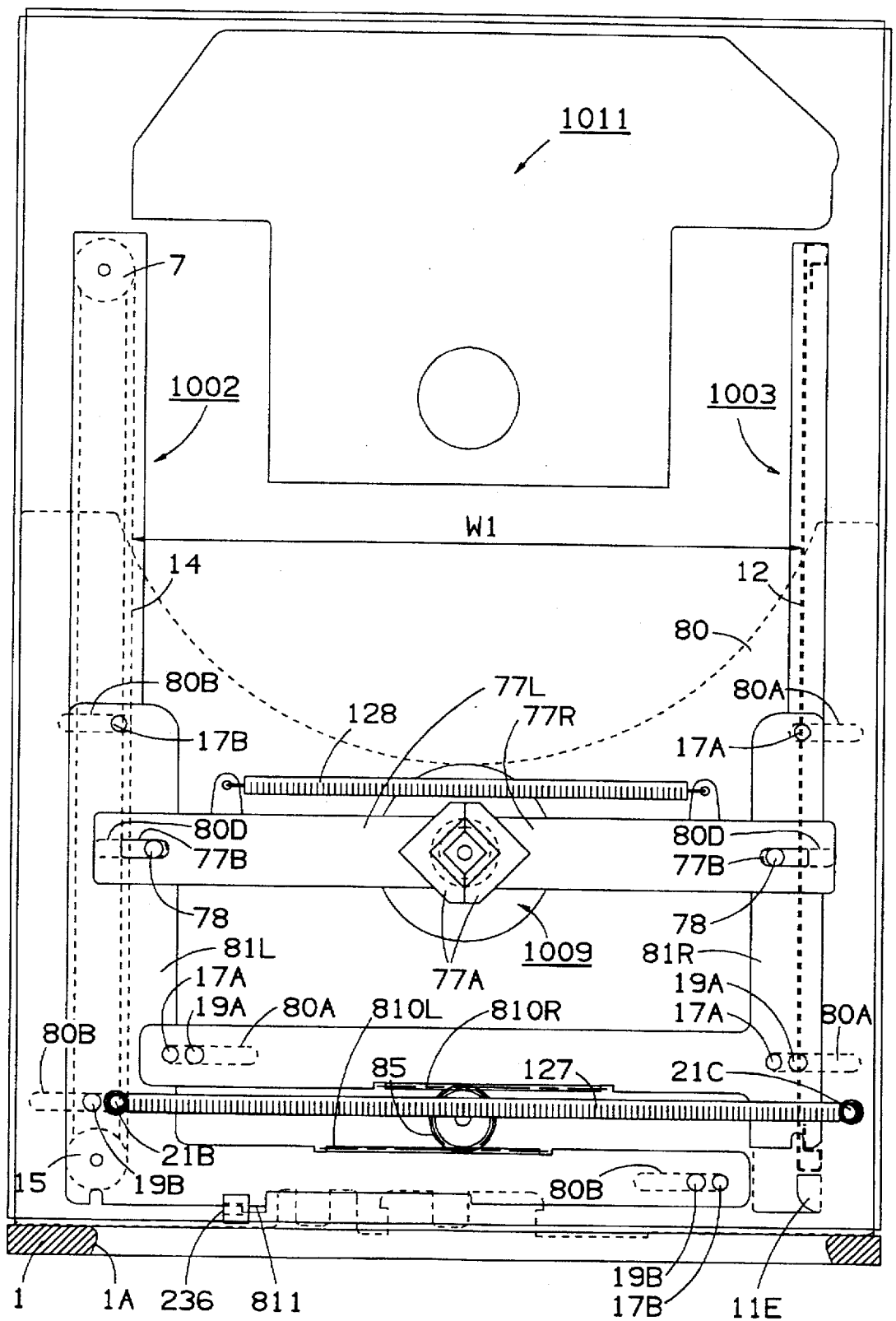
FIG. 13 is a top-view of disk transfer mechanism after a disk has been inserted according to an embodiment of the present invention.
Figure 18:
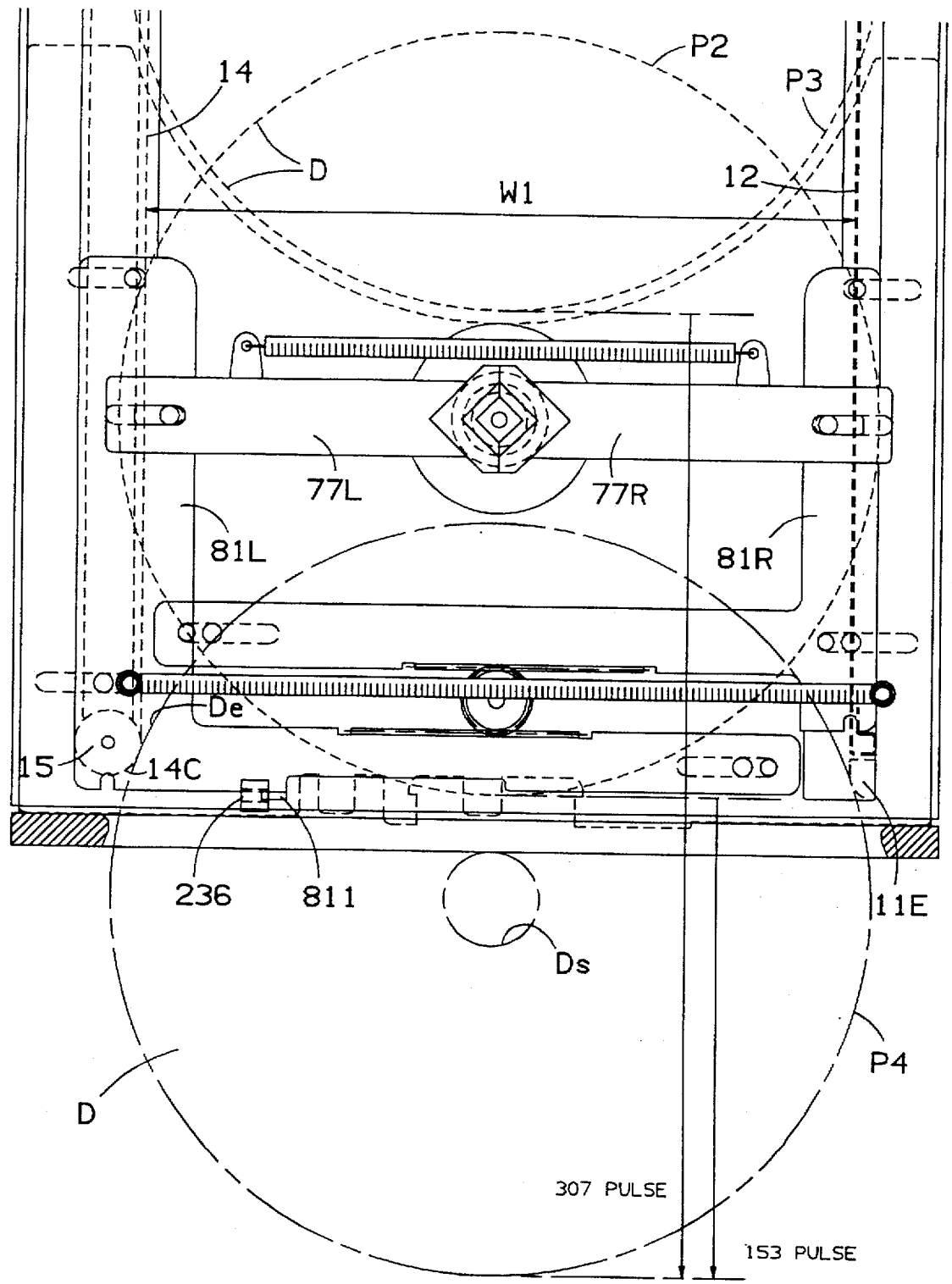
FIG. 18 is a top-view of the disk transfer mechanism in disk eject position E4.

Referring now to FIG. 13, when no disk is supported between drive-side and fixed-side disk guide 1002 and 1003, the force of spring 127 pulls support pins 17A and 17B together until they rest against the ends of guide grooves 80A and 80B, respectively. This places disk transfer mechanism 1001 in a disk receiving position (POS. 1). In the disk receiving position, loading plates 81L and 81R, attached to support pins 17A and 17B, respectively, are located at specified positions. The specified positions are such that the distance W1 between timing belt 14 and friction belt 12, which are supported by loading plates 81L and 81R, is 112 mm, which is narrower than a disk with a diameter of 120 mm. In disk transfer mechanism 1001, the position to which the disk can be transferred in the eject direction is determined by this minimum distance. The narrower the minimum distance, the further out the disk can be ejected from the disk insertion opening. However, if the minimum distance is made too narrow than necessary, disk insertion requires excessive force to be applied so that disk insertion is difficult or at least imparts an unnatural feel to the user. Referring to FIG. 18, this embodiment sets minimum distance W1 to 112 mm, which is precisely what is required to cause disk D to move far enough out that spindle hole Ds of disk D projects beyond front plate 1. This allows the user to grasp disk D by placing a finger in the spindle hole Ds and the thumb at edge De of disk D.

Figure 14:
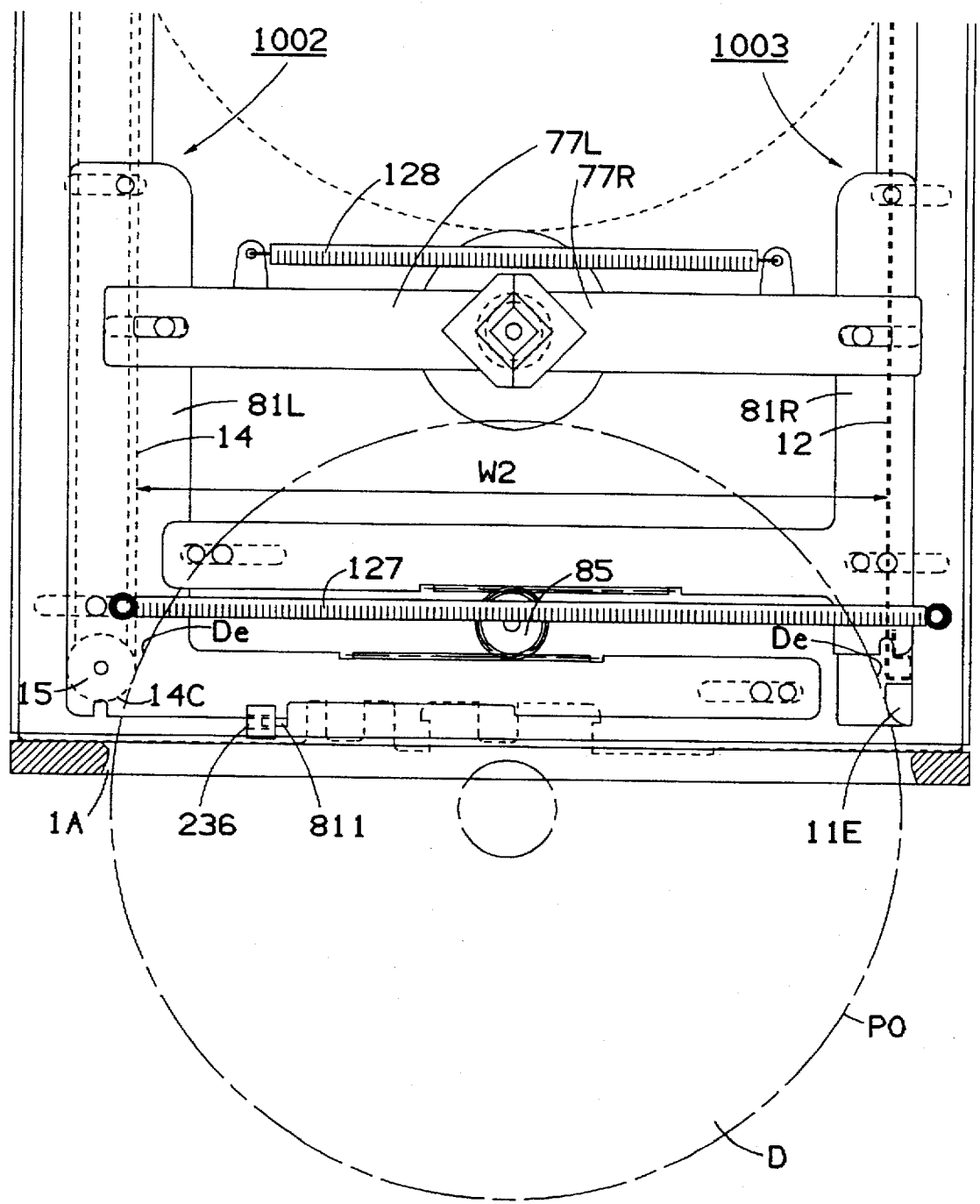
FIG. 14 is a top-view showing the disk transfer mechanism according to an embodiment of the present invention in a loading start position P0.

When disk D is inserted into the device via disk insertion opening 1a, edge De of the disk first engages with pulley wrap portion 14C of timing belt 14 and guide 11E. As described above, guide 11E is of a resin material having a low friction coefficient. Thus, disk edge De slides against it when the disk D is inserted, providing for smooth movement. The presence of guide 11E prevents friction with timing belt 14 when a disk is inserted, thus preventing damage to the timing belt 14. When a disk is at the insertion position, loading plates 81L, 81R are forced apart against the force of spring 127. Referring to FIG. 14, when disk D reaches the position indicated by P0, a distance W2 between the belts is 114 mm, disk loading is begun.

To pull disk D inside the device, disk transfer mechanism 1001 moves timing belt 14 counterclockwise. However, unless disk D is inserted a sufficient distance, disk edge De will slip and disk D will not be drawn in. This would require the user to push the disk in. In general, the user will insert disk D into the device by supporting disk spindle hole Ds and disk edge De with the forefinger and the thumb of the right hand. The right hand holding disk D naturally tends to turn clockwise as the forefinger releases disk D and the thumb follows the left side edge De of disk De into the disk player, pushing gently with the thumb. Once disk transfer mechanism 1001 begins active transport, the sensation felt by a right handed user is quite natural as the disk is pulled away from the thumb, because the disk D rotates in a clockwise direction as it is transported in.

Figure 15:
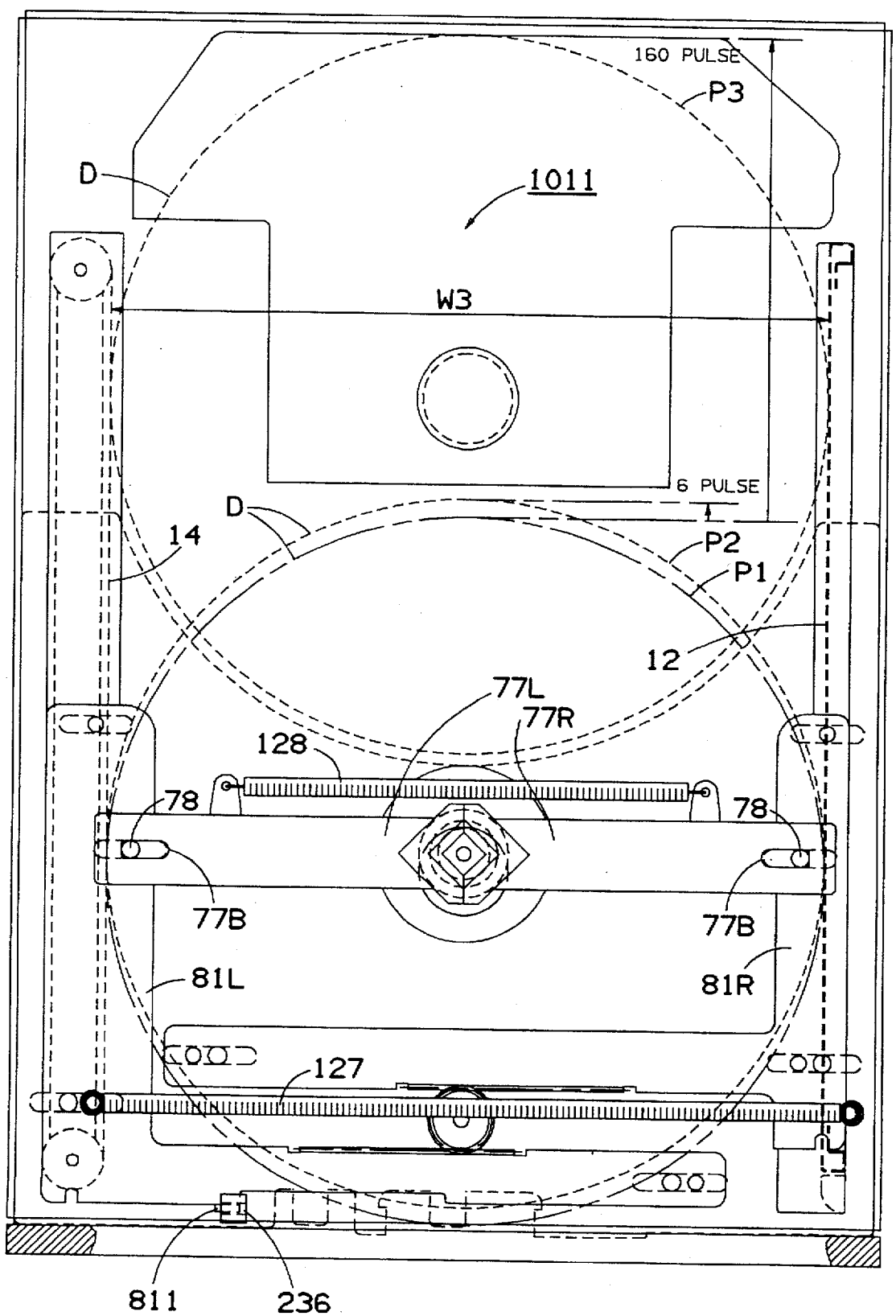
FIG. 15 is a top-view indicating pulse train start position P1, disk playback position P2, and disk stock position P3 of the disk transfer mechanism.

Once disk transfer mechanism 1001 has moved disk D sufficiently inside to support disk D between timing belt 14 and friction belt 12, disk D is thereafter reliably moved within the device of the invention independently of the user can be transferred in a stable manner. Referring to FIG. 15, by driving timing belt 14 in a counter-clockwise direction, disk D is moved to a stock position (P3) in stocker 1011 after passing a playback position (P2). Referring to FIG. 18, by driving timing belt 14 clockwise, disk transfer mechanism 1001 brings disk D from stock position (P3), past the playback position (P2), to an eject position (P4) at which disk D can be removed by the user. As the eject position (P4) is approached, disk transfer mechanism 1001 is not halted until spindle hole Ds of the disk is beyond front panel 1, allowing the user to insert a forefinger into spindle hole Ds to remove disk D. At the eject position, (P4) the distance W1 between belt 14 and belt 12 is the same distance (112 mm) as the disk receiving state described above. That is, timing belt 12 and friction belt 14 move together as the center of disk D is moved beyond the point at the end of timing belt 12 where timing belt 12 begins to wrap around timing pulley 15.

Loading Plate Opening/Closing Mechanism

Referring again to FIG. 7, drive motor 250 of loading plate opening/closing mechanism 1004 is also used to drive timing pulley 15, which drives timing belt 12 to move disk D. A rack release plate 134 is slidably connected to chassis 90, so that it can move to the left and right of main chassis 90, guided on pins 135 inserted in grooves 90H in the front of main chassis 90. A bend 134B on the right end of rack release plate 134, is engageable with a bend 75E in a sliding plate 75 (described later). A T-shaped shaped rack release lever 130 rotates on a shaft 133 projecting from an upper surface of a motor bracket 180. A spring 138 urges rack release lever 140 in a clockwise direction. An arm 130B of lever 130 passes through an opening 87C in a rack member 87 to insert in a groove 134A of plate 134. Lever 130 rotates counterclockwise in response to a movement of plate 134 the right of the device.

Projections 87A, on the lower end of rack member 87, insert into a hole (hidden in the drawing) in main chassis 90 such that rack member 87 is permitted to tilt about its lower end. A rack 87D on the upper end of rack member 87 is engageable with a gear 15C (see FIG. 23), in timing pulley 15 between two other gears 15A and 15B formed in timing pulley 15. A bend 87B projecting from rack member 87 is pivotably connected to arm 130A of lever 130 by a plate 131 and spring 132 connected in series between bend 87B and arm 130A. When lever 130 rotates in a counterclockwise direction, rack member 87 tilts toward the rear of the device causing rack 87D to approach and engage gear 15C.

Figure 59:
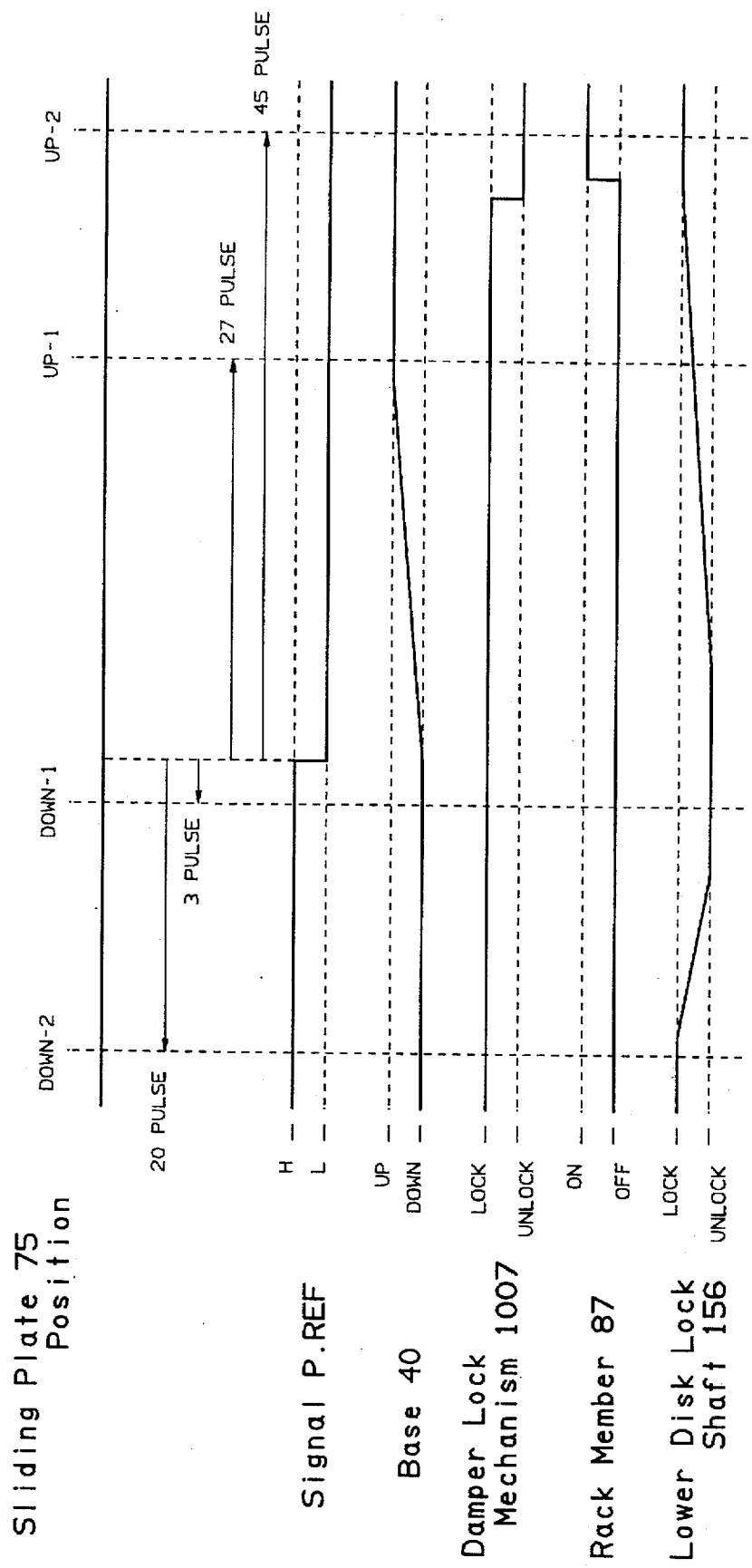
FIG. 59 is a timing chart showing the states of the other mechanisms that operate in conjunction with sliding plate 75.

Referring momentarily to FIG. 59, loading plate opening/closing mechanism 1005, rack member 87 are controlled so that rack 87D engages (ON) and disengages (OFF) gear 15C in response to the position of sliding plate 75 (to be described later). That is, rack member 87 is controlled as a function of the position of sliding plate 75, and engages timing pulley 15 only when sliding plate 75 reaches a position intermediate between position UP-1 and position UP-2 as shown in FIG. 59.

Referring now also to FIGS. 19–22, as sliding plate 75 moves from position DOWN-2 and position UP-1, bend 75E of plate 75 approaches, but does not yet engage bend 134B of plate 134. Therefore, during this time, the pressure from spring 138 keeps plate 134 positioned to the left of chassis 90, held there by lever 130. Thus, plate 134 rests in position with pins 135 resting at the left-most ends of guide grooves 90H. With plate 134 in this position, rack member 87 is disengaged from gear 15C because, rack release plate 130 is rotated to its clockwise position so that it pushes rack member 87 away from gear 15C via plate 131 and spring 132. Once sliding plate 75 moves beyond position UP-1 to position UP-2, bend 75E engages bend 134B, moving and plate 134 to the right of the device. This pushes arm 130B, rotating rack release plate 130 counter-clockwise in opposition to the force of spring 138, pulling on plate 131 and spring 132 tilting rack member 87 to bring rack 87D toward, and into engagement with, gear 15C (See FIG. 22).

Figure 17:
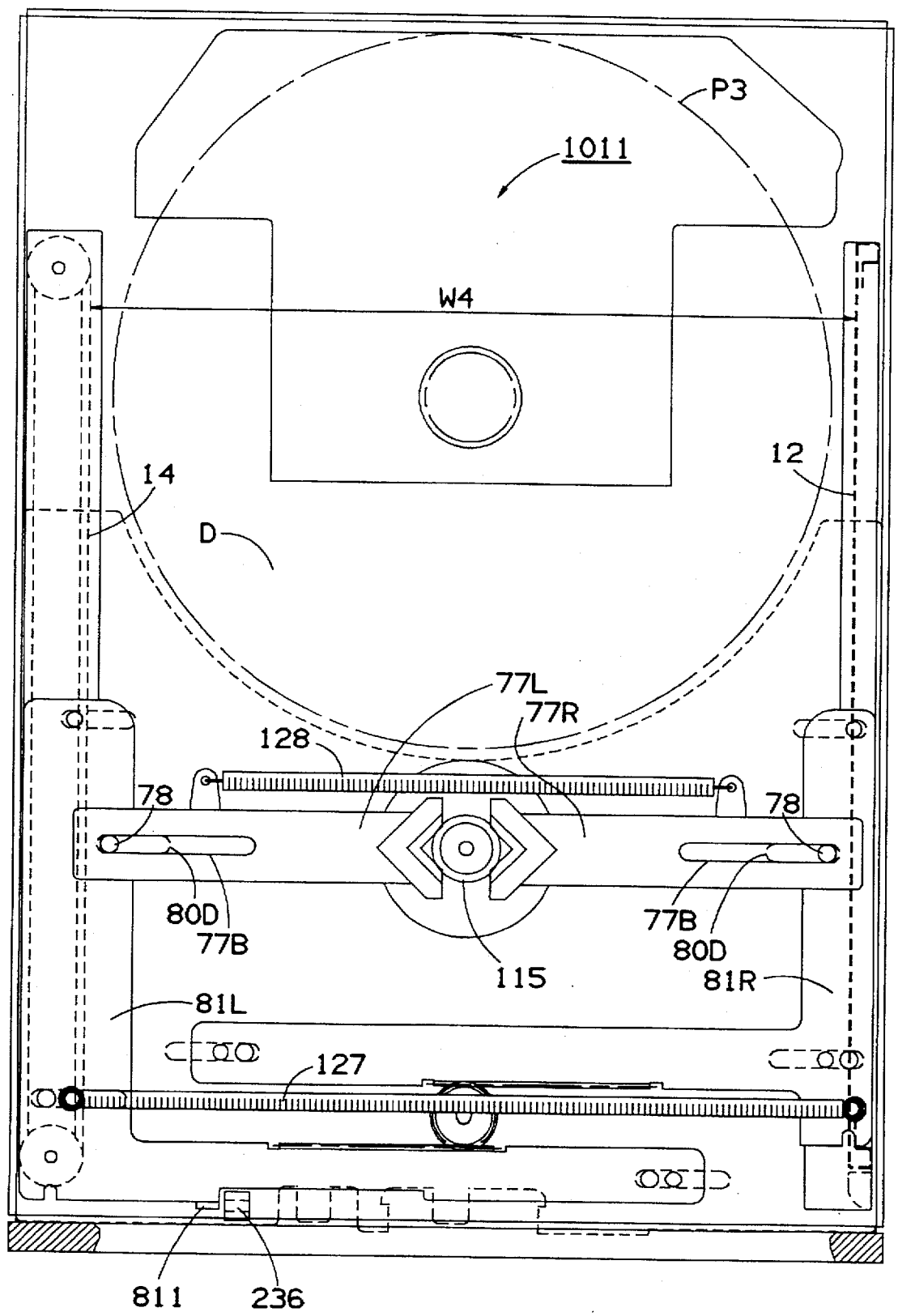
FIG. 17 is a top-view of the disk transfer mechanism during vertical movement of the stocker.
Figure 29:
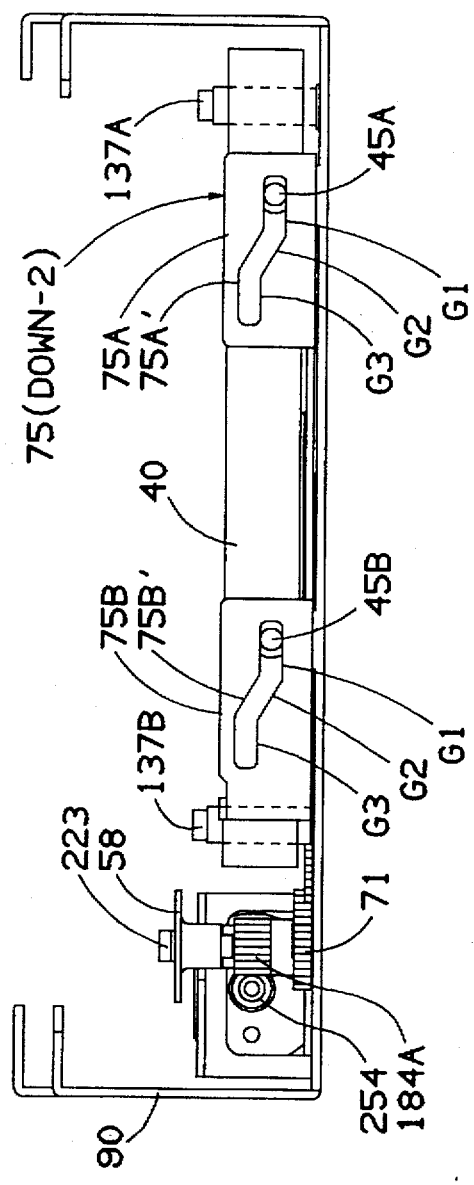
FIG. 29 is a side-view of the optical mechanism vertical transfer mechanism with sliding plate in position DOWN-2.
Figure 30:
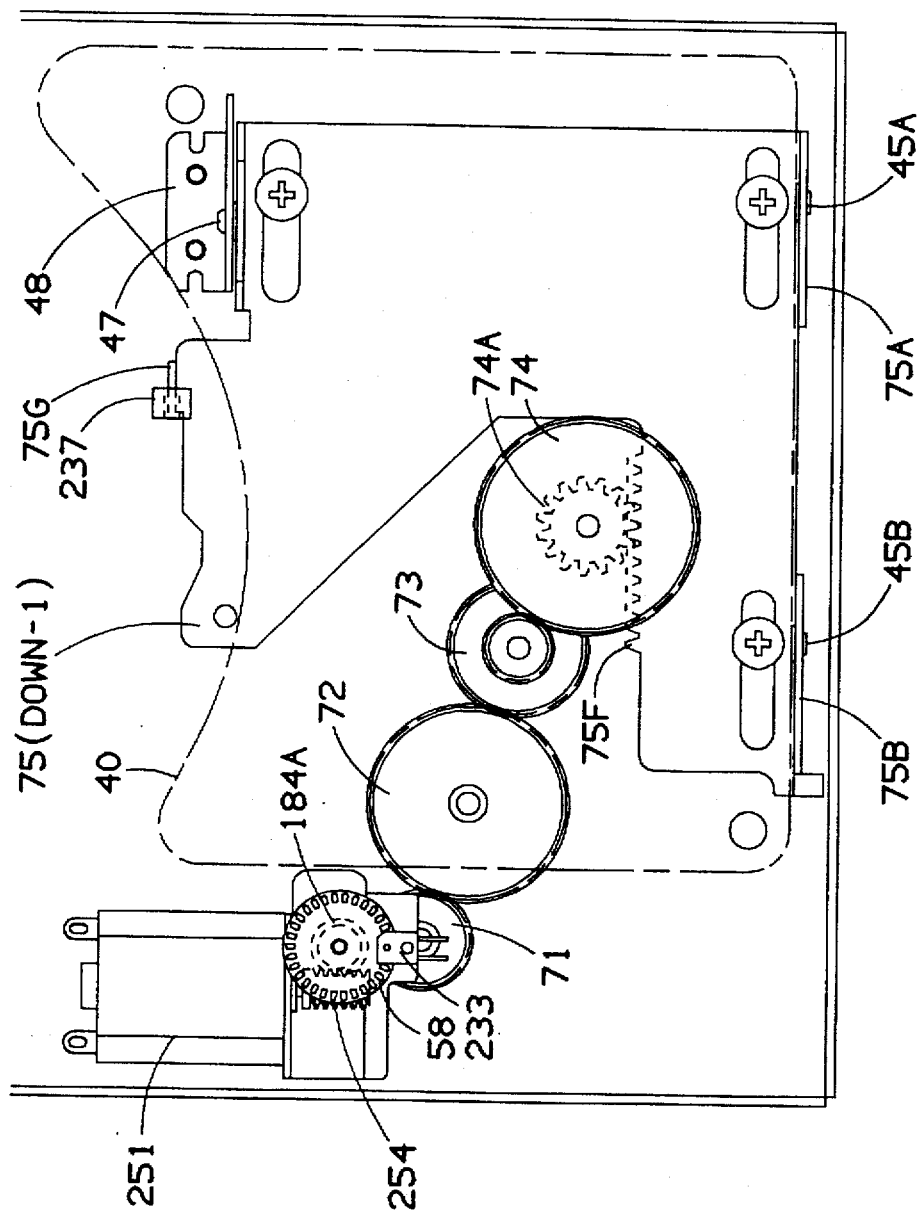
FIG. 30 is a top-view of the optical mechanism vertical transfer mechanism with sliding plate 75 in position DOWN-1.
Figure 31:
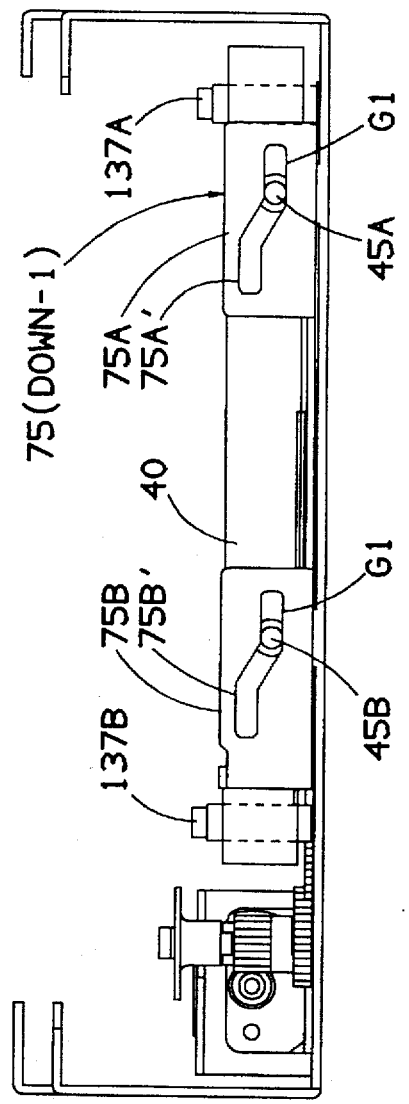
FIG. 31 is a side-view of the optical mechanism vertical transfer mechanism with sliding plate 75 in position DOWN-1.
Figure 32:
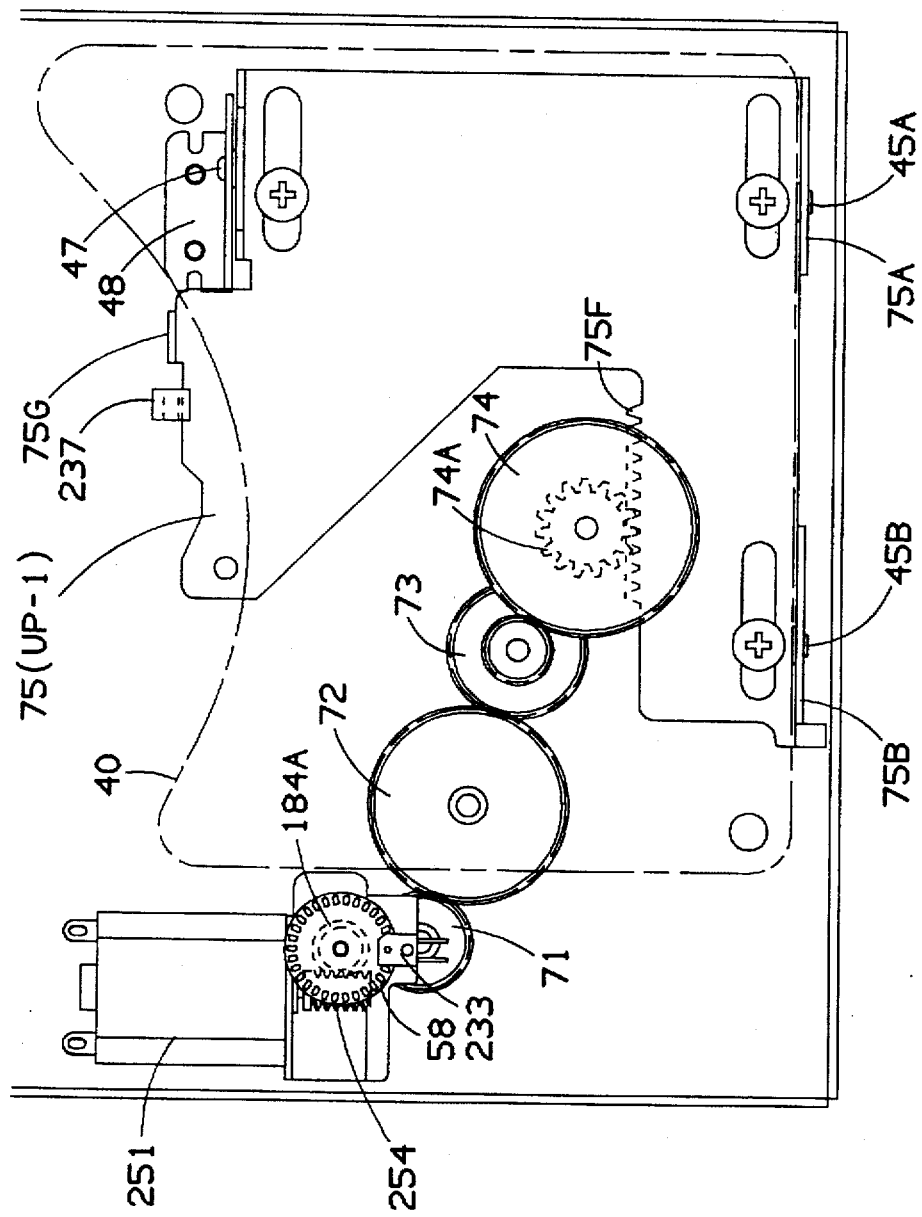
FIG. 32 is a top-view of the optical mechanism vertical transfer mechanism with sliding plate 75 in position UP-1.
Figure 33:
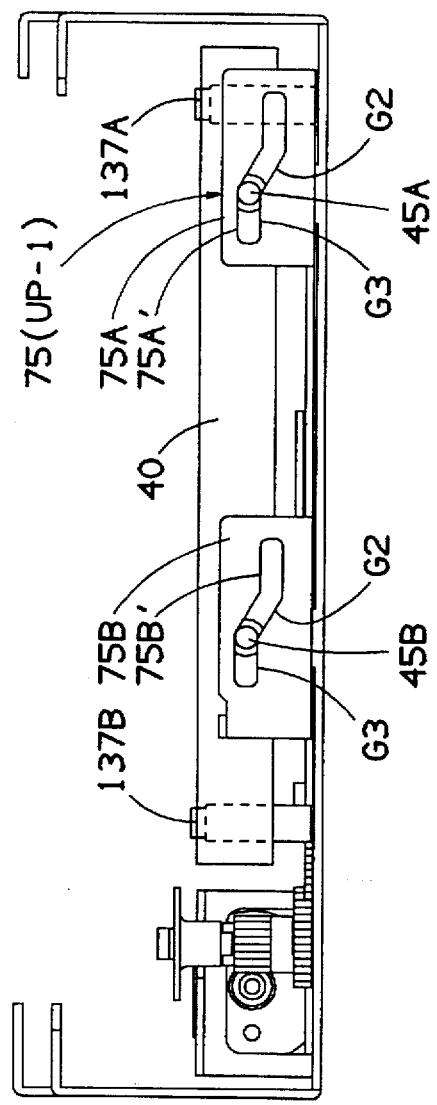
FIG. 33 is a side-view of the optical mechanism vertical transfer mechanism with sliding plate 75 in position UP-1.
Figure 34:
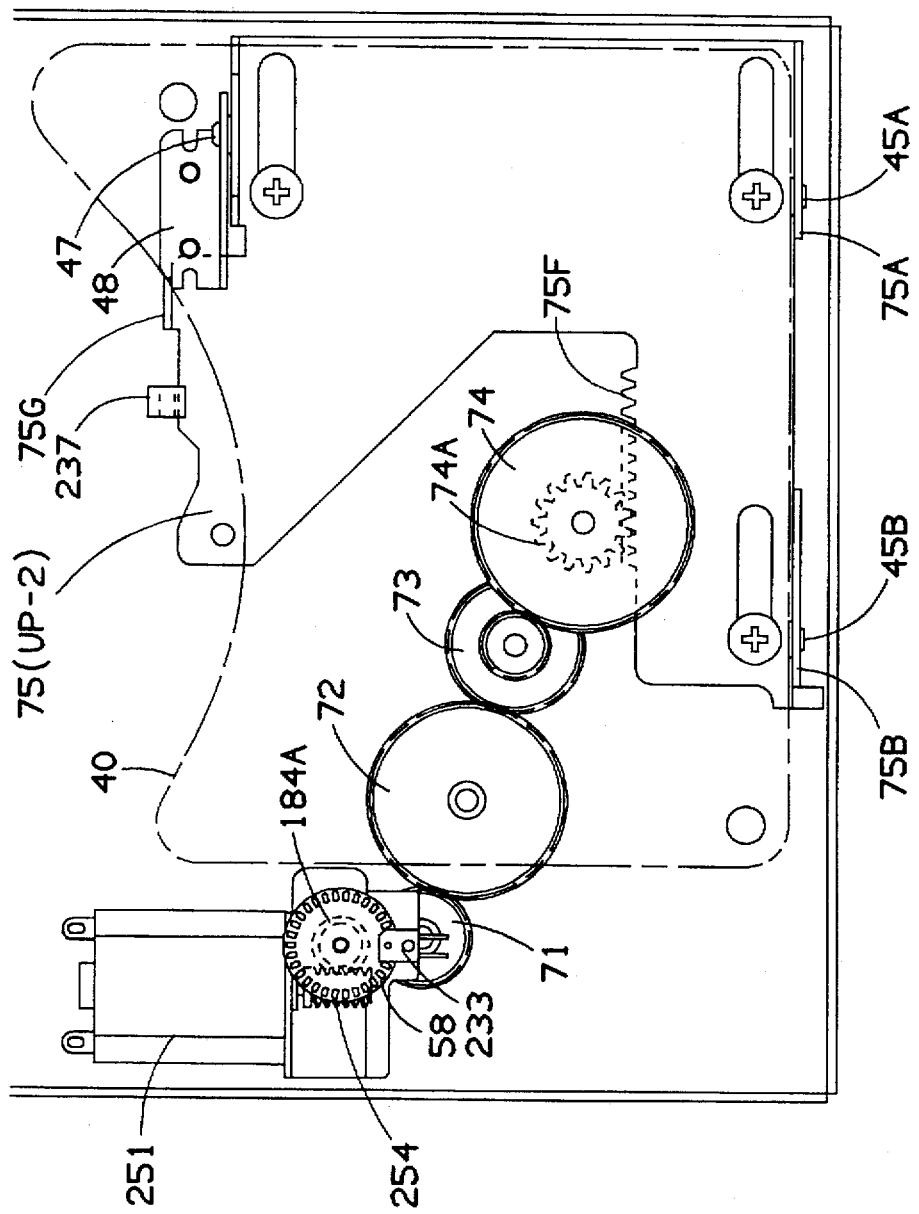
FIG. 34 is a top-view of the optical mechanism vertical transfer mechanism with sliding plate 75 in position UP-2.
Figure 35:
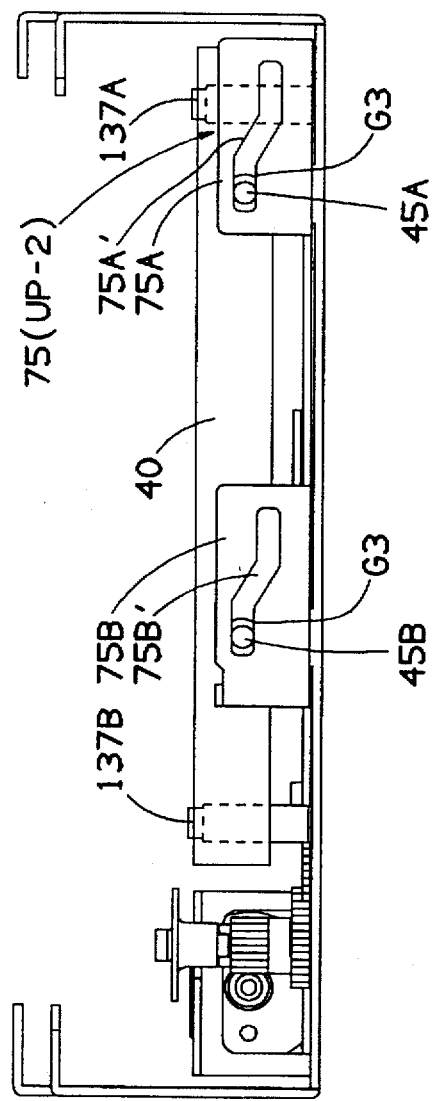
FIG. 35 is a side-view of the optical mechanism vertical transfer mechanism with sliding plate 75 in position UP-2.

Referring to also to FIG. 29, when sliding plate 75 is in position UP-2 and timing pulley 15 is rotated, gear 15C, in engagement with rack 87D, moves along rack 87D moving timing gear 15 to the left. This causes loading plates 81L, 81R to move between an open position POS. 3 as shown in FIG. 17, and disk receiving position POS. 1, shown in FIG. 13.

Figure 58:
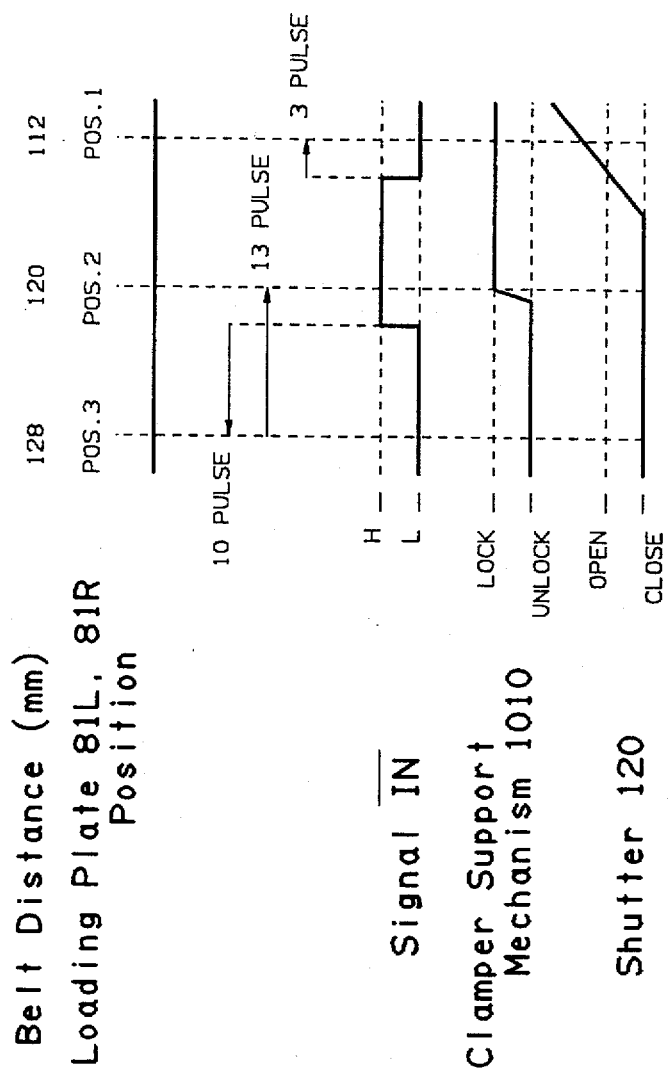
FIG. 58 is a timing chart showing the states of the other mechanisms that operate in conjunction with loading plates 81L, 81R.

The positions of loading plates 81L, 81R are detected using the changes in the state of signal $\overline{\text{IN}}$ and by counting and cumulating pulses in signal $\overline{\text{L.PULSE}}$. Referring to FIG. 58, open position POS. 3 is detected by counting 10 pulses of signal $\overline{\text{L.PULSE}}$ after signal $\overline{\text{IN}}$ changes to "L" when loading plates 81L, 81R are separated. Position POS. 2 corresponds to the separation distance at which disk D is supported and is detected by counting 13 pulses of signal $\overline{\text{L.PULSE}}$ from the converged (receive) position of loading plates 81L, 81R. Disk receiving position POS 1 is detected by counting 3 pulses of signal $\overline{\text{L.PULSE}}$ once loading plates 81L, 81R are closed signal $\overline{\text{IN}}$ changes to "L".

Optical Mechanism

Figure 9:
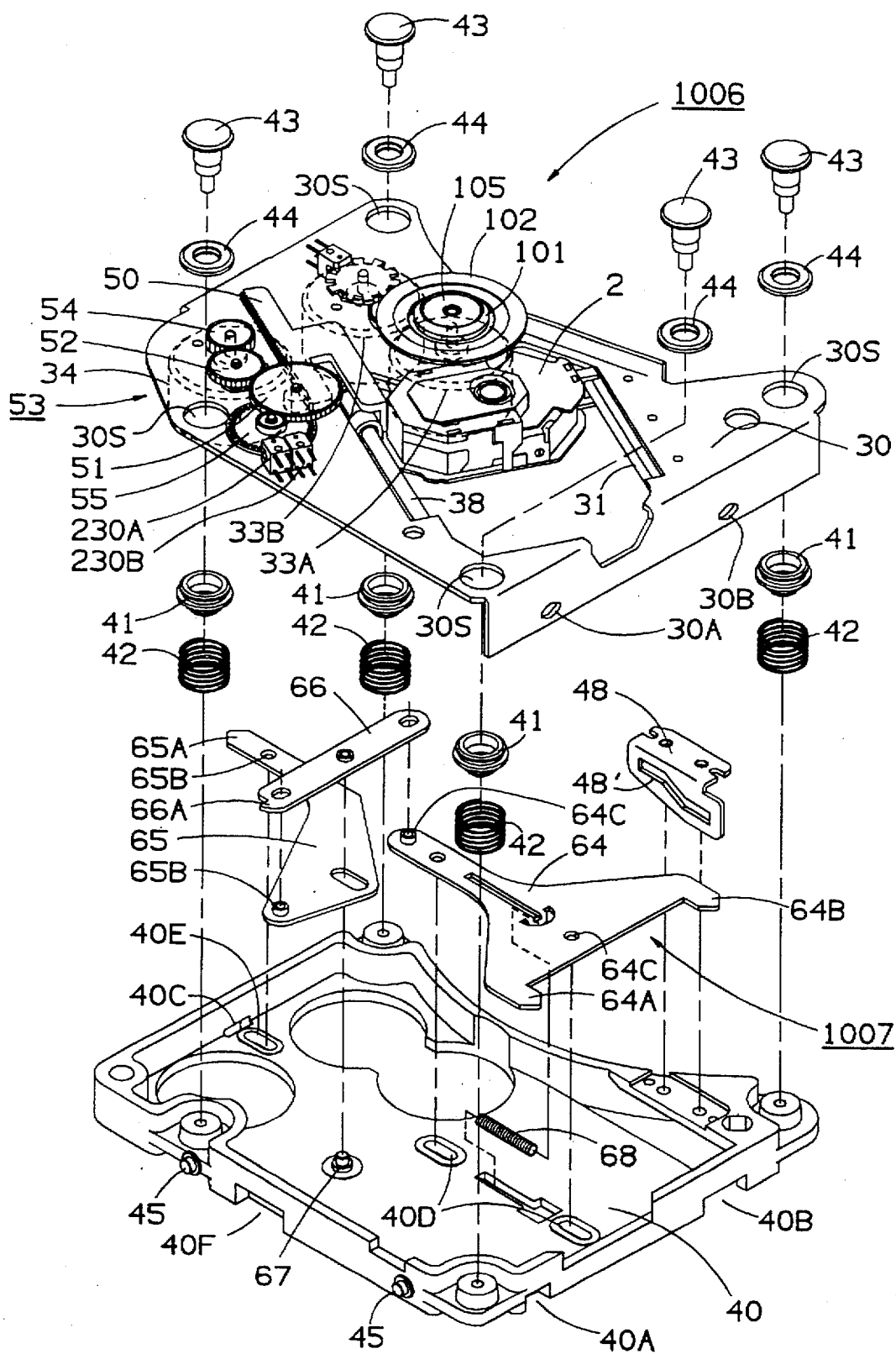
FIG. 9 is an exploded view of an optical mechanism and damper lock mechanism.
Figure 37:
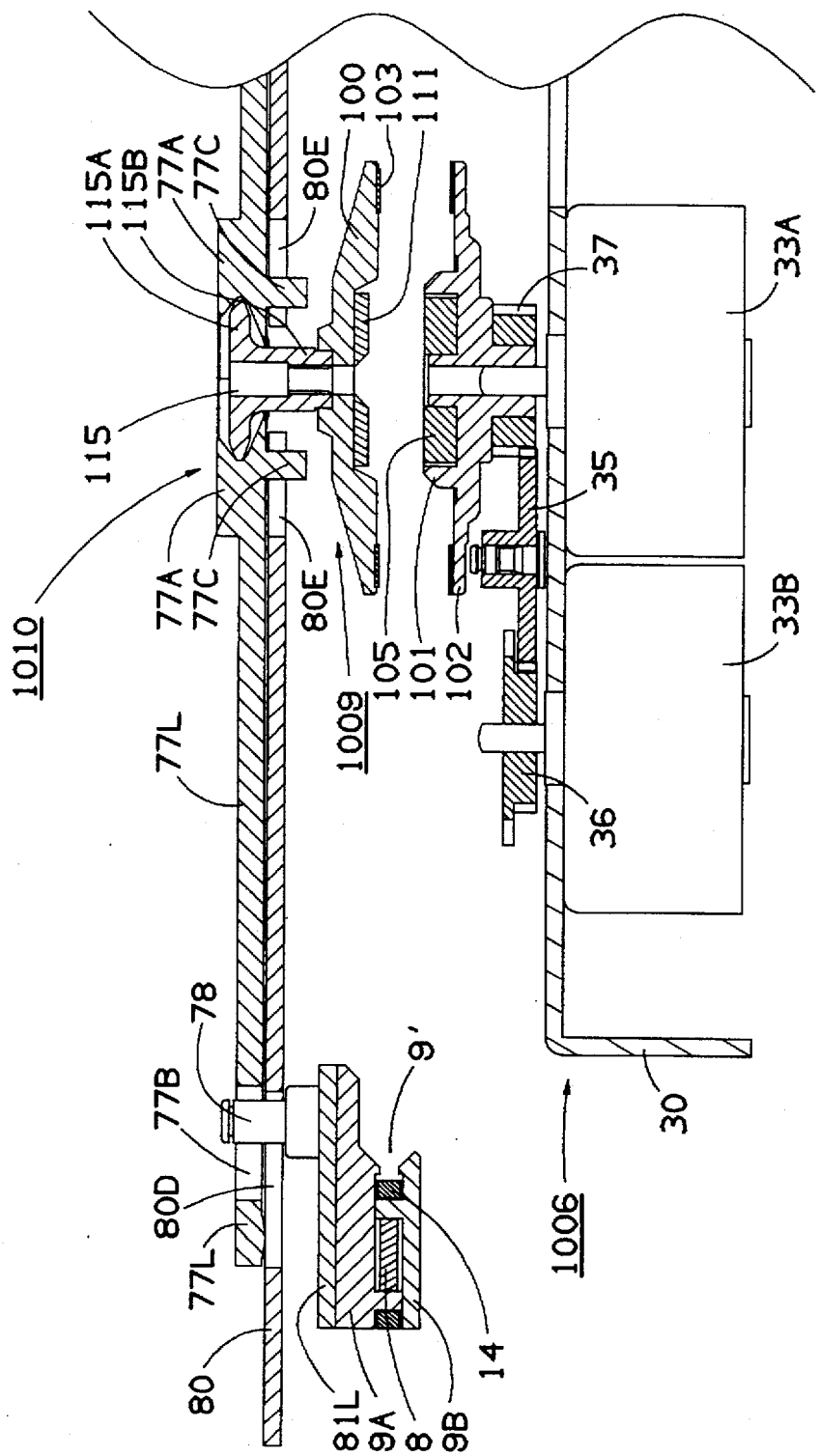
FIG. 37 is a schematic side-view of the clamper support mechanism in the disk receiving state.
Figure 38:
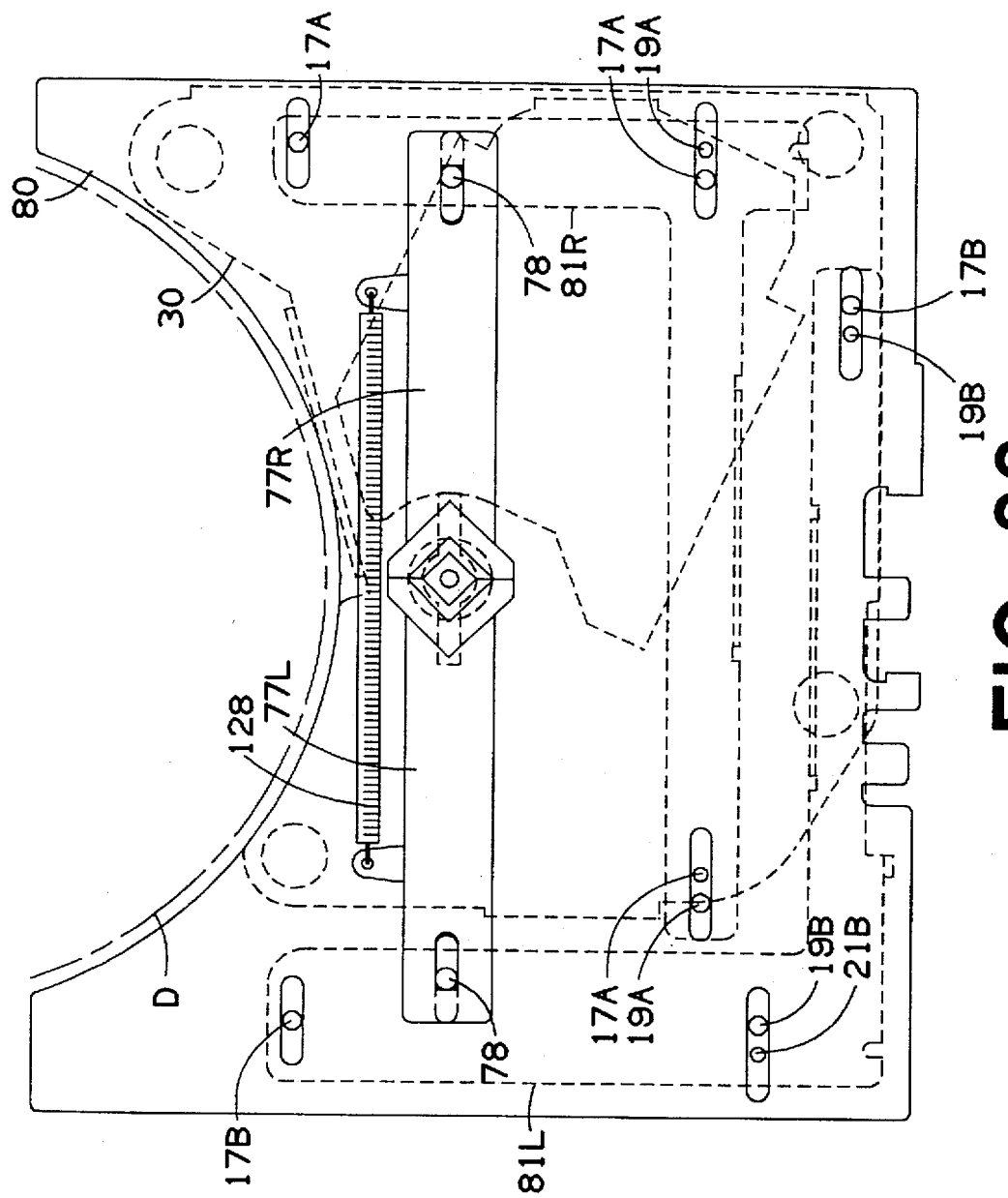
FIG. 38 is a top-view of the clamper support mechanism in the disk transfer state.

Referring to FIG. 9, an optical mechanism 1006 includes a chassis 30, a turntable 102, an optical pickup 2, an optical pickup transfer mechanism 53. Disk D is mounted on turntable 102 and rotated as optical playback of disk D is performed. In optical mechanism 1006, turntable 102 is affixed to a rotating shaft of main motor 33A. Referring to FIG. 37, its lower surface is affixed to gear 37. Gear 37 is connected to gear 36 of sub-motor 33B via gear 35, which is rotatably supported on chassis 30. As a result, turntable 102 is rotated by motors 33A and 33B operating together.

Main motor 33A and auxiliary motor 33B are both employed to drive turntable 102 during playback and to drive optical pickup 2 and turntable 102 during accessing and start-up operations described further below. Two motors are used because their operational combination provides certain benefits. During disk playback, motor 33A and auxiliary motor 33B are supplied with drive voltage at a ratio of approximately 7:3 so that auxiliary motor 33B acts as a load on main motor 33A. The load of auxiliary motor 33B eliminates backlash between meshed gears 35–37, minimizing vibration of turntable 102. Advantageously, because auxiliary motor 33B is partially driven by main motor 33A, a back-emf generated auxiliary motor 33B reduces the total current flow to the two motors. Therefore, the load of auxiliary motor 33B is, to a first-order approximation, non-dissipative. Further details of the motor drive circuit can be found in the present applicant's Japanese Patent Application Serial Number 6-340510 (filed Dec. 28, 1994).

A centering spindle 101 projects from a top surface of turntable 102 to align and center disk D with turntable 102. A magnet 105 is affixed inside centering spindle 101. Magnet 105 attract a clamper 1009 to clamp disk D as described below. Guide rods 31, 38, which affixed to chassis 30, movably guide optical pickup 2 along a path inclined at angle of 25 degrees relative to the front end of main chassis 90. Optical pickup 2 is moved along a radius of disk D by transfer mechanism 53 which includes a feed motor 34, deceleration gears 51, 52, 54, and a rack 50. Optical sensors 230A, 230B detect rotation of a shutter 55, connected to gear 51. This allows the displacement of optical pickup to be detected.

Support of the Optical Mechanism

Referring to FIGS. 9, and 24–27 lower dampers 41, fitted into attachment holes 30S on chassis 30, vibrationally isolate chassis 30 with optical mechanism 1006, from a base 40. A respective spring 42, between each lower damper 41 and base 40, supports the weight of chassis 30. Fasteners 43 insert through upper dampers 44 on the upper surface of damper 41 passing through lower dampers 41 to connect to base 40.

A damper lock mechanism 1007, selectively locks optical mechanism 1006 on chassis 30 to a base 40 from which optical mechanism 1006 is otherwise vibrationally isolated. Damper lock mechanism 1007 includes a Y-shaped lock plate 64 with pins 64C projecting from its lower surface. Pins 64C fit into guide grooves 40D on base 40, permitting lock plate 64 to move over a limited range and direction defined by guide grooves 40D. A J-shaped lock plate 65 also has a pin 65B, projecting from its lower surface, that fits into a guide groove 40E on base 40, permitting lock plate 65 to move along a limited path defined by guide groove 40E. Engagement tips 64A and 64B of lock plate 64 pass through holes 40A and 40B, located on a right side of base 40, and insert into holes 30A and 30B, respectively, located on a right side of chassis 30. Engagement tip 65A of lock plate 65 passes through a hole 40C located on a left side of base 40, and inserts into hole 30C (not visible in FIG. 9 but visible in FIGS. 24–27.), which is similar to holes 30A and 30B, located on a left side of chassis 30. Lock plates 64 and 65 are interconnected by connecting plate 66, which rotates on a shaft 67 projecting upwardly from base 40. A compression spring 68 is inserted between base 40 and lock plate 64, urging lock plate 64 toward the right side of base 40. Thus, lock plates 64 and 65 move in opposite directions against, and with, the force of compression spring 68. A notch 66A on an end of connecting plate 66 passes though an opening 40F in base 40. A sliding . plate 75 (described later) engages notch 66A to control the angular position of connecting plate 66.

As visible in FIG. 9, holes 30A-30C are have curved upper and lower edges. Also apparent from FIG. 9 is that engagement tips 64A, 64B and 65A are pointed with a portion at the base of each point that is larger than holes 30A-30C. If, when engagement tips 64A, 64B, and 65A of lock plate 64 and lock plate 65 pass through holes 40A, 40B, and 40C and insert into holes 30A, 30B, and 30C engagement tips 64A, 64B, and 65A are positioned slightly out of alignment with holes 30A-30C, the shape of holes 30A-30C will tend to force engagement tips 64A, 64B, 65A to the center. In addition, by arranging for an upper horizontal edge of each hole 40A, 40B, 40C to be vertically aligned with respect to a respective one of engagement tips 64A, 64B, and 65A and a respective one of holes 30A, 30B, and 30C such that the flat of the base of each of engagement tips 64A, 64B, and 65A is pressed against the horizontal edge of the respective one of each hole 40A, 40B, and 40C base 40 is also firmly aligned with respect to chassis 30. Not only does this arrangement secure a positive vertical position of the tips with respect to chassis 30, because of the curved shape of the edge of the corresponding one of holes 30A-30C, each tip is also horizontally aligned within the corresponding one of holes 30A-30C. The horizontal alignment of engagement tips 64A, 64B, and 65A serves to horizontally align chassis 30 and base 40 because the horizontal width of holes 40A, 40B, 40C is nearly the same as the width of the base of the respective one of engagement tips 64A, 64B, and 65A which insures they are precisely aligned in the holes 40A, 40B, 40C.

Figure 66:
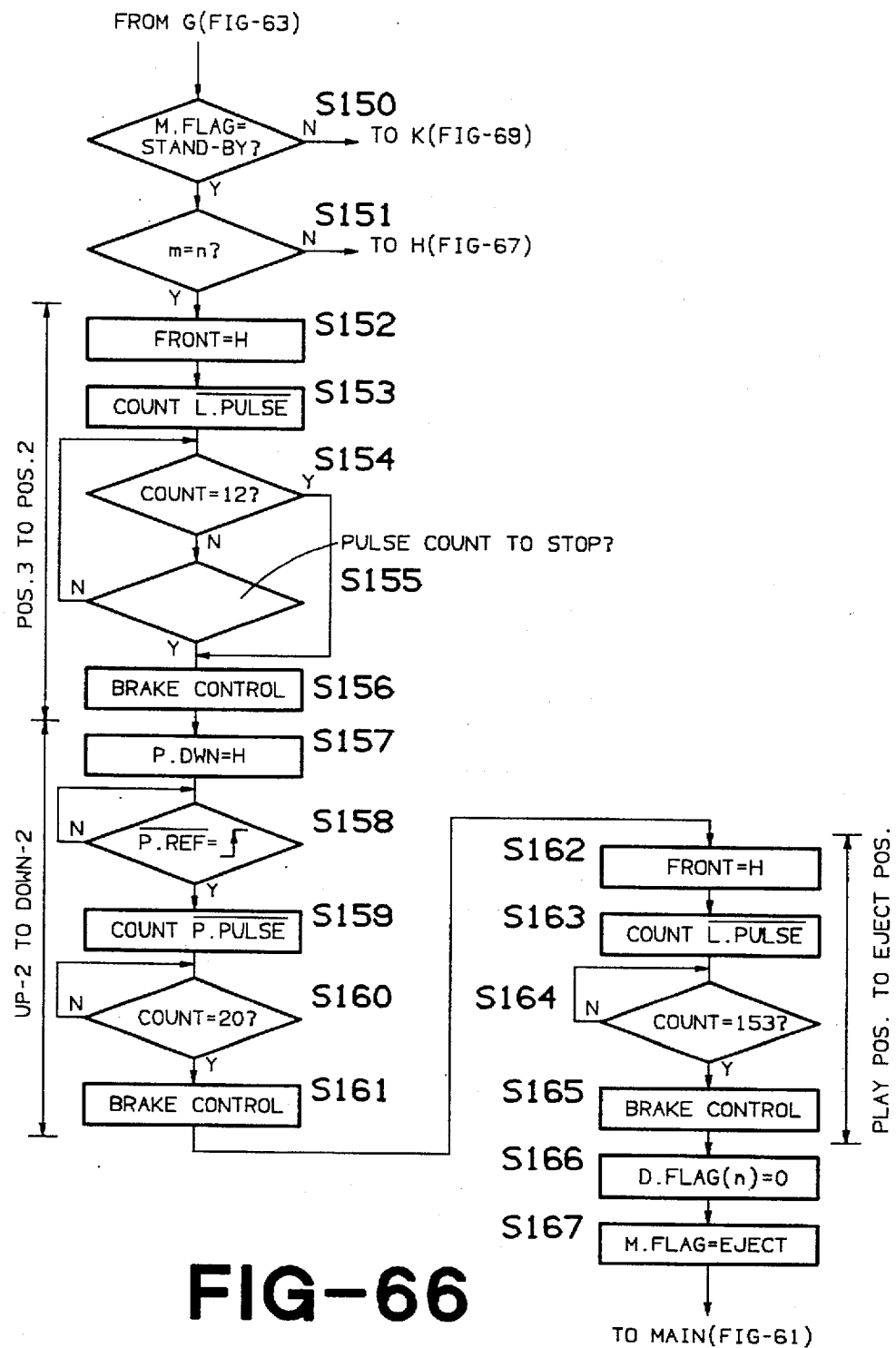
FIG. 66 is a flowchart of JOB EJECT.

Referring now also to FIG. 66, damper lock mechanism 1007 is locked and unlocked in response to the position of sliding plate 75. An edge 75B" of sliding plate 75 is at a substantial distance from a notch 66A of connecting plate 66 when sliding plate 75 is between position DOWN-2 and position UP-1. Thus, while sliding plate 75 is between position DOWN-2 and UP-1, lock plates 64 and 65 are urged toward the right side of housing 1000 by the force of compression spring 68 forcing engagement tips 64A, 64B, and 65A into holes 30A-30C of chassis 30. This causes optical mechanism 1006, on chassis 30, to be locked to base 40. When sliding plate 75 is moved from position UP-1 to position UP-2, edge 75B" engages notch 66A turning connecting plate 66 counterclockwise against the force of compression spring 68. Lock plate 64 is thereby moved toward the left side of housing 1000, and lock plate 65 toward the right side of housing 1000, causing engagement tips 64A, 64B, and 65A to disengage from holes 40A-40C of base 40 and holes 30A-30C of chassis 30, respectively. Thus freed, in position UP-2, optical mechanism 1006 is elastically supported by lower dampers 41 and upper dampers 44.

Lift Mechanism for Optical Mechanism

Figure 10:
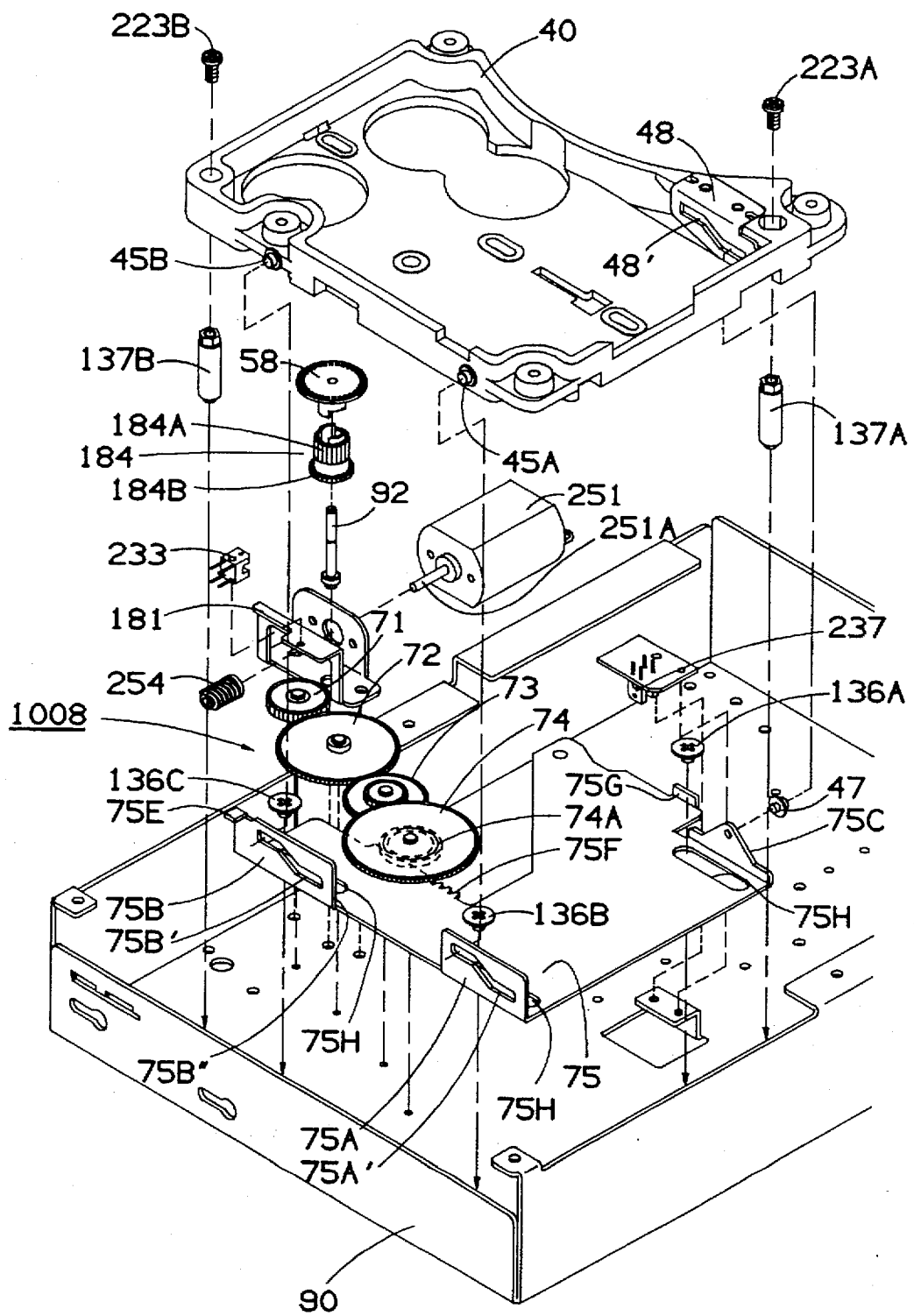
FIG. 10 is an exploded view of an optical mechanism vertical transfer mechanism of the optical mechanism of FIG. 9.
Figure 39:
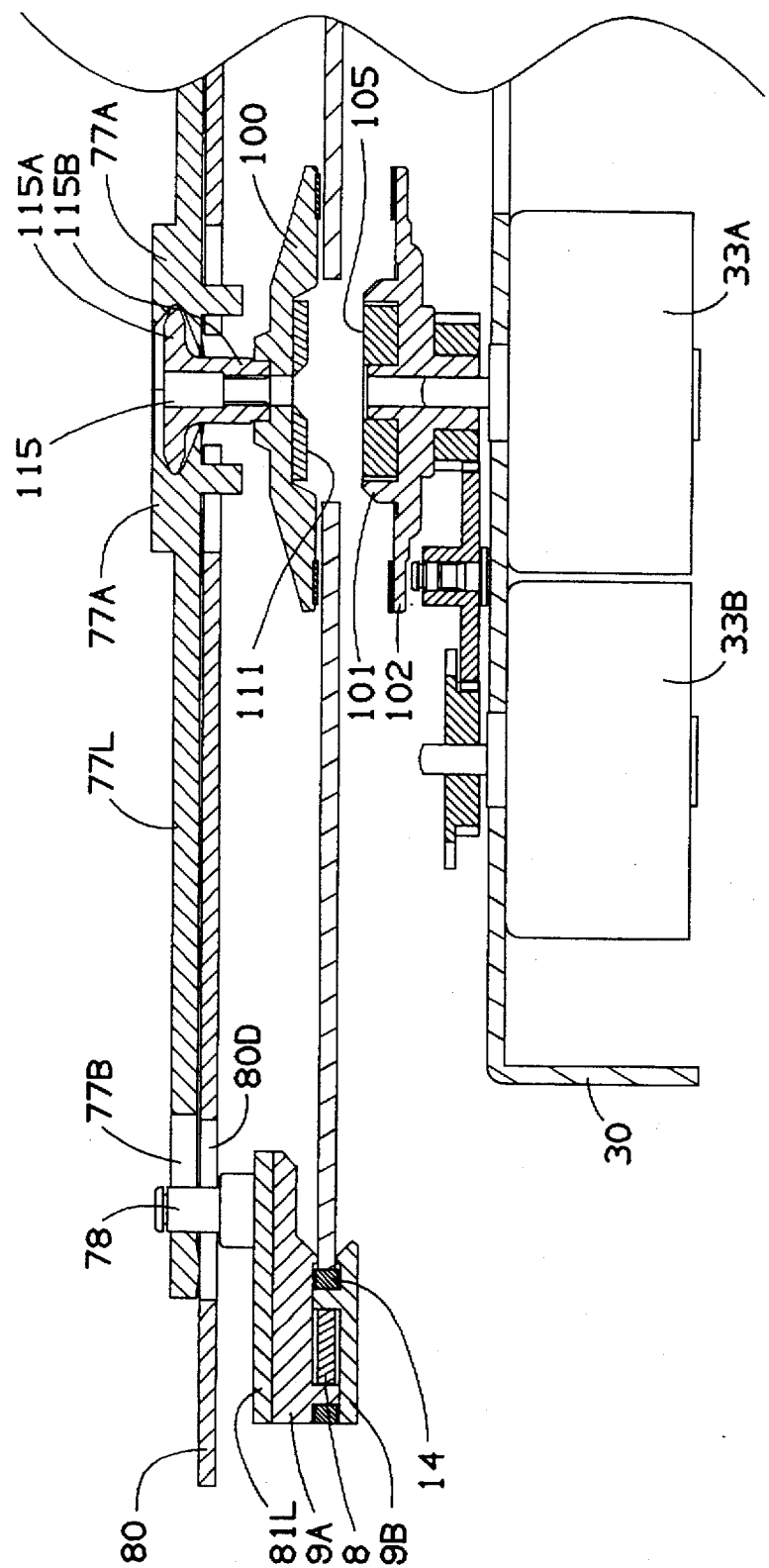
FIG. 39 is a schematic side-view of the clamper support mechanism 1010 in the disk transfer state.
Figure 40:
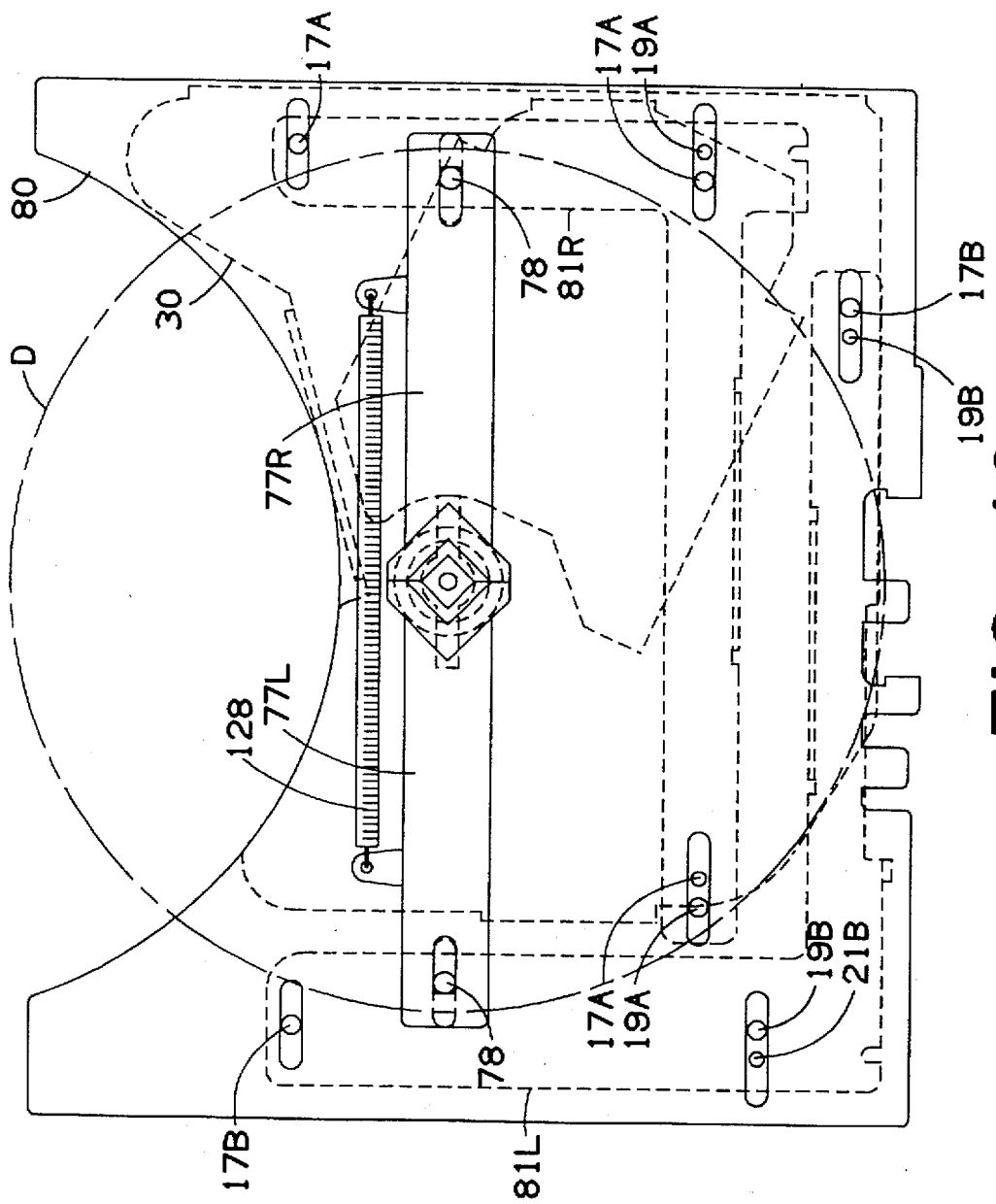
FIG. 40 is a top-view of the damper support mechanism when optical mechanism in the up position.

Referring to FIG. 10, a lift mechanism 1008 for optical mechanism 1006, raises and lowers optical mechanism 1006 between an up position for playing back a disk D (see FIG. 41) and a down position where the optical mechanism is recessed below the disk when the disk D in the playback position (see FIG. 39). Lift mechanism 1008 moves sliding plate 75, which is slidably connected to main chassis 90, in left and right directions. Sliding plate 75 is guided in its movement by slots 75H on the bottom of sliding plate 75 which are located by shafts 136A-136C threaded into chassis 90. Drive motor 251 is affixed chassis 90 with a bracket 181. A worm gear 254 is press-fitted to rotating shaft 251A of drive motor 251. Gear member 184 is rotatably supported by shaft 92, and a gear 184A on the upper portion of gear member 184 engages with worm gear 254. A gear 184B on the lower portion of gear member 184 drives gears 71–74, rotatably supported by chassis 90. Gear 74A, on the lower surface of gear 74, engages with rack 75F of the sliding plate causing sliding plate 75 to move horizontally.

Base 40, which elastically supports optical mechanism 1006, is guided, so that it can move up and down, by guide shafts 137A, 137B, affixed to chassis 90. Base 40 is supported on pins 45A and 45B, projecting horizontally from base 40, and 47, projecting horizontally from a bend 75C in sliding plate 75, which ride in guide grooves 75A', 75B' (cut into bends 75A and 75B on sliding plate 75) and 48' in a steel guide plate 48 attached to base 40.

Guide grooves 75A', 75B', and 48' have two plateaus and a ramp in their shapes such that when sliding plate 75 moves horizontally from the left toward the right, base 40 initially stays in a lowered position until a certain point in the movement of sliding plate 75 where it begins to be lifted and then remains at an upper position for a further interval of movement of sliding plate 75. Guide plate 48 is disposed toward base 40 to make assembly easier.

Figure 41:
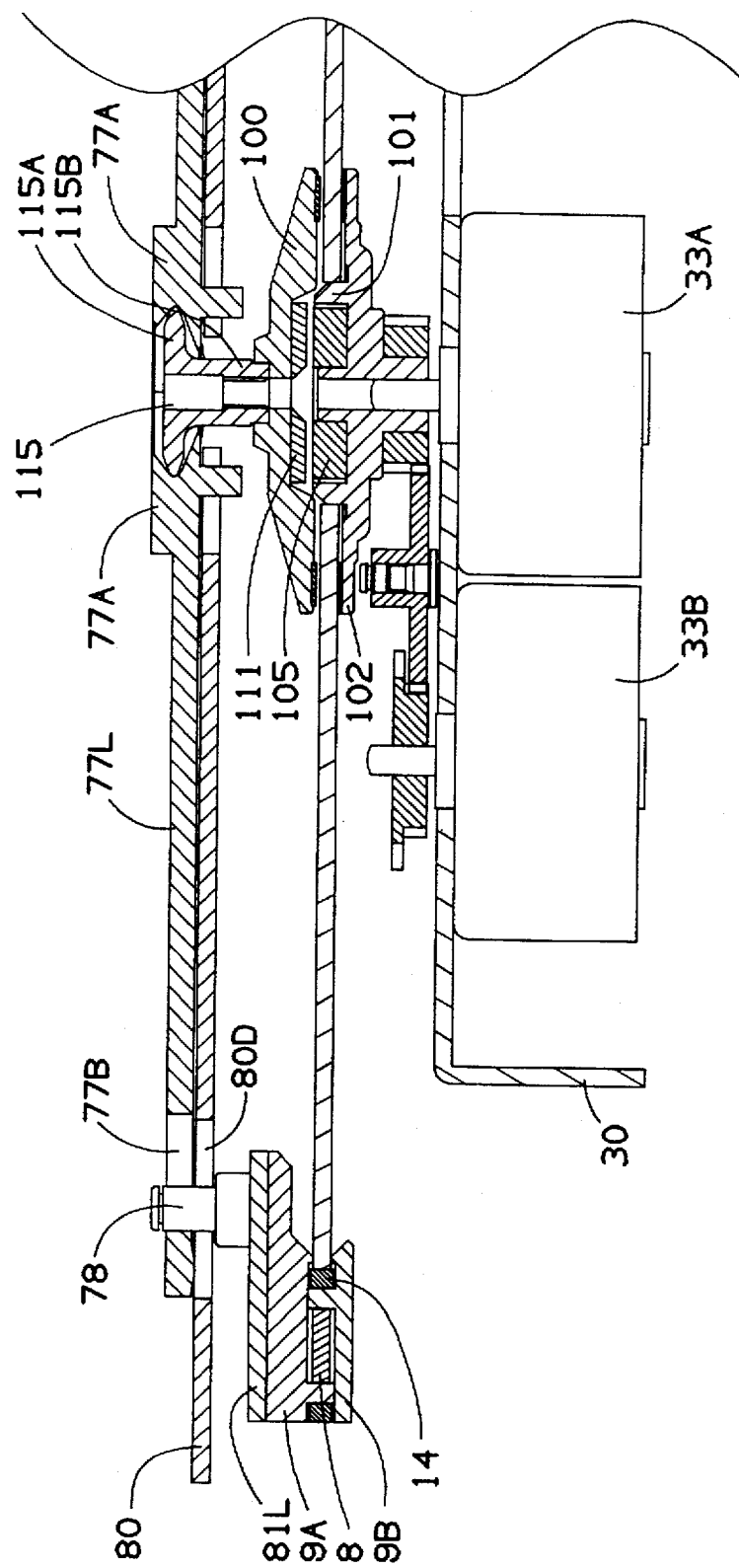
FIG. 41 is a schematic side-view drawing of clamper support mechanism when optical mechanism in the up position.

Referring to FIGS. 28–35 the lifting of base 40 by sliding plate 75 is explained in further detail below. The raising and lowering of base 40 is described with reference to the raising and lowering of pins 45A and 45B by way of guide grooves 75A' and 75B'. However, the discussion also applies to pin 47 and guide groove 48' although guide groove 48' is lifted by pin 47 rather than the other way around as with pins 45A and 45B and guide grooves 75A' and 75B'. Pins 45A and 45B of base 40 are guided by horizontal portions G1 of lower guide grooves 75A' and 75B' during the movement of sliding plate 75 between position DOWN-2 (see FIG. 28, FIG. 29) and position DOWN-1 (see FIG. 30, FIG. 31). Base 40, i.e. optical mechanism 1006, remains in the down position (see FIG. 39), where it is recessed below disk D in the playback position. When sliding plate 75 moves between position DOWN-1 and position UP-1 (see FIG. 32, FIG. 33), a sloping portion G2 of the guide groove guides pins 45A and 45B, and serves to move optical mechanism 1006 vertically. When the sliding plate moves between position UP-1 and position UP-2 (FIG. 34, FIG. 35), horizontal portion G3 of the upper guide groove guides pins 45A and 45B, and the optical mechanism remain in the up position (FIG. 41) for disk playback. Referring to FIG. 41, in the up position optical mechanism 1006 is at the same height as the lower surface of disk D in the playback position on the upper surface of turntable 102. Thus, the disk does not have to be lifted up as in a tray-type disk player. In order to detect the position of sliding plate 75, a shutter member 58 is affixed to the upper surface of gear member 184. Rotational displacement is detected by optical sensor 233 fixed on bracket 181. Optical sensor 233 generates a sliding plate motion pulse signal (P.PULSE). In this embodiment, P.PULSE is set so that one pulse indicates approximately 0.231 mm of motion by sliding plate 75. A shutter piece 75G is formed by a bend on sliding plate 75, and optical sensor 237 on chassis 90 detects the shutter piece 75G is to indicate a reference point. Sensor 237 generates a sliding plate reference position signal (P.REF). Referring to FIG. 59, when sliding plate 75 moves slightly upward from position DOWN-1, the signal changes to "L".

Thus the positions of sliding plate 75 are detected by counting the number of pulses in signal P.PULSE after the change in state of signal P.REF. Referring to FIG. 59, position DOWN-1 is detected by moving sliding plate 75 in the DOWN direction, until signal P.REF changes to "H", then counting three pulses in signal P.PULSE. Position DOWN-2 is detected in a similar fashion, except that 20 pulses are counted. Position UP-1 is detected by moving sliding plate 75 in the UP direction, changing signal P.REF to "L" then counting 27 pulses from signal P.PULSE. Position UP-2 is detected in a similar fashion, except that 45 pulses are counted.

Clamper

Referring again to FIG. 2 and also to FIG. 37, a clamper 1009 clamps disk D to a turntable 102. Clamper 1009 includes a clamper base 100, a magnetic plate 111, a clamp top 115, and a clamp sheet 103. A ferro-magnetic plate 111 (eg., of iron) is attached to a bottom surface of clamper base 100 opposite a magnet 105 on turntable 102. Clamp sheet 103 of compressed urethane is adhesively attached to a disk engagement surface of clamper to prevent damage to the top surface of disk D.

Clamper Support Mechanism

Referring to FIGS. 2 and 36–44, a clamp support 115 has a flange 115A top and a shaft 115B which passes through an opening 80G in loading chassis 80. Flange 115A tapers at its perimeter. Shaft 115B is insertably fixed to clamper base 100. A clamping sheet of compressed urethane is adhesively bonded to the outer perimeter of the bottom surface of clamper base 100 to protect disk surfaces from damage. Turntable 102 has a magnet 105 which is positioned to attract ferromagnetic plate 111.

A clamper support mechanism 1010 holds clamper 1009 slightly (0.3 mm) above disk D when disk D is in the playback position. Respective pins 78, 78, projecting upwardly from the upper surface of loading plates 81L and 81R, pass through guide groove 80D of loading chassis 80 and insert into guide grooves 77B and 77B of clamper holder 77L, 77R. Respective projections 77C, 77C, projecting downwardly from clamper holders 77L, 77R, pass through, and are guided by, respective guide grooves 80E, 80E of loading chassis 80. Thus, clamper holders 77L, 77R are free to move left and right with respect to loading chassis 80. Clamper holders 77L, 77R have respective supports 77A, 77A on respective ends which face each other. Supports 77A, 77A are shaped to clamp and support flange 115A of clamper 1009 when supports 77A, 77A are brought together. Support 77A has a V-shaped cross section. A spring 128 urges clamper holders 77L and 77R together to snugly embrace flange 115A. Flange 115A fits precisely in supports 77A, 77A in a definite position when supports 77A, 77A are brought together. Thus, supports 77A, 77A hold flange 115A at a precise vertical position keeping clamper 1009 at 0.3 mm above disk D.

Clamper support mechanism 1010 supports clamper 1009 above disk D responsively to movement of loading plates 81L and 81R as follows. When loading plates 81L and 81R are moved between a disk receiving position (shown in FIGS. 36 and 37) and disk support position in which disk D is supported between timing belt 12 and friction belt 14 (shown in FIGS. 38, 39 and 40, 41–FIGS. 38, 39 and 40, 41 differ only in that position of the disk in the horizontal direction.), pins 78, 78, on loading plates 81L and 81R, travel in guide grooves 77B, 77B of clamper holders 77L, 77R without affecting clamper holders 77L and 77R. The force of spring 128 brings clamper holders 77L, 77R together causing supports 77A, 77A to hold clamper 1009 0.3 mm above disk D when disk D is in the playback position.

Figure 42:
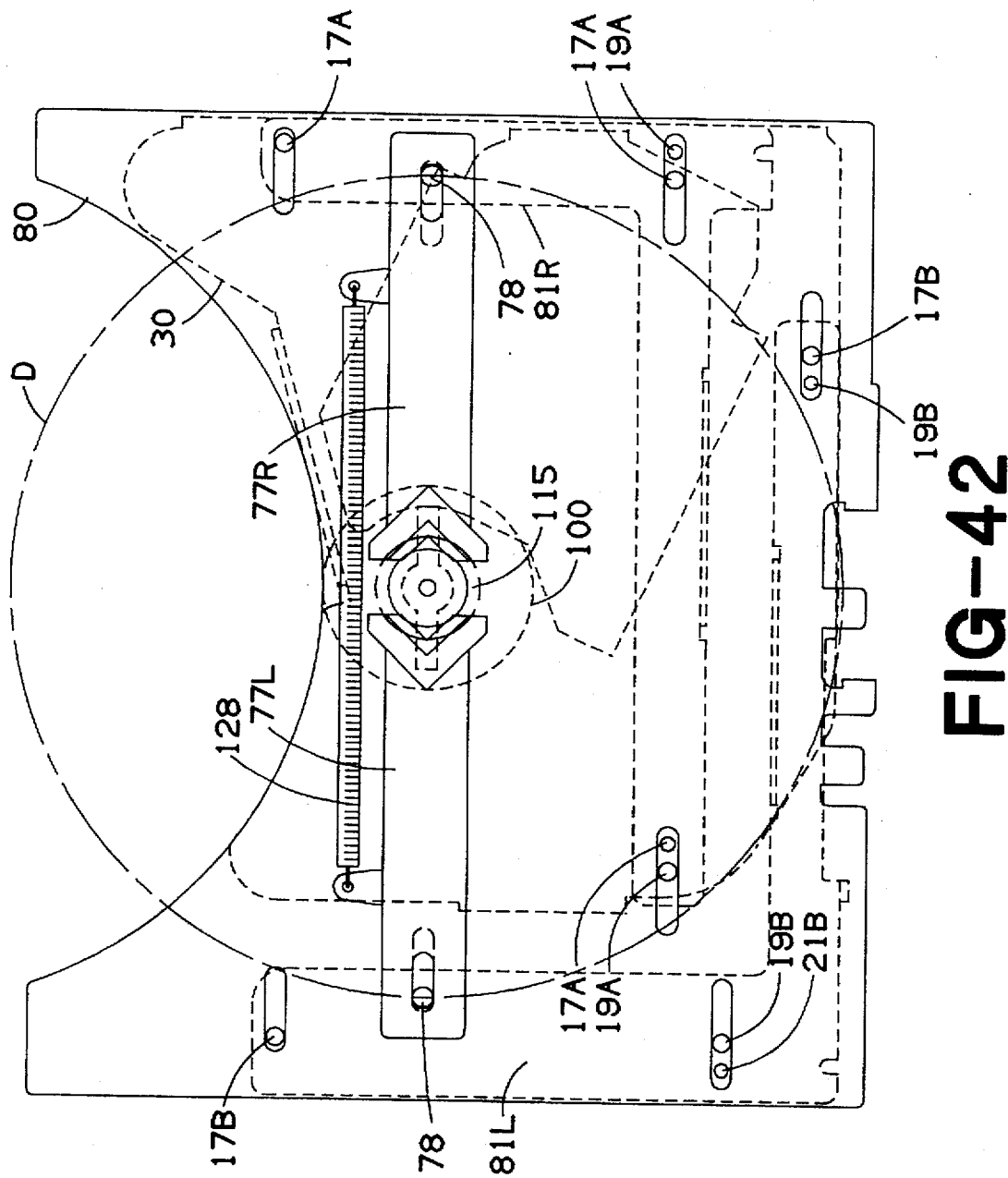
FIG. 42 is a top-view of the damper support mechanism in the standby by state.
Figure 43:
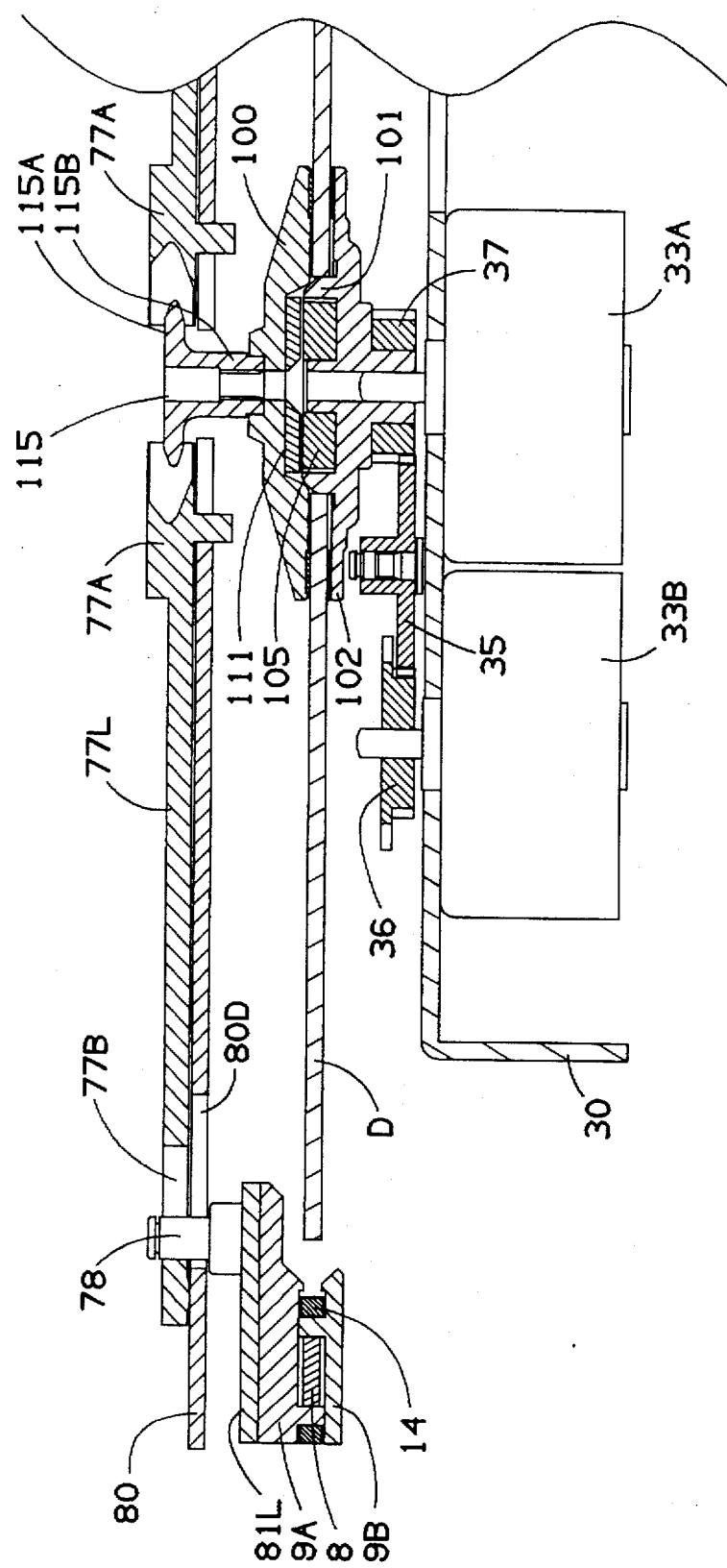
FIG. 43 is a schematic side-view of the damper support mechanism in the stand-by state.
Figure 44:
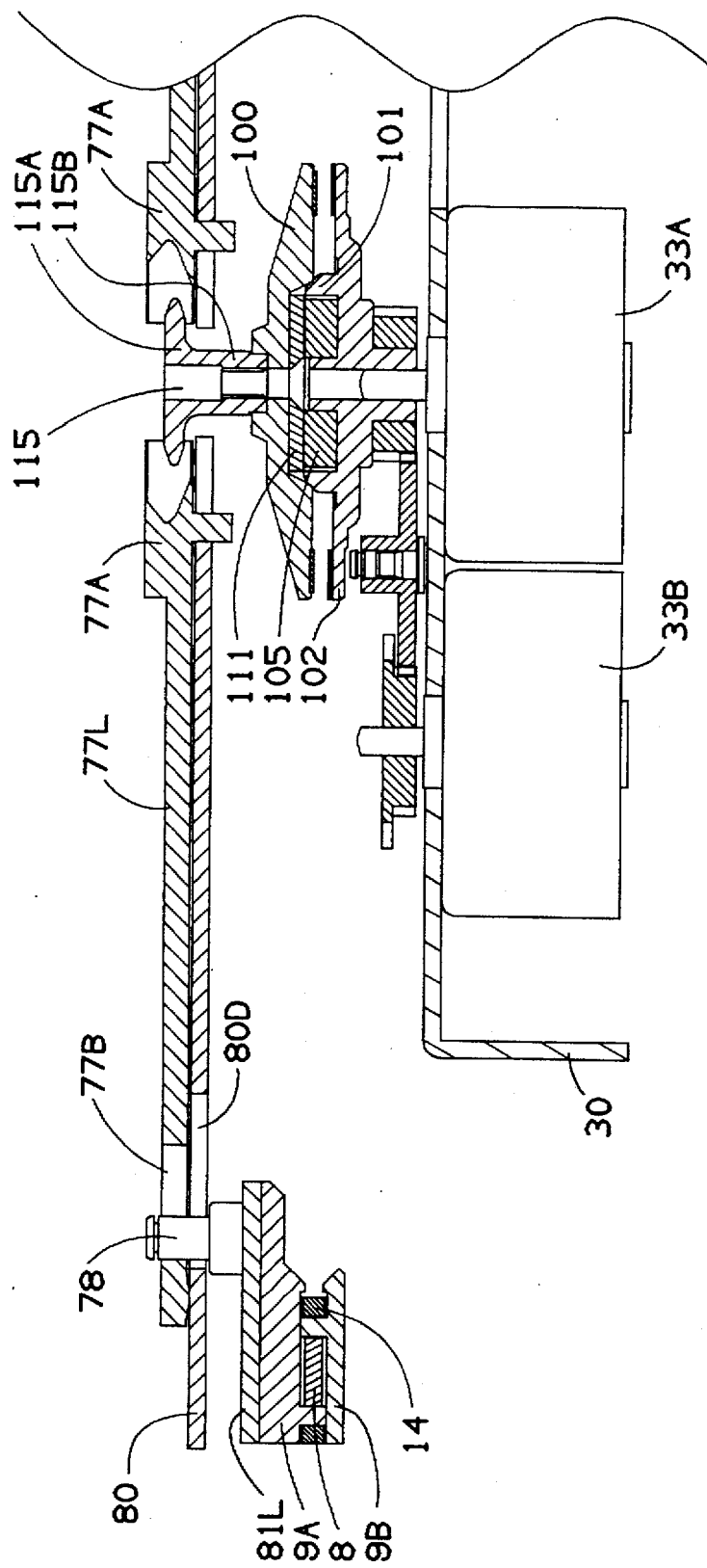
FIG. 44 is a schematic side-view of the damper support mechanism during vertical transfer of the stocker.

Referring now also to FIGS. 42–43, optical mechanism 1006 is raised to the up position. Next, loading plates 81L and 81R are separated (an open position, shown in FIGS. 42 and 43). In the open position, respective pins 78, 78 on loading plates 81L and 81R press against respective ends of guide grooves 77B, 77B spreading clamper holders 77L and 77R apart against the force of spring 128. This causes supports 77A, 77A to release flange 115A. Clamper 1009 is then attracted to magnet 105 of turntable 102 clamping disk D between turntable 102 and clamper 1009. Loading plates 81L and 81R are brought to the open position (POS.4) even after disk D has been moved to the stock position so that the stocker can be moved up and down. When this happens, since no disk D is present on turntable 102 in the up position, clamper 1009 is attracted to magnet 105, and rests on centering cone 101 of turntable 102, as shown in FIG. 44.

Figure 50:
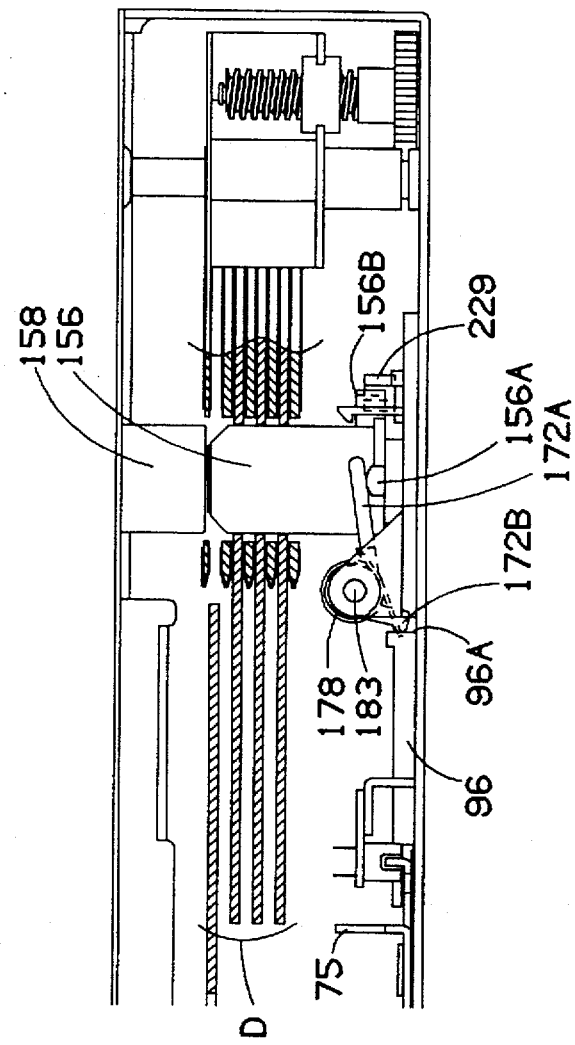
FIG. 50 is a schematic side-view of the disk-lock mechanism with sliding plate 75 in position UP-1.

Referring to FIGS. 2 and 50, a shutter piece 77L' on clamper holder 77L indicates clamp errors the outer perimeter position of loading plates 81L and 81R. An optical sensor 234, on loading chassis 80, detects the position of shutter piece 77L'. Optical sensor 234 generates a loading plate outermost position detection signal ($\overline{OUT}$) which is at a high level H when supports 77A, 77A are tightly held together around flange 115A and at a low level (L) when supports 77A, 77A are moved apart.

Stocker

Figure 11:
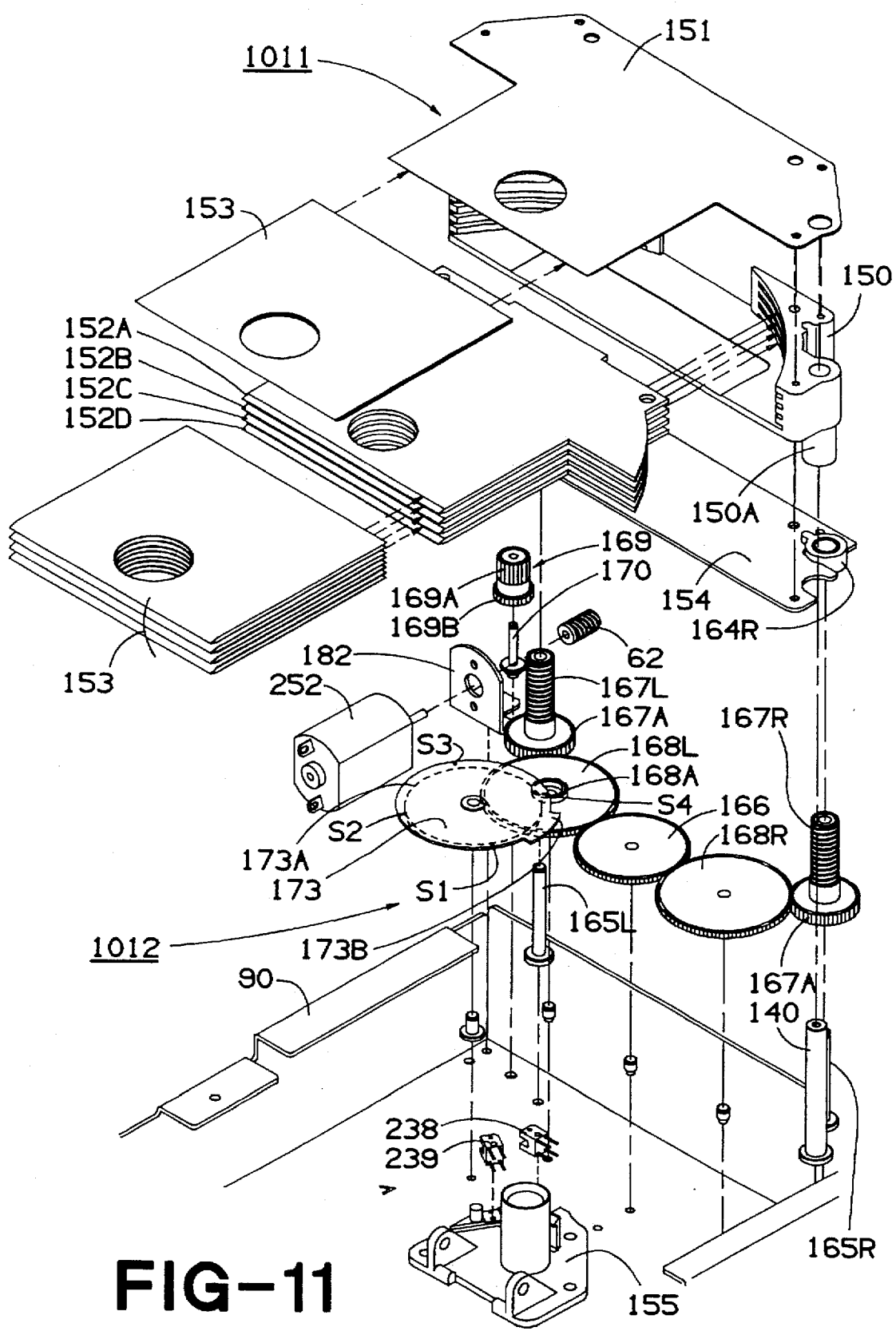
FIG. 11 is an exploded view of a stocker and stocker vertical transfer mechanism.
Figure 12:
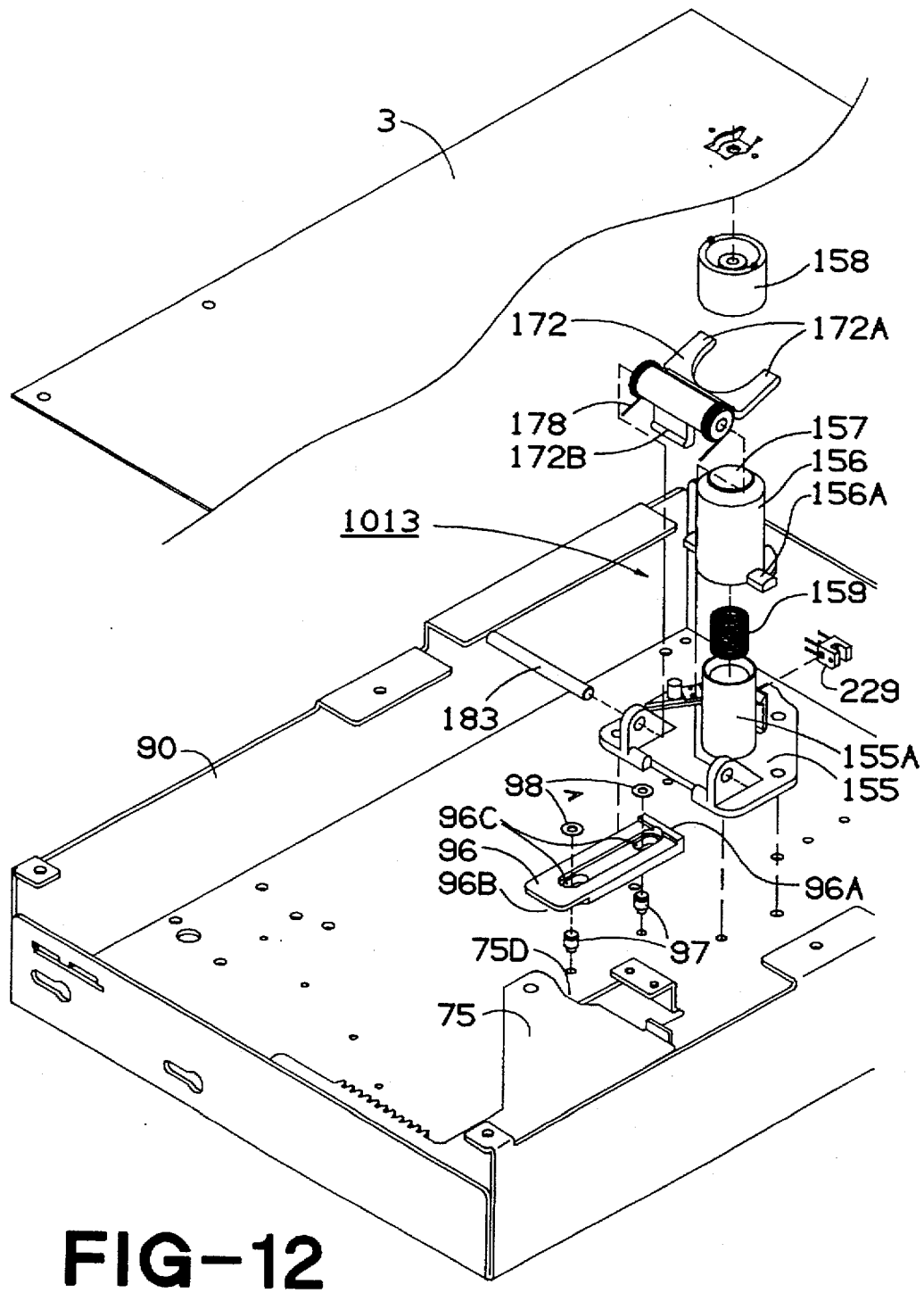
FIG. 12 is an exploded view of a disk lock mechanism according to an embodiment of the present invention.

Referring to FIG. 11, a stocker 1011 is generally defined by a top plate 151, a base plate 154, and a stocker body 150. Stocker plates 152A–152D are insertably affixed in respective slits of stocker body 150. Sheets 153, of the non-woven cloth, the same used as a case lining to protect floppy disks, are adhesively bonded to top and bottom surfaces of stocker plates 152A–152D and top plate 151. Sheets 153 are folded and wrapped around forward ends of stocker plates 152A–152D and top plate 151. Stocker 1011 removably supports a total of four disks (not shown in the drawing) at a pitch of 3 mm between top plate 151 and stocker plate 152D. A first stored disk is inserted between top plate 151 and stocker plate 152A. A second stored disk is stored between stocker plates 152A and 152B. A third stored disk is stored between stocker plates 152B and 152C. A fourth stored disk is stored between stocker plates 152C and 152D. Sheets 153 provide cushioning and low frictional drag, and thereby serve to protect disks D during insertion into the spaces between stocker plates 152A–D. The spacing between adjacent ones of stocker plates 152A–15D is slightly wider, but substantially the same size as disk D. Each of stocker plates 152A–D has a width, perpendicular to the path of insertion disk d follows moving into and out of stocker 1011, that is smaller than the diameter of disk d. This insures that timing belt 14 and friction belt 12 can engage opposite edges of disk d at all times moving into and out of the stocker 1011.

A shaft 140, projecting upwardly from main chassis 90, is inserted in a bearing 150A to guide stocker 1011 along a vertical path of movement. Nuts 164L, 164R (nut 164L is hidden in the drawing) engage screws 167L, 167R that rotate on shafts 165L, 165R, respectively, projecting upwardly from main chassis 90. Thus, rotation of screws 167L, 167R moves stocker 1011 vertically. A stocker vertical transfer mechanism 1012, located below stocker 1011, drives screws 167R, 167L. A motor 252, supported by bracket 182 on main chassis 90, has a rotating shaft with a press-fitted worm gear 62. A gear member 169, rotatably supported by shaft 170, has a gear 169A, on an upper portion thereof, that meshes with worm gear 62. A gear 169B on a lower portion of gear member 169 meshes with a gear 167A attached to screw 167L. Gear 167A meshes with a gear 168L. Gear 168L meshes with a gear 166 which in turn meshes with a gear 168R. Gear 168R meshes with a gear 167A attached to screw 167R. Clockwise rotation of screws 167R and 167L lowers stocker 1011, and counterclockwise rotation of screws 167R and 167L raises stocker 1011.

A shutter member 173 rotates on a shaft projecting upwardly from main chassis 90. Shutter member 173 has a gear 173A, on its lower surface, that meshes with a gear 168A coaxially connected to gear 169L. Rotation of shutter member 173 is detected by optical sensors 238 and 239 and used to determine the vertical movement and position of stocker 1011. A shutter piece 173B projects from an edge of shutter member 173 and slits S1–S4 in shutter member 173 divide shutter member 173 at 90 degree intervals. Shutter piece 173B and slits S1–S4 are detected by optical sensors 238 and 239, respectively, on a disk lock base 155.

Optical sensor 238 generates a stocker reference position signal ($\overline{S.REF}$), when shutter piece 173B interrupts a light beam generated and detected by optical sensor 238. Signal $\overline{S.REF}$ goes high when stocker 1011 is brought to a position above disk holding position POS(1). POS(1) of stocker 1011 corresponds to an alignment of the disk-holding space between top plate 151 and stocker plate 152A with a disk transfer position.

Optical sensor 239 generates a stocker position signal ($\overline{S.POS}$). Each time stocker 1011 passes one of positions POS(1)–POS(4), the signal goes low (L). Thus, position POS(1) is detected by moving the stocker downward until signal $\overline{S.POS}$ goes low (L) after signal $\overline{S.REF}$ goes high (H). The remaining positions POS(2), POS(3), and POS(4) are detected moving stocker 1011 further and counting second, third, or fourth changes in signal $\overline{S.POS}$, respectively.

Disk Lock Mechanism

Figure 45:
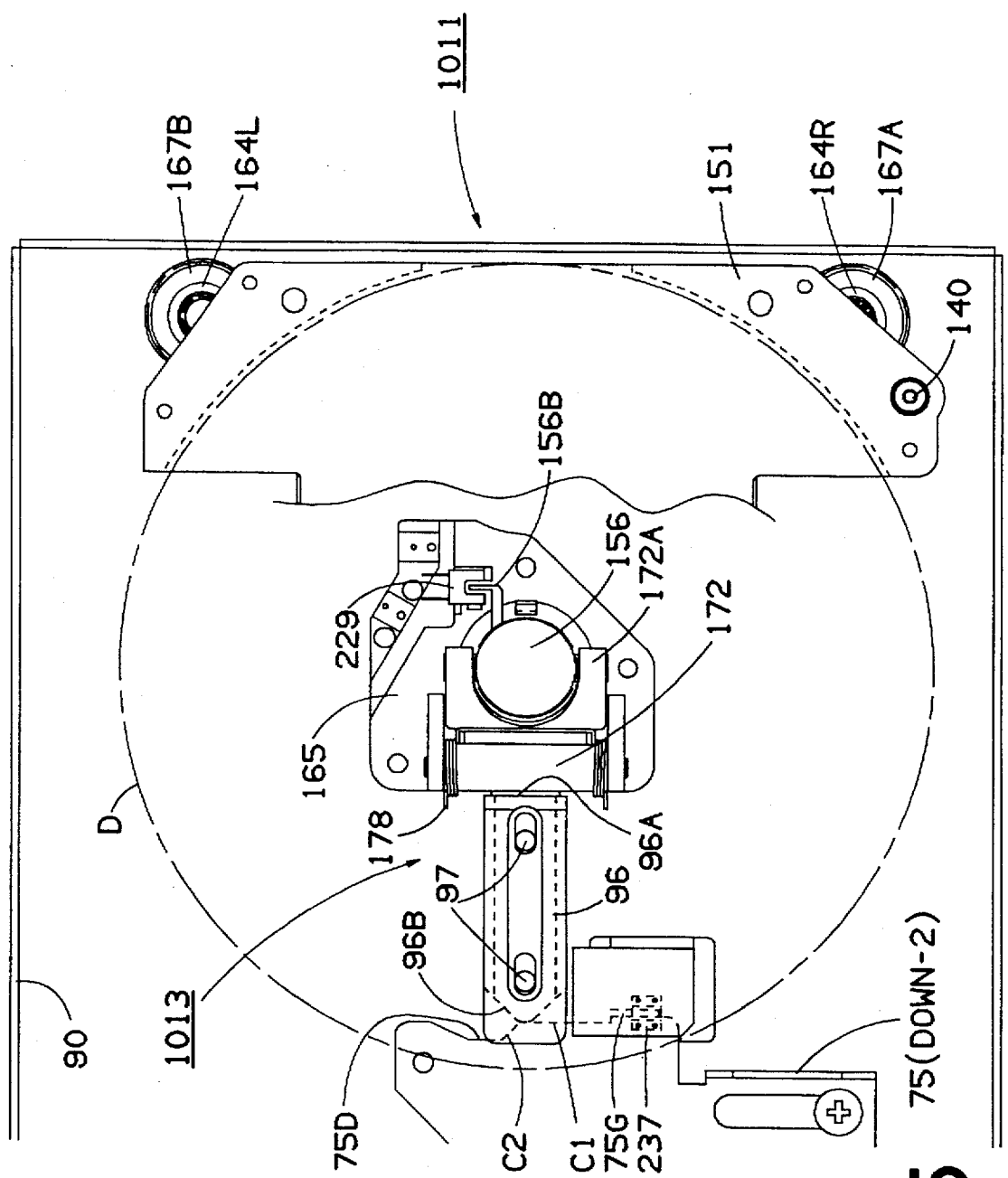
FIG. 45 is a top-view of the disk lock mechanism with sliding plate 75 in position DOWN-1.
Figure 46:
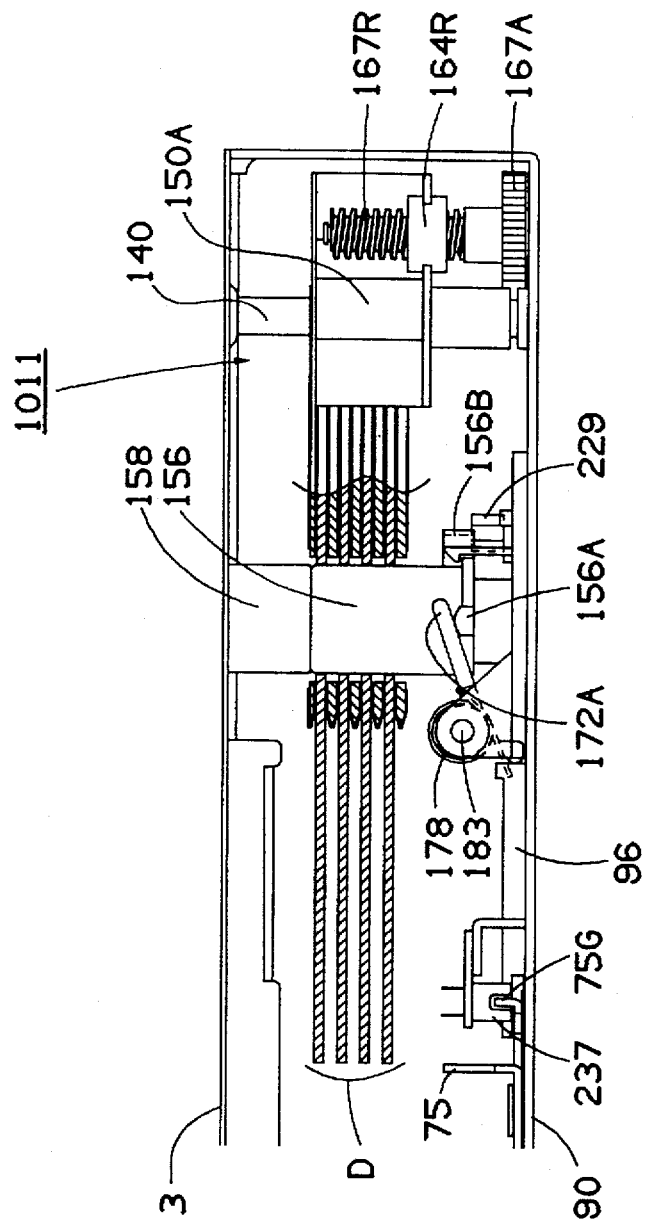
FIG. 46 is a schematic side-view of the disk lock mechanism with sliding plate 75 in position DOWN-1.
Figure 47:
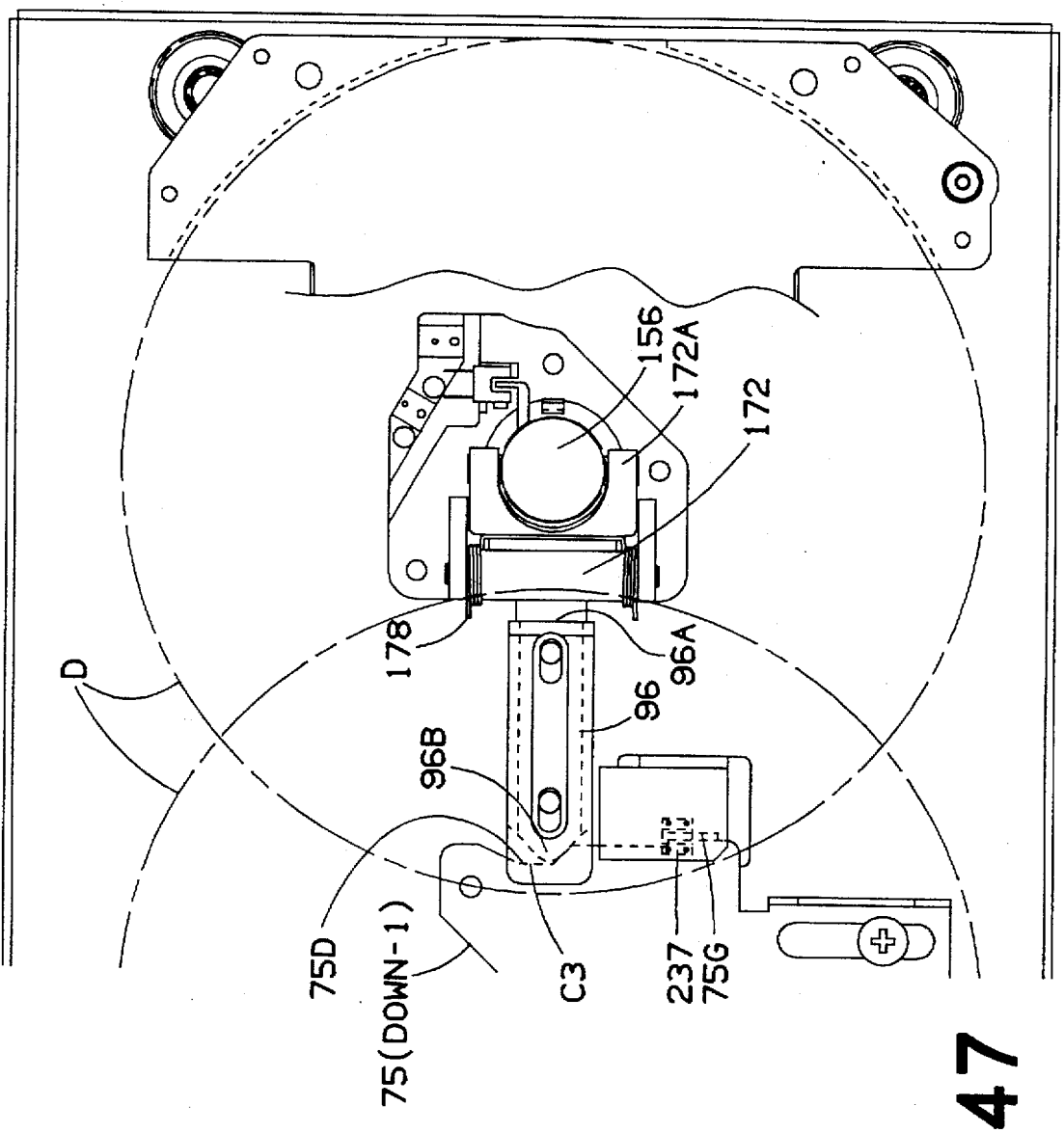
FIG. 47 is a top-view of the disk-lock mechanism with sliding plate 75 in position DOWN-2.
Figure 48:
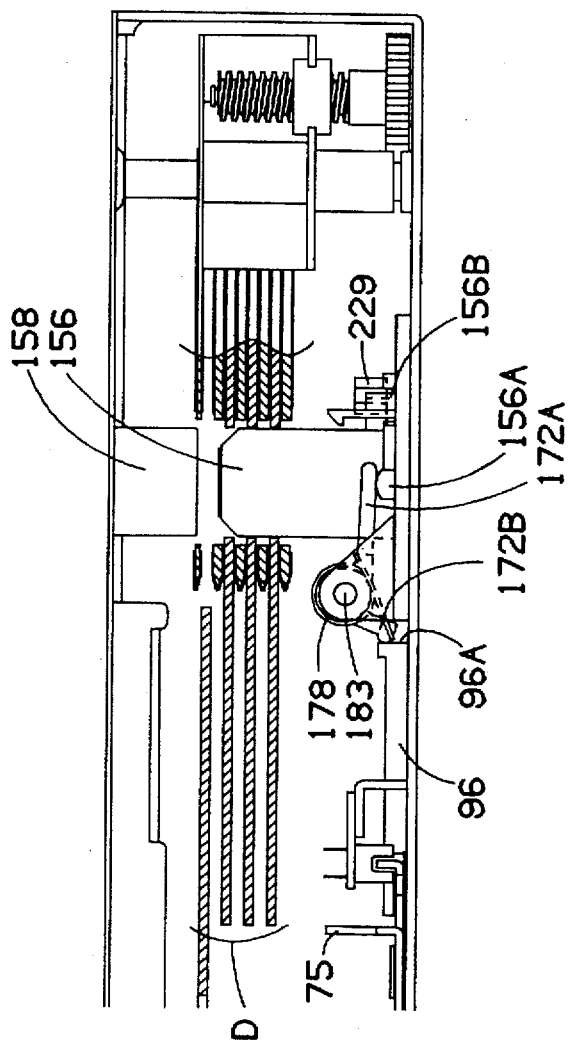
FIG. 48 is a schematic side-view of the disk-lock mechanism with sliding plate 75 in position DOWN-2.
Figure 49:
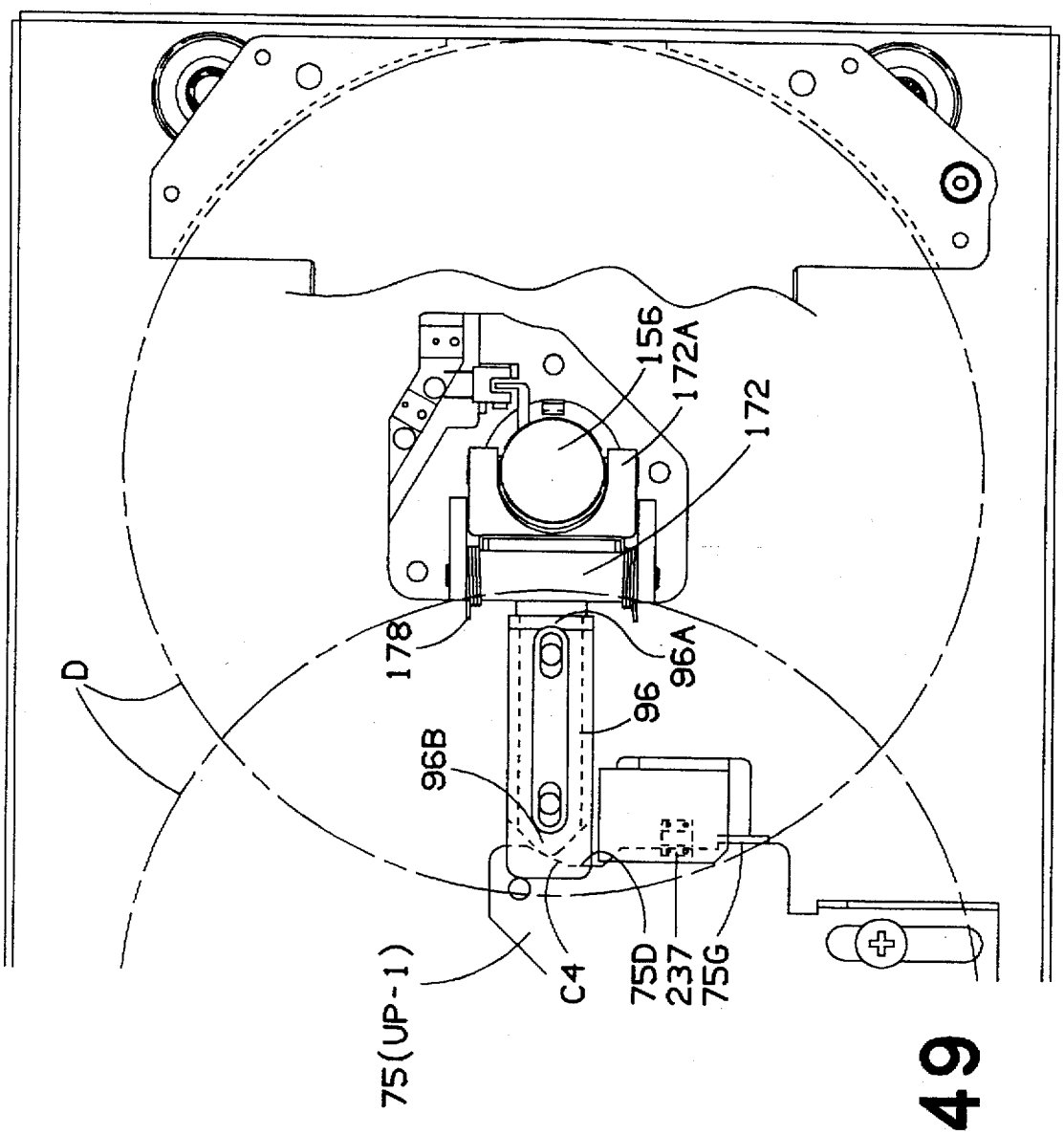
FIG. 49 is a top-view of the disk-lock mechanism with sliding plate 75 in position UP-1.

Referring to FIGS. 12, 45–48, a disk lock mechanism 1013, prevents disks, held in stocker 1011, from moving out of stocker 1011. An upper disk lock shaft 158 projects downwardly from a lower surface of top cover 3. Upper disk lock shaft 158 passes through spindle holes of disks stored in stocker 1011. A lower end of upper disk lock shaft 158 extends to a position slightly (0.8 mm) above an upper surface of a disk D being transported into stocker 1011 as shown in FIGS. 47 and 48. Upper disk lock shaft 158 prevents movement of the disks above the disk D being transported. FIGS. 46 and 48 show the stocker in position POS(1). Upper disk lock shaft 158 does not pass through any of the disk spindle holes within stocker 1011. A lower disk lock shaft 156 projecting upward from main chassis 90 is coaxially aligned with upper disk lock shaft 158.

Lower disk lock shaft 156 rides on a shaft 155A of disk lock base 155 permitting lower disk lock shaft 156 to move vertically. Lower disk lock shaft 156 moves between a lock position and an unlock position. In the lock position, a tapered upper end of lower disk lock shaft 156 fits into upper disk lock shaft 158 (see FIG. 46). In the unlock position, lower disk lock shaft 156 is lowered away from upper disk lock shaft 158, creating a gap between upper and lower disk lock shafts 158 and 156 through which a disk can pass (see FIG. 48). A spring 159 inside lock shaft 156 applies an upward force on lower disk lock shaft 156. A sheet 157, of compressed urethane, is attached to the upper surface of lower disk lock shaft 156 to help avoid possible disk damage.

To raise and lower lower disk lock shaft 156, disk lock mechanism 1013 includes a lock release arm 172 rotatably supported by a shaft 183 of disk lock base 155. Lock release arm 172 has a pressing portion 172A that engages upper surfaces of projections 156A at a base of lower disk lock shaft 156. Spring 178 applies a clockwise rotating force to lock release arm 172 sufficient to overcome the force of spring 159 thereby forcing lower disk lock shaft 156 to its lowermost position. A relay plate 96 moves toward the front and rear guided by integral guide grooves 96C, 96C that engage pins 97 on main chassis 90. A rear-facing surface 96A of relay plate 96 pushes against an engagement portion 172B of lock release arm 172 to rotate lock release arm 172 counterclockwise against the force of spring 178. An engagement portion 96B on a lower surface of relay plate 96 engages with a cam surface 75D, having surfaces C1–C5, on an edge of sliding plate 75 (visible in FIGS. 45, 47, 49, and 51).

Referring now to FIGS. 12 and 45–52, lower disk lock shaft 156 is positioned responsively to the position of sliding plate 75. When sliding plate 75 is in a position DOWN-2, engagement portion 96B of relay plate 96 is engaged with surface C1 of cam surface 75D. In position DOWN-2, as shown in FIG. 46, lock release arm 172 is rotated to a position in which it exerts no downward force on lower disk lock shaft 156. Thus, in position DOWN-2, lower disk lock shaft 156 is seated in upper disk lock shaft 158, the lock position, held there by the force of spring 159.

When sliding plate 75 moves toward the right side of housing 1000 (toward the up position of optical mechanism 1006), engagement portion 96B of relay plate 96 follows sloped surface C2 of cam surface 75D, moving relay plate 96 toward the front of main chassis 90. As engagement portion 96B follows sloped surface C2, lock release arm 172 rotates clockwise under the urging of spring 178, forcing lower disk lock shaft 156 gradually downward. When sliding plate 75 reaches a position DOWN-1, shown in FIG. 47, engagement portion 96B of relay plate 96 rests on surface C3. Lock release arm 172 halts at the angle shown in FIG. 48, and lower disk lock shaft 156 is held at the unlock position, permitting disk transfer.

Figure 51:
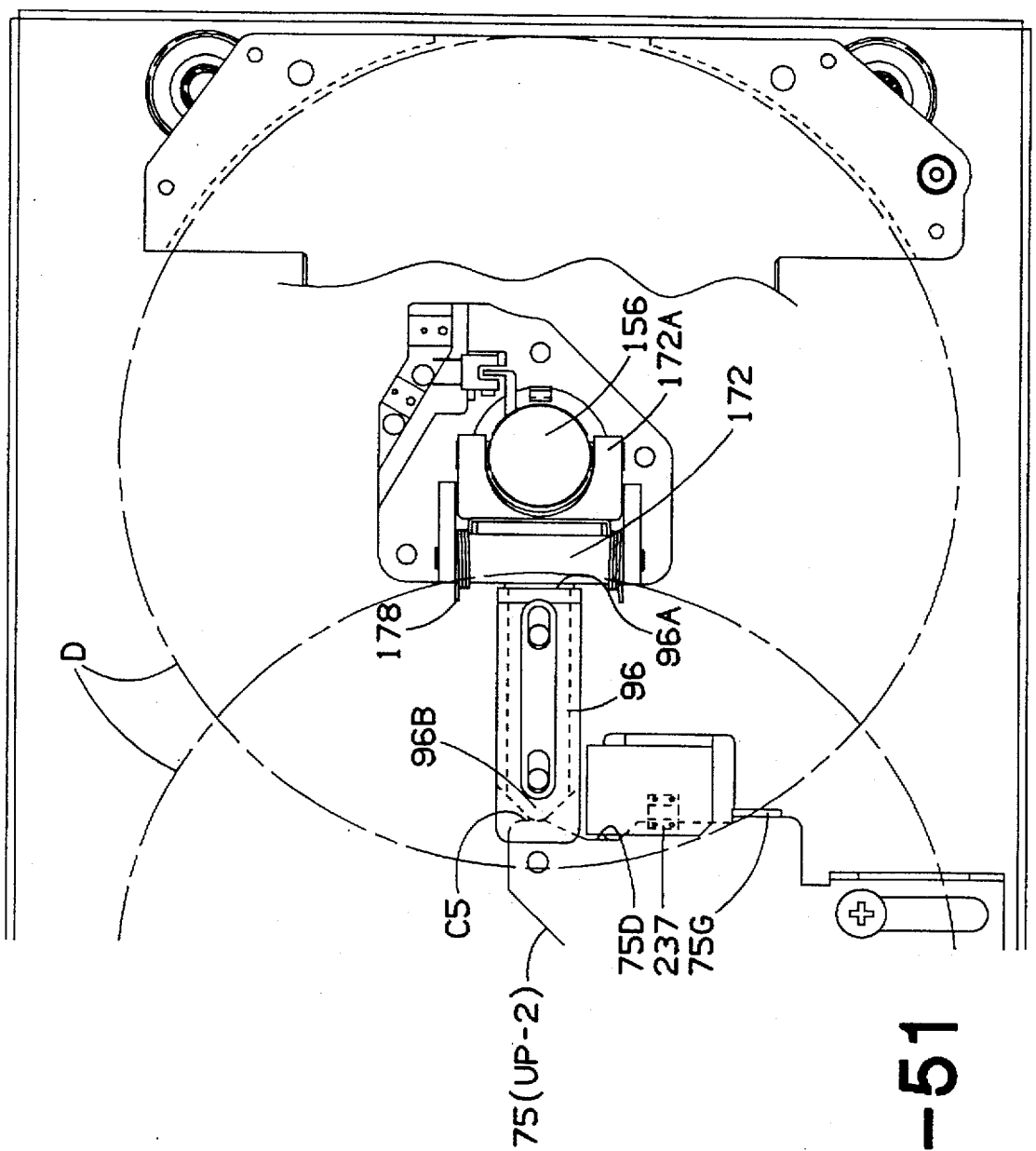
FIG. 51 is a top-view of the disk-lock mechanism with sliding plate 75 in position UP-2.
Figure 52:
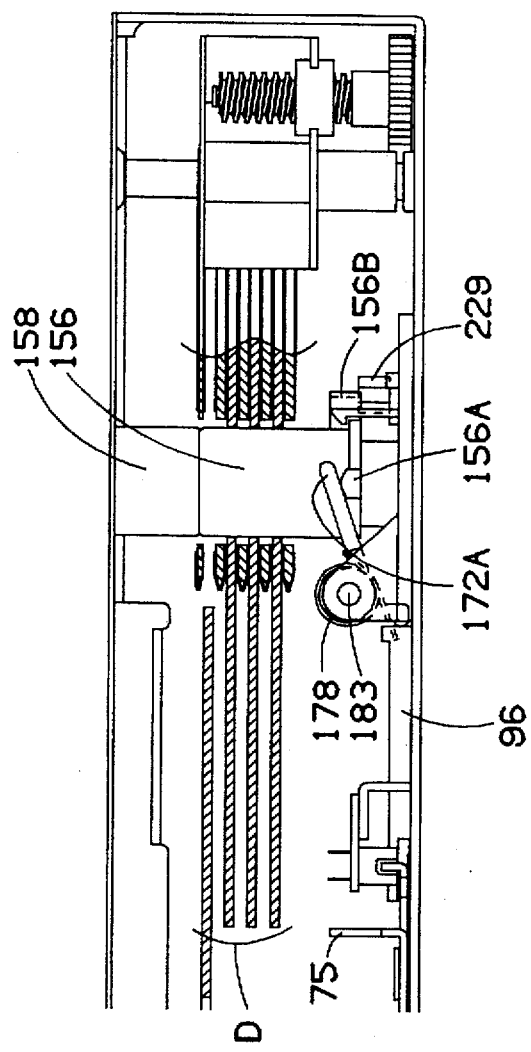
FIG. 52 is a schematic side-view of the disk-lock mechanism with sliding plate 75 in position UP-2.

As sliding plate 75 is translated further to the right side of housing 1000, engagement portion 96B of relay plate 96 is pushed rearward by inclined surface C4. Lock release arm 172 rotates counterclockwise, and lower disk lock shaft 156 begins moving upwardly under the urging of spring 159. When sliding plate 75 reaches a position UP-1, shown in FIG. 49, engagement portion 96B is held by the approximately central area of sloped surface C4, in which lower disk lock shaft 156 moves upward to the position indicated in FIG. 50. When sliding plate 75 reaches a position UP-2, engagement portion 96B engages with surface C5, which is aligned with surface C1. At this point, as shown in FIG. 51, lower disk lock shaft 156 has reached the lock position again, where it fits into upper disk lock shaft 158.

A shutter 156B, projecting from lower disk lock shaft 156, indicates when lower disk lock shaft 156 reaches the lock position. Shutter 156B interrupts a light beam generated and detected by an optical sensor 229, attached to disk lock base 155 when lower disk lock shaft 156 is at the unlock position. Optical sensor 229 generates a disk lock signal ($\overline{\text{D.LOCK}}$), which is high when lower disk lock shaft 156 in the unlock position. When sliding plate 75 is at position UP-2 or position DOWN-2, lower disk lock shaft 156 is at the lock position, as described above. However, if disk D is not positioned with its center hole aligned with lower disk lock shaft 156, lower disk lock shaft 156 is blocked by disk D, preventing it from reaching the lock position. If disk locking is not properly achieved, vibrations can cause disks to shift out of place within stocker 1011, possibly causing damage to the disks by lower and upper disk lock shafts 156 and 158 which move vertically within stocker 1011. Signal $\overline{\text{D.LOCK}}$ is used to detect such disk-locking errors.

Disk Insertion Error Prevention Mechanism

Referring to FIGS. 2 and 53–57, a disk insertion error preventing mechanism 1014 prevents errors during insertion of disk D. A shutter 120 rotates on a shaft 129 rotatably supported at either end by bends 80F, 80F projecting from loading chassis 80. Flaps 120A, 120A, projecting radially from an axis of rotation of shutter 120, block insertion aperture 1A on front panel 1. A pinion gear 120B, subtends a 180 degree arc about the axis of rotation of shutter 120. Material, such as felt or compressed urethane, is adhesively bonded to the surface of flaps 120A, 120A to prevent abrasion of the top surface of disk D, since the top surface of disk D engages flaps 120A during loading and ejecting operations.

A shutter arm 121 rotates on a shaft 122 on the lower surface of loading chassis 80. A spring 125 urges shutter arm 121 in a counterclockwise direction, as viewed from the top. A rack 121A on the bottom of shutter arm 121 meshes with pinion gear 120B. Thus, shutter 120 opens and closes responsively to the rotation of shutter arm 121. A pin 123, on the upper surface of the loading plate 81L, engages with side surface 121B of shutter arm 121 responsively to movement of plate 81L.

The angle of shutter 120 changes responsively to the position of loading plate 81L. When loading plates 81L and 81R are positioned at disk receiving position POS.1, pin 123 of loading plate 81L rotates shutter arm 121 clockwise against the urging of spring 125. The rotation of shutter arm 121 causes shutter 120 to rotate toward the outside of the device, moving it to the open position. This allows a disk to be inserted into insertion aperture 1A.

Figure 64:
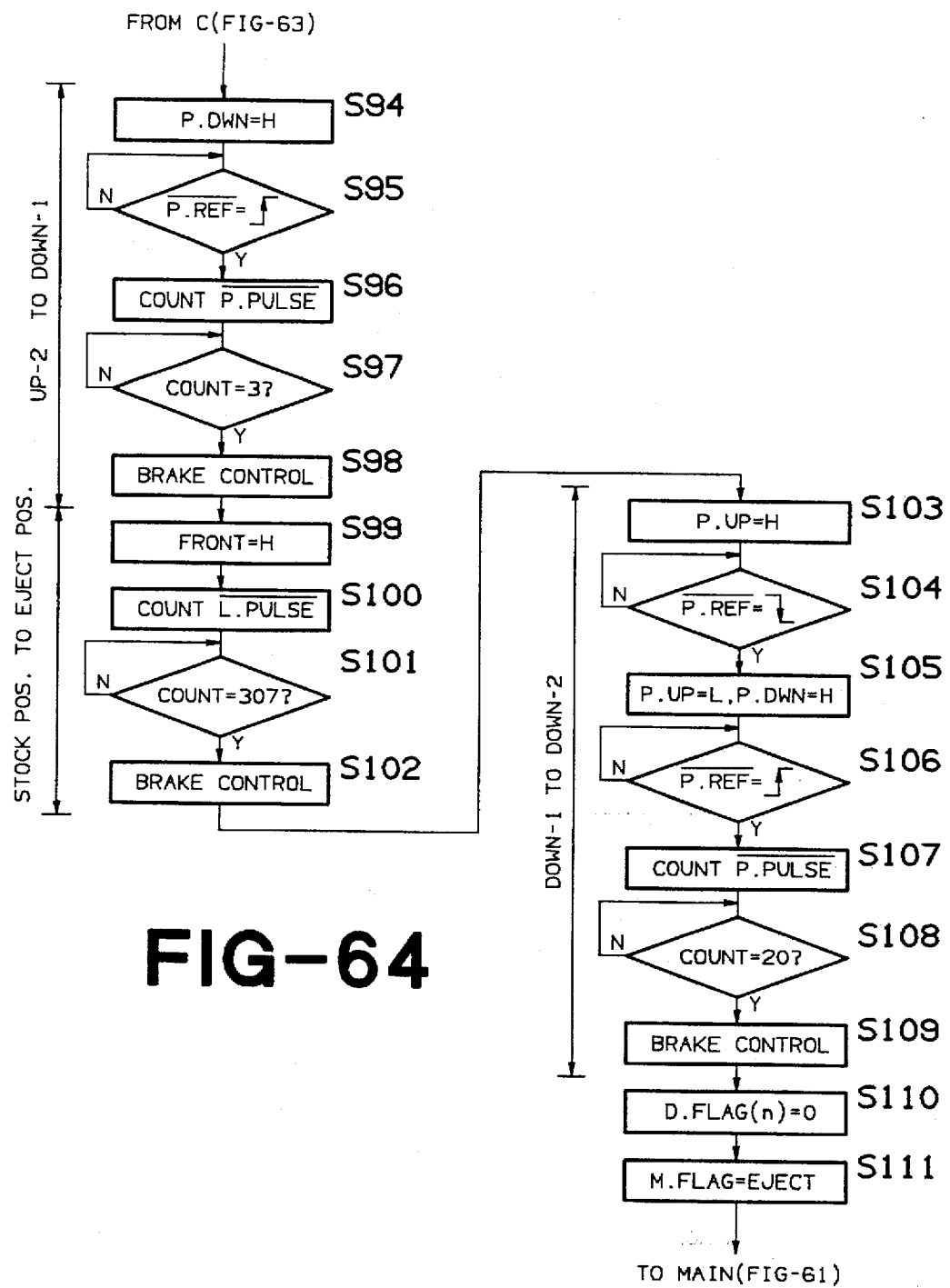
FIG. 64 is a flowchart of JOB EJECT.

The insertion of disk D causes loading plates 81L and 81R to separate. As loading plate 81L moves to the left side of housing 1000, pin 123 moves away from shutter arm 121 permitting spring 125 to rotate shutter arm 121 counterclockwise. As shutter arm 121 rotates, flaps 120A move downwardly until they rest on the top surface of disk D, as shown in FIG. 64. Pin 123 continues to move away from side surface 121B of shutter arm 121. Once disk D is driven by disk transfer mechanism 1001 completely inside the disk player, flap 120A is released to a close position in which shutter arm 121 is rotated counterclockwise to a position where its side surface 121B engages with bend 80F of loading chassis 80. When shutter 120 is in the close position, disk insertion through insertion aperture 1A is prevented. Shutter 120 cannot rotate past the close position in which flaps 120A point downwardly because an arm supporting rack 121A is supported by bend 80F, preventing further rotation of shutter 120. Thus, insertion of another disk is blocked.

A shutter piece 120C, on the upper part of shutter 120, interrupts a light beam generated by an optical sensor 235, on loading chassis 80, to detect the closure of shutter 120. The closure of shutter 120 is indicated by shutter close signal (S.CLOSE) generated by optical sensor 235. Signal S.CLOSE goes high when shutter 120 closes.

Figure 16:
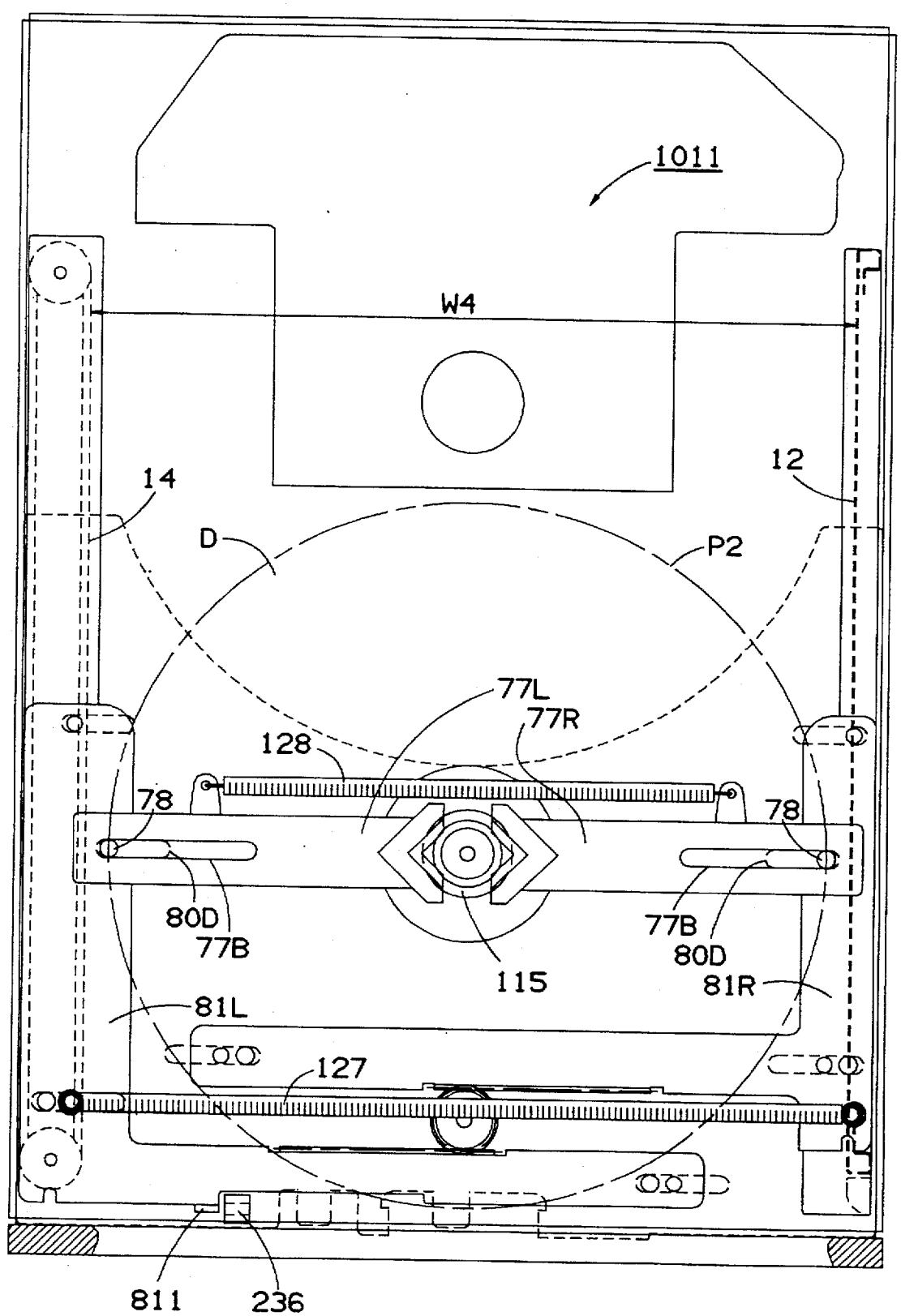
FIG. 16 is a top-view of the disk transfer mechanism in a stand-by state.
Figure 21:
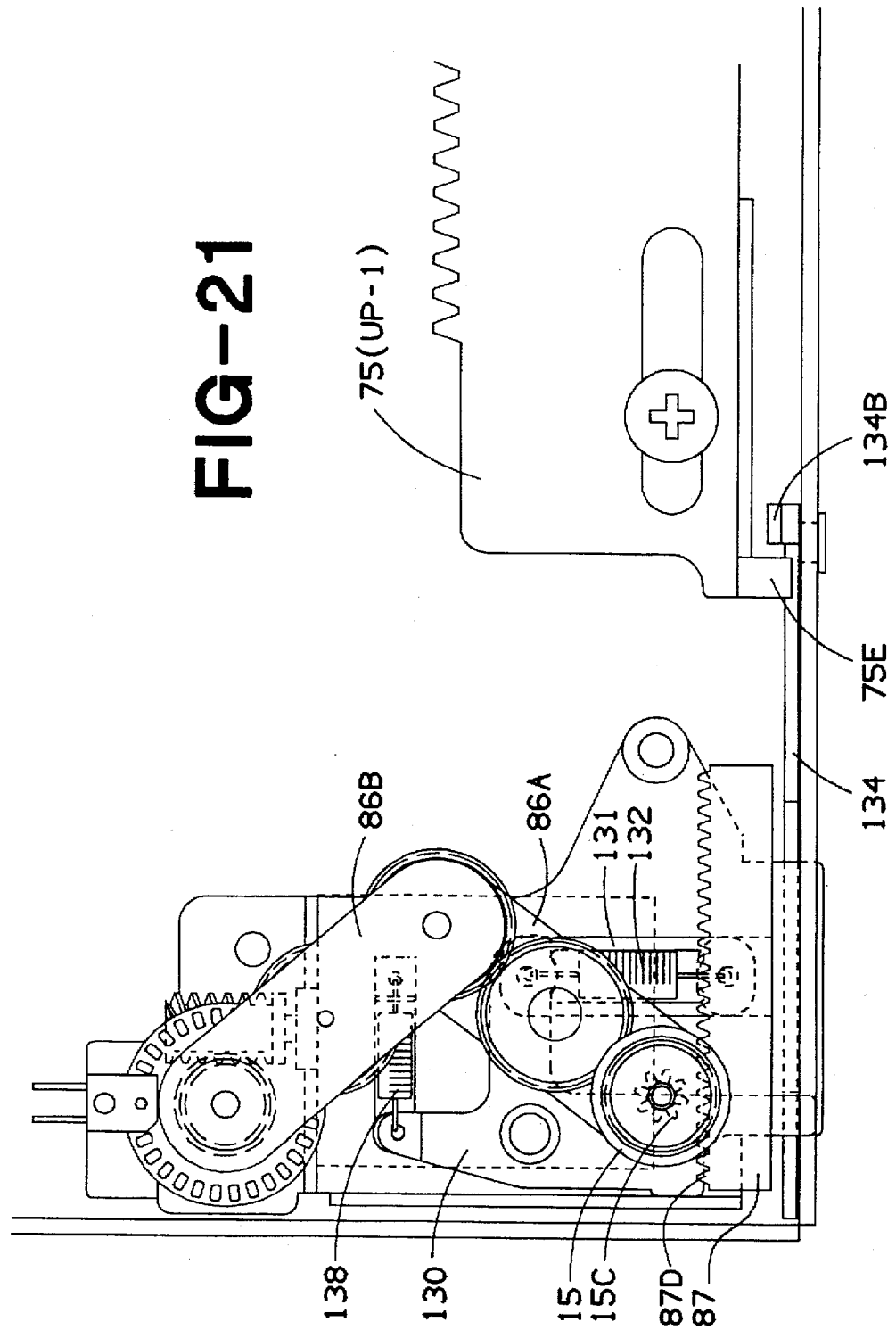
FIG. 21 is a top-view of the loading plate open/close mechanism with sliding plate in position UP-1.

Referring now also to FIGS. 7, 16, and 21 the change in signal S.CLOSE to high (H) serves as a reference position for disk transport within the disk player. The disk transfer position is determined by counting the number of pulses from the output (signal $\overline{\text{L.PULSE}}$) of optical sensor 232 described above. When disk D is inserted and transported to position P1, flap 120A falls away from the upper surface of disk D, closing shutter 120. This causes signal S.CLOSE to go high. The movement of disk D to play position P2 and stock position P3 are determined by counting pulses from signal $\overline{\text{L.PULSE}}$. For play position P2, six pulses are counted. For stock position P3, 160 pulses are counted.

Drive Control Circuit

Figure 60:
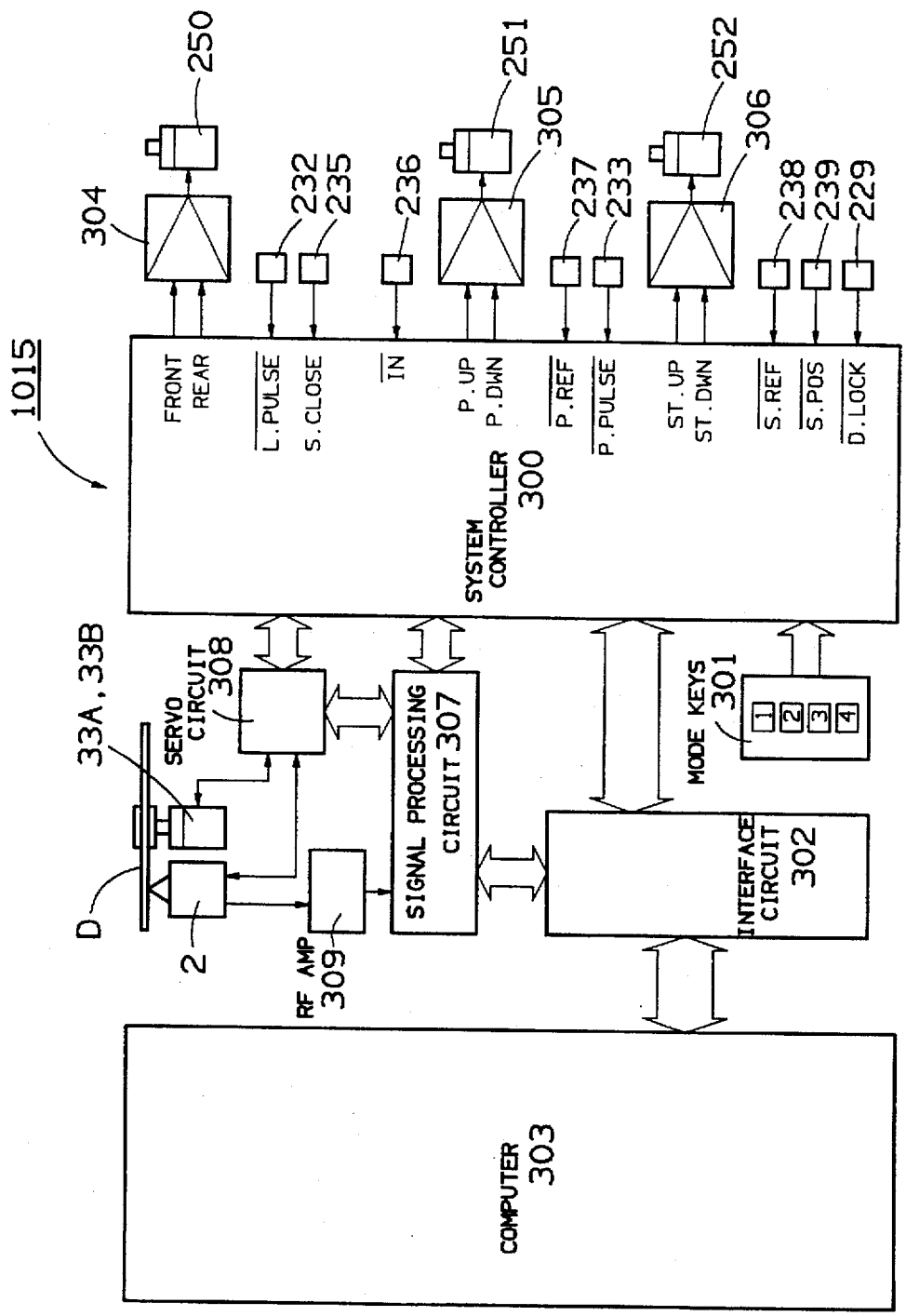
FIG. 60 is a block diagram of a drive control circuit.

Referring to FIG. 60, a drive control circuit 1015 includes a system controller 300 including ROM, RAM, an interface circuit and other elements with one or more microprocessors. Controller 300 is connected to mode keys 301, among them, a E/L key 1 through E/L key 4, which causes the device to eject and load disks D stored in positions 1–4 of the stocker, respectively. Controller 300 is also connected to a computer 303 via an interface circuit 302. Controller 300 controls mechanism operations corresponding to mode key entries and commands from computer 303 according to the flowcharts of FIGS. 61–71.

Controller 300 receives signal $\overline{\text{L.PULSE}}$, signal $\overline{\text{S.CLOSE}}$ and signal $\overline{\text{IN}}$, from optical sensors 232, 235 and 236, respectively. Based on these signals, controller 300 outputs a signal FRONT and a signal REAR to control motor drive circuit 304, thus controlling the disk transfer position and the opening and closing position of loading plates 81L and 81R. Motor drive circuit 304 is a drive circuit that generates a prescribed drive voltage for drive motor 250 in roller drive mechanism 1004 (see FIG. 7). When signal FRONT changes to "H", a drive voltage is output to rotate a timing pulley 15 counterclockwise. When signal REAR is "H", a drive voltage is generated to rotate motor 250 in the opposite direction. When both signals are "H", the output from motor drive circuit 304 is shorted and an electromagnetic brake is applied to motor 250. When both signals are "L", the output is placed in an open state.

Controller 300 also receives signals $\overline{\text{P.REF}}$ and $\overline{\text{P.PULSE}}$ from optical sensors 237, 233, respectively. Based on these signals, controller 300 outputs signal P.UP and signal P.DOWN to control the output of motor drive circuit 305 to control the position of sliding plate 75. Motor drive circuit 305 outputs a prescribed drive voltage to drive motor 251 of lift mechanism 1008 (FIG. 10). When signal P.UP is "H", a drive voltage is output to move sliding panel 75 in the up direction (to the right of the device). When signal P.DOWN is "H", a drive voltage is output to move the panel in the opposite direction. When both signals are "H", the output from motor drive circuit 305 is shorted and an electromagnetic brake is applied to motor 251. When both signals are "L", the output is placed in an open state.

Controller 300 also receives signal $\overline{\text{S.REF}}$, signal $\overline{\text{S.POS}}$ and signal $\overline{\text{D.LOCK}}$, from optical sensors 238, 239 and 229, respectively. Based on these signals, controller 300 outputs signal ST.UP and signal ST.DOWN, which control the output from motor drive circuit 306, which moves stocker 1011 vertically. Motor drive circuit 306 is a drive circuit which generates a prescribed drive voltage to drive motor 252 of stocker vertical transfer mechanism 1012 (FIG. 11). When signal ST.UP is "H", a drive voltage is output to move stocker 1011 upward. When signal ST.DOWN is "H", a drive voltage to move the stocker in the reverse direction is output. When both signals are "H", the output from motor drive circuit 306 is shorted, and an electromagnetic brake is applied to motor 252. When both signals are "L", the output is placed in an open state. When the power supply is off, controller 300 is connected to a backup power supply not shown in the drawing so that the flags in memory indicating stocker position, presence of disks and disk sizes are saved.

The read signal read by optical pickup 2 is sent to a signal processing circuit 307 via an RF amp 309. After EFM demodulation, deinterleaving, error correction and other related processes are performed, the signal is sent to computer 303, which is connected externally, via an interface circuit 302. Based on a servo error signal obtained from optical pickup 2, servo circuit 308 controls the focus servo, tracking servo and feed servo of optical pickup 2, and a light beam follows the data tracks on disk D. Signal processing circuit 307 and servo circuit 308 are connected to controller 300, and control operations are performed based on the operating mode.

Description of Operations

Referring to the flowcharts in FIG. 61–FIG. 71, the operation of an embodiment of the invention are defined by flowcharts. In the flowcharts, "n" refers to a memory indicating the number of the position (1 through 4) in the stocker, and is set according to the stocker position. D.FLAG (n) are flags that indicate the presence of disks in the holding positions POS(1)POS(4) of the stocker. For example, if D.FLAG(1) is set to "1", this indicates that a disk is stored in holding position POS(1), the topmost level of the stocker. M.FLAG indicates the operating mode of the device. Referring to FIG. 13, M.FLAG is set to "READY" when in the disk receiving state. Referring to FIG. 18, when disk D is brought to the eject position, M.FLAG is set to "EJECT". Referring to FIG. 15, when disk D is clamped and loading plates 81L, 81R are brought to the open position, M.FLAG is set to "STAND-BY". Referring to FIG. 17, M.FLAG is set to "STOCK" when the disk is moved to the stock position and loading plates 81L, 81R are moved to the open position. Also, in the stand-by state, M.FLAG is set to "PLAY" when disk playback is commenced.

The following describes the operating states of the present embodiment for each of the above operating modes.

Disk Receiving State (M.FLAG=READY)

(1) Disk transfer mechanism 1001 is in the disk receiving state, and loading plates 81L, 81R are brought to disk receiving position POS.1 (see FIG. 13).

Figure 19:
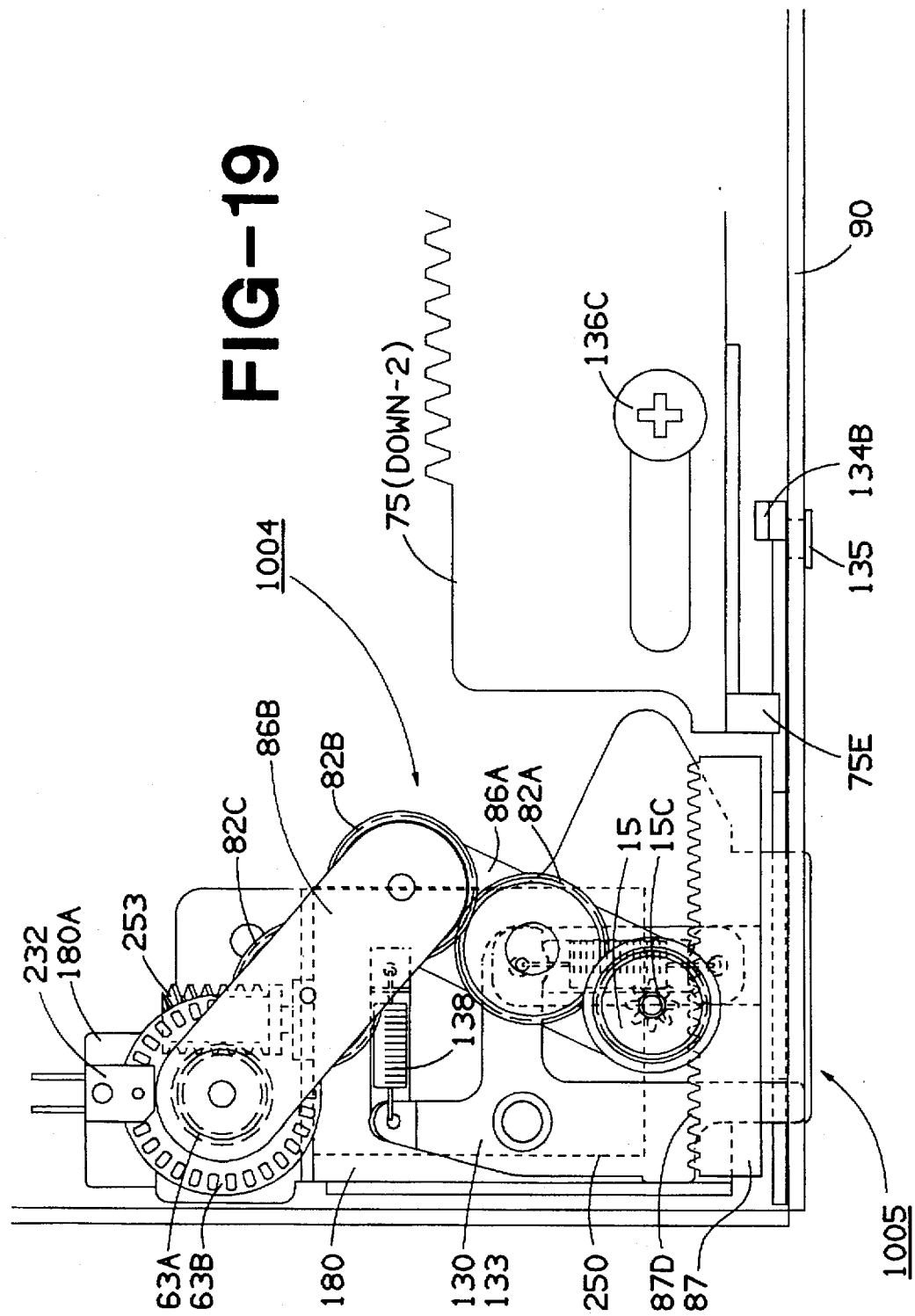
FIG. 19 is a top-view of the loading plate open/close mechanism during a disk-receiving state.
Figure 20:
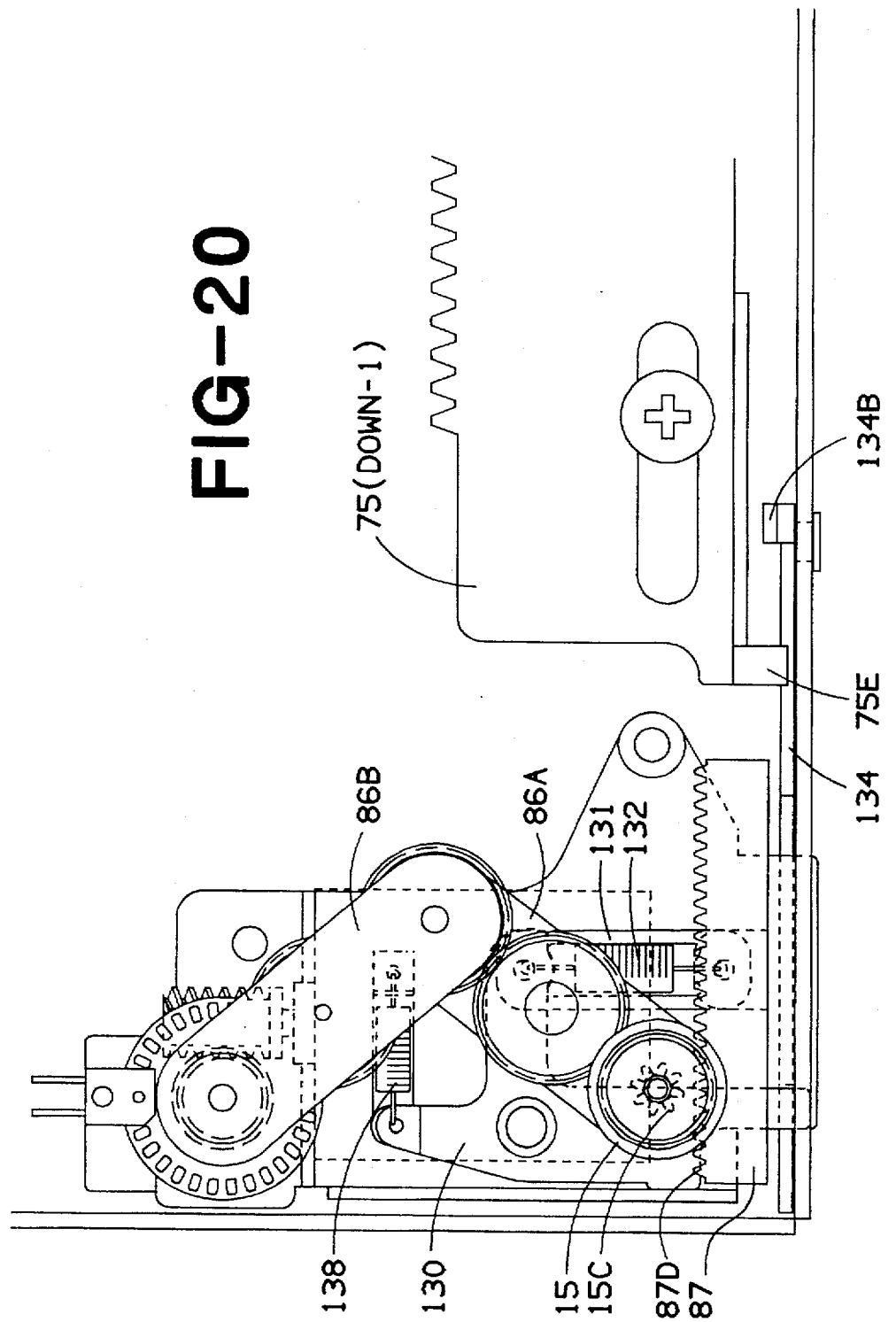
FIG. 20 is a top-view of the loading plate open/close mechanism during a disk transfer state.

(2) Loading plate opening/closing mechanism 1004 is in an off state, and rack member 87 is moved away from timing pulley 15 (see FIG. 19).

Figure 24:
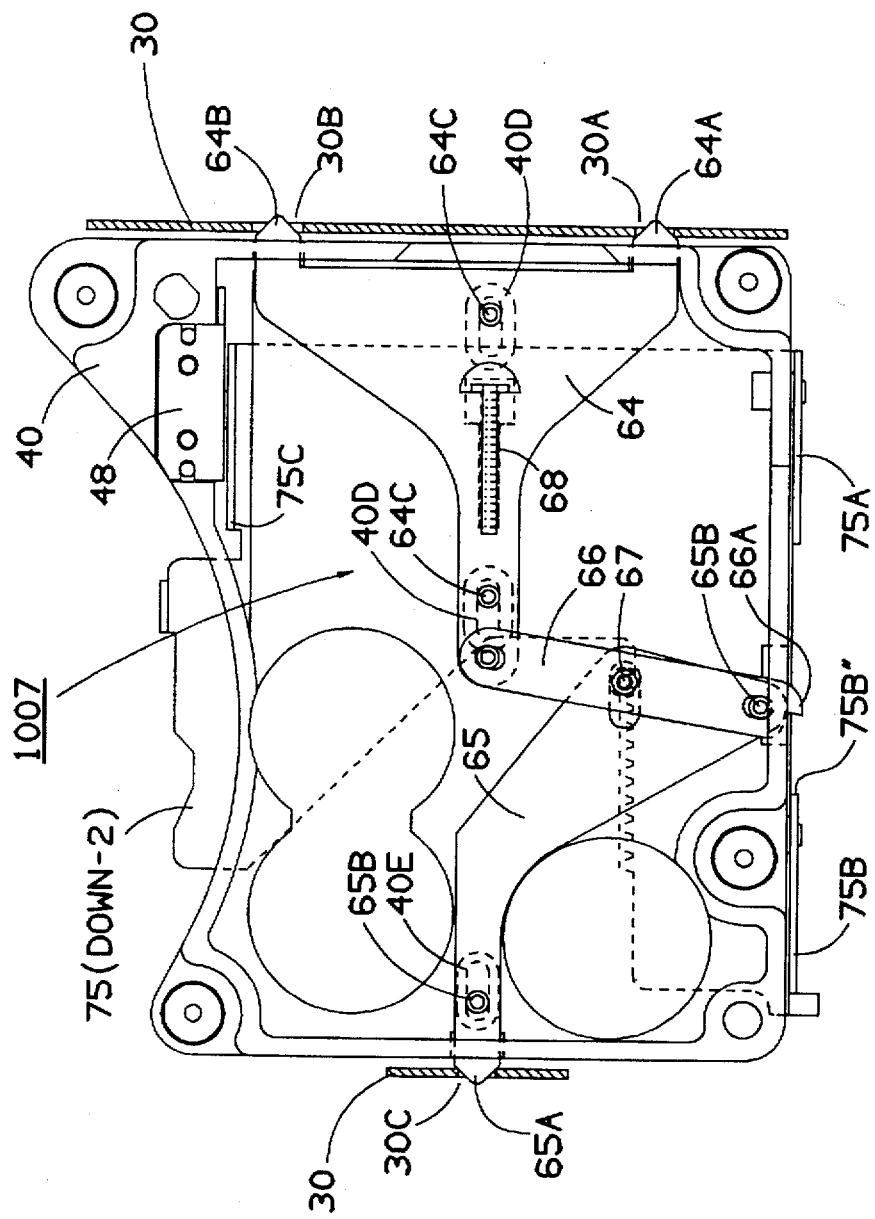
FIG. 24 is a top-view of a damper lock mechanism with a sliding plate in position DOWN-2.
Figure 25:
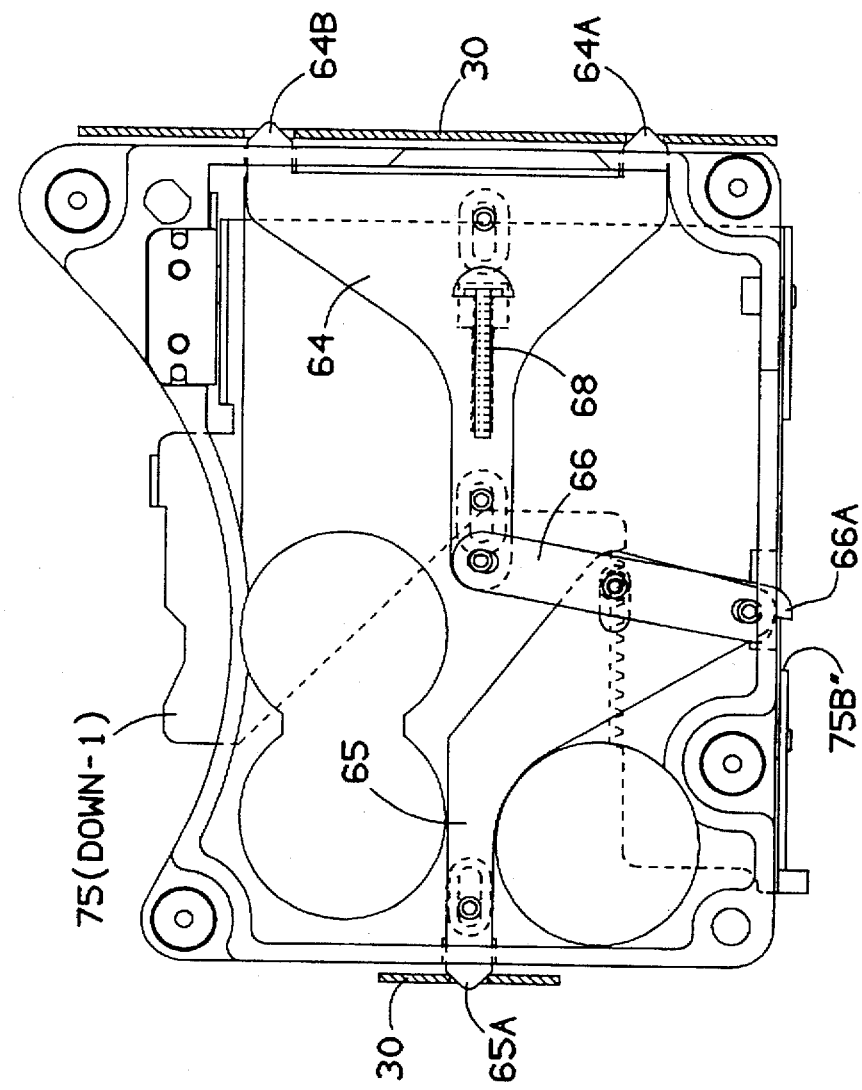
FIG. 25 is a top-view of the damper lock mechanism at a point where the sliding plate in a position DOWN-1.
Figure 26:
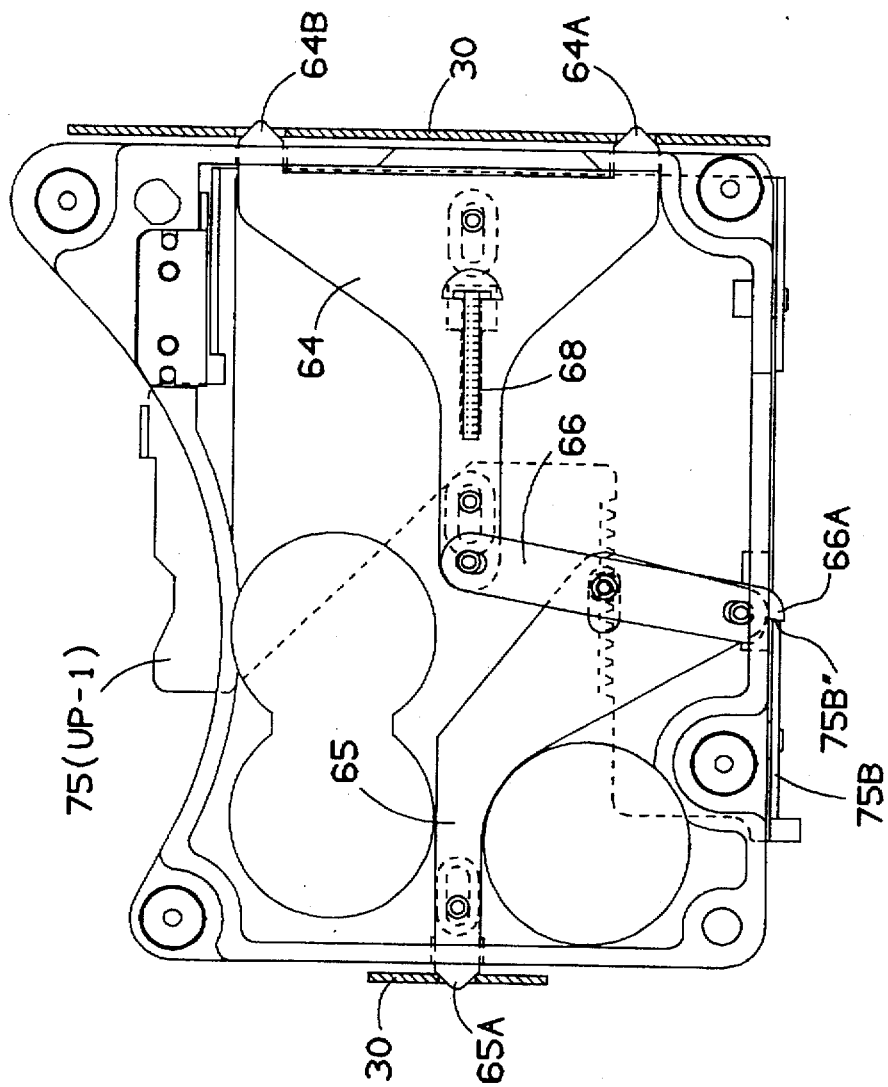
FIG. 26 is a top-view of the damper lock mechanism at a point where the sliding plate in a position UP-1.
Figure 27:
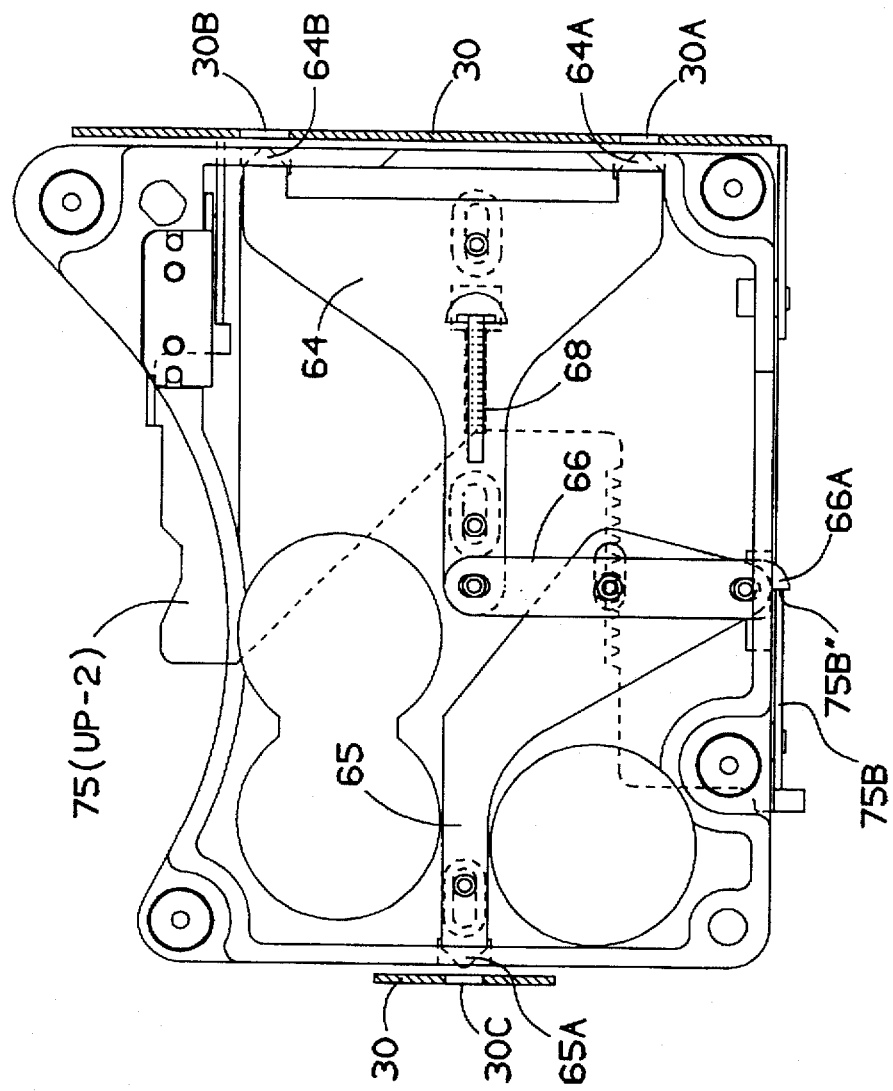
FIG. 27 is a top-view of the damper lock mechanism with sliding plate 75 in position UP-2.
Figure 28:
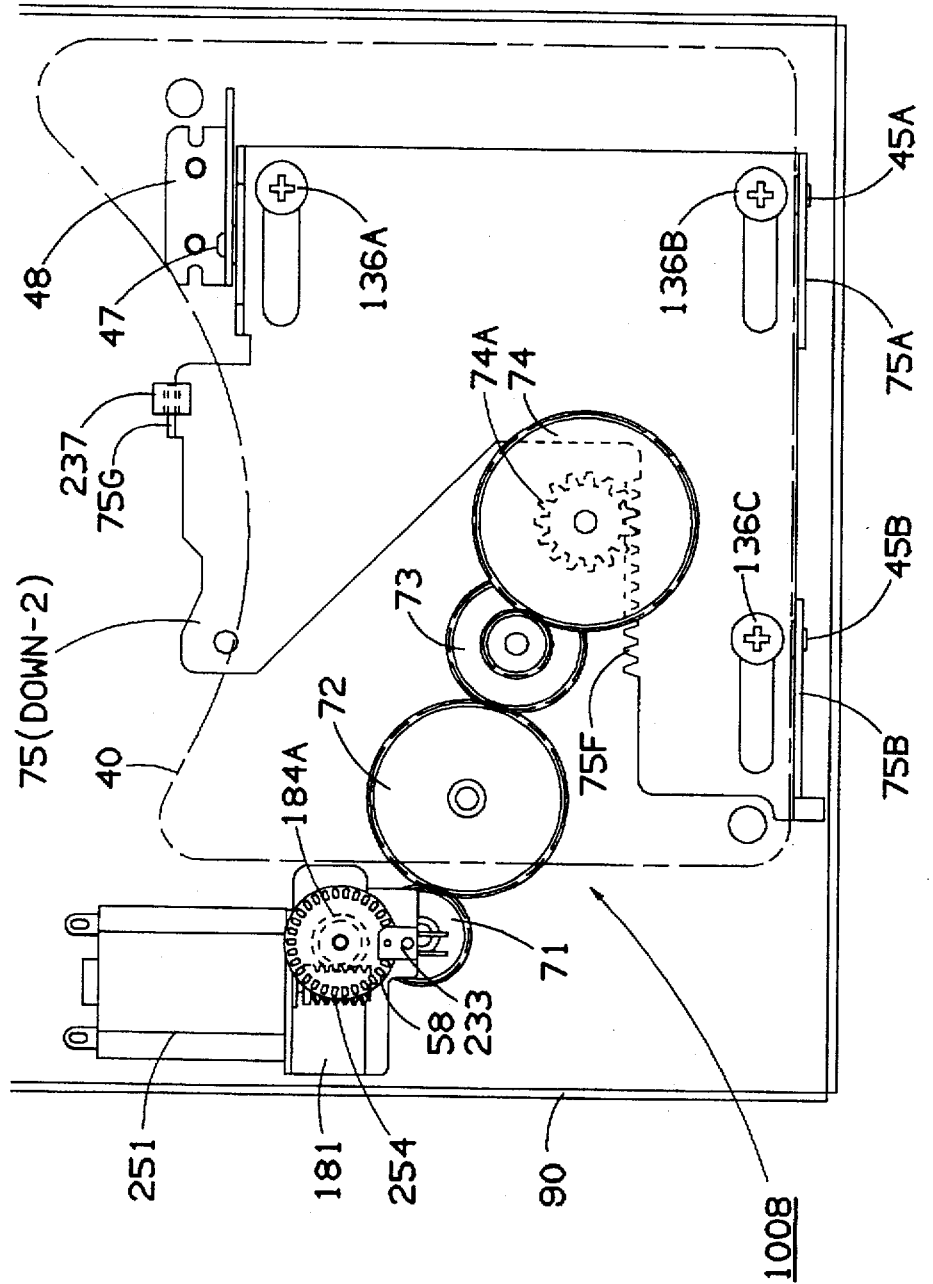
FIG. 28 is a top-view of the optical mechanism vertical transfer mechanism with sliding plate in position DOWN-2.

(3) Damper lock mechanism 1007 is in a locked state, and optical mechanism 1006 is locked relative to base 40 (see FIG. 24).

(4) Sliding plate 75 is brought to position DOWN-2 (see FIG. 28, FIG. 29), and lift mechanism 1008 moves optical mechanism 1006 to the down position (see FIG. 37).

Figure 36:
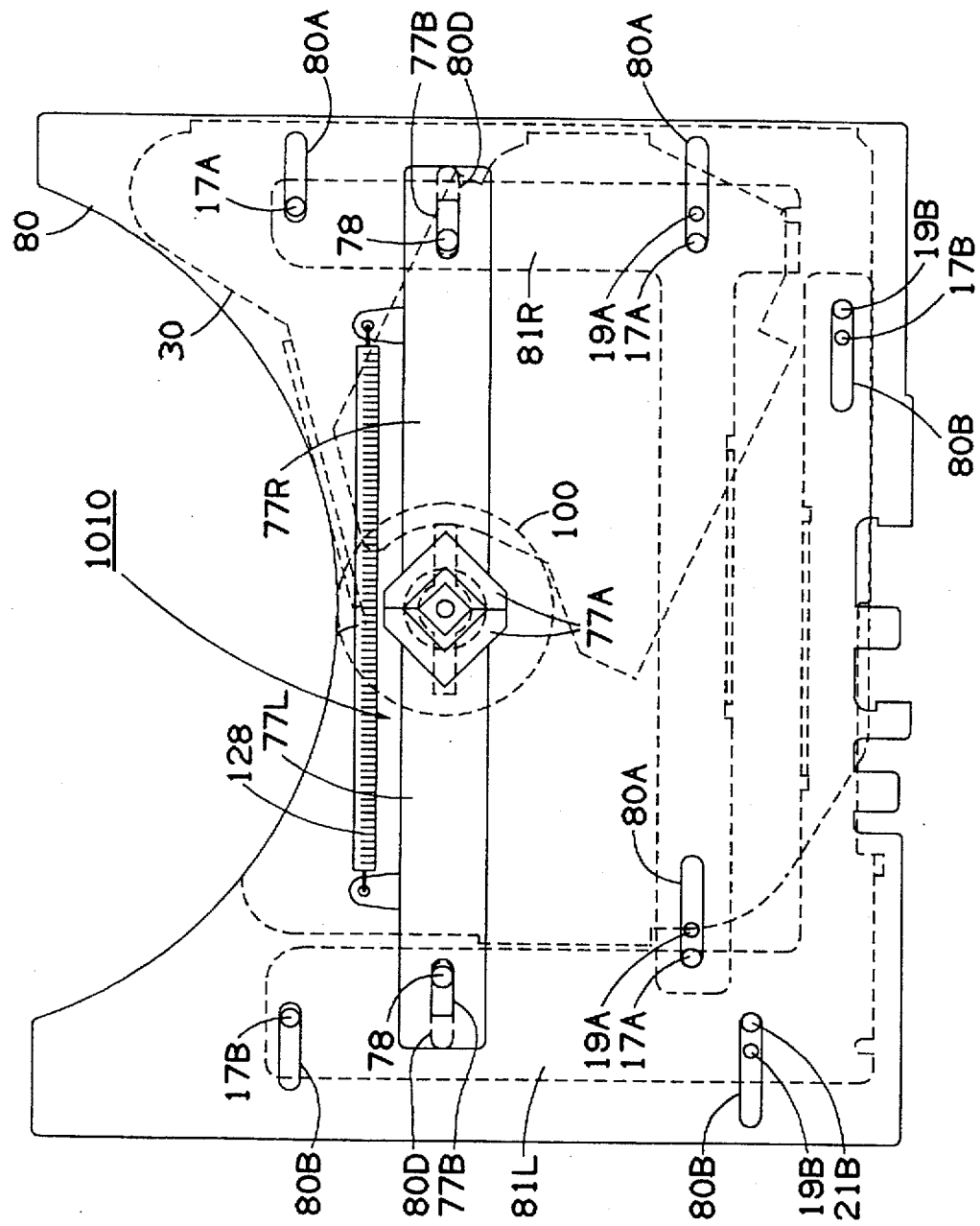
FIG. 36 is a top-view of the clamper support mechanism in the disk receiving state.

(5) Clamper support mechanism 1010 positions clamper 1009 at the support position (see FIG. 36, FIG. 37).

(6) Disk lock mechanism 1013 is in a locked state, and lower disk lock shaft 156 is moved to the lock position, to close the gap between lower and upper disk lock shafts 156 and 158 (see FIG. 45, FIG. 46).

Figure 53:
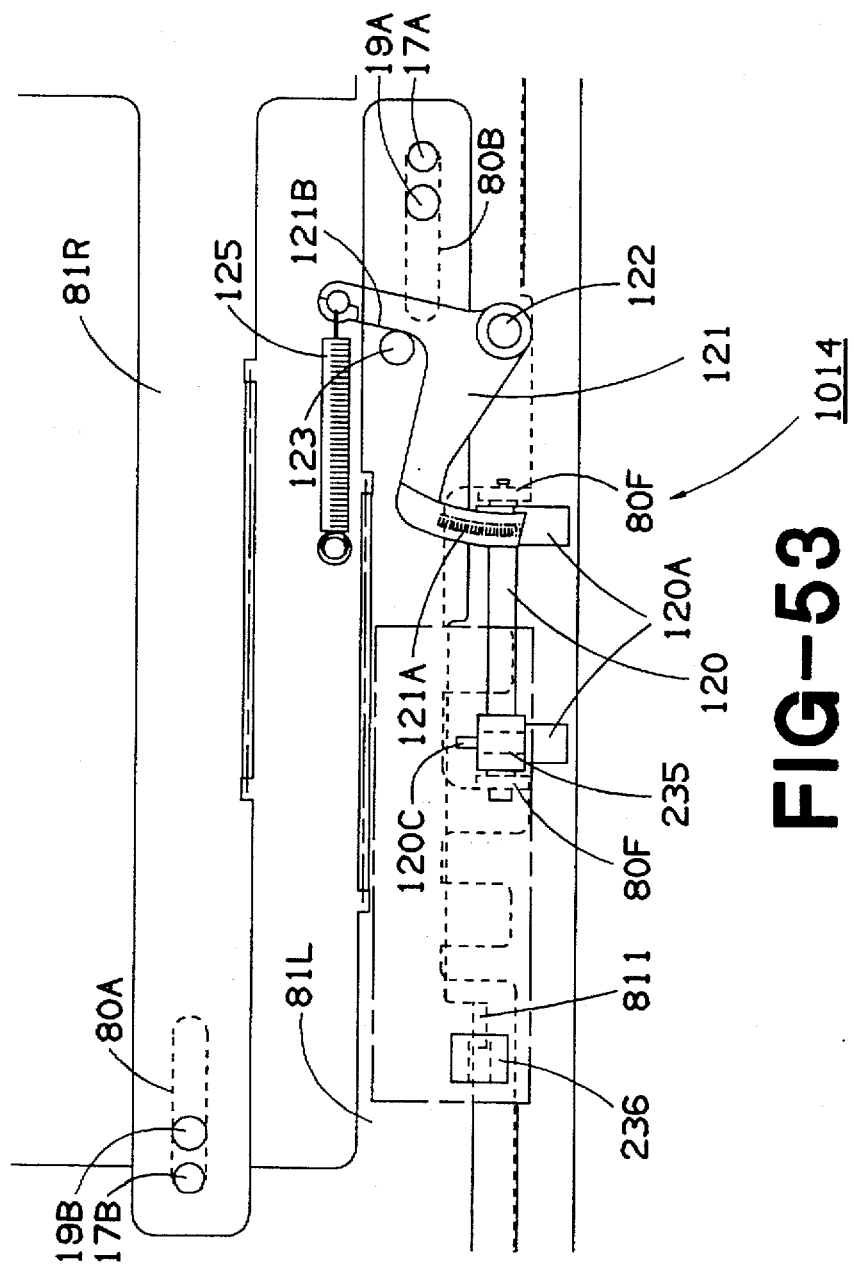
FIG. 53 is a top-view of the disk insertion error prevention mechanism during the disk-receiving state.
Figure 54:
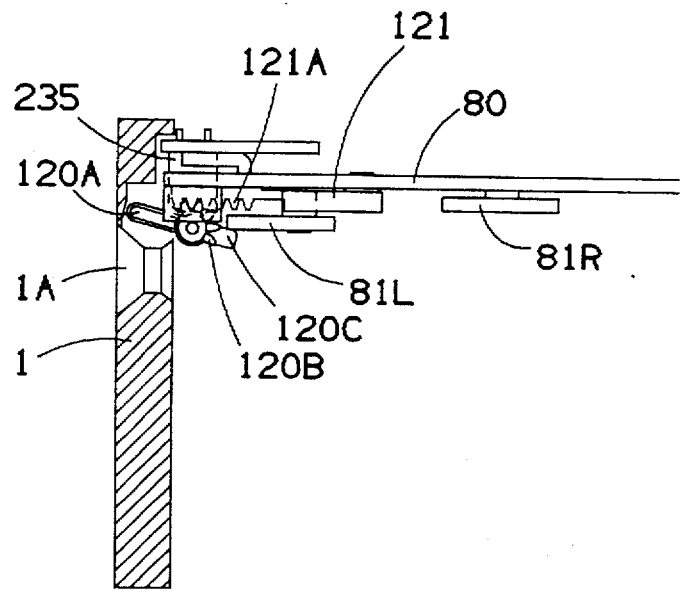
FIG. 54 is a schematic side-view of the disk insertion error prevention mechanism during the disk-receiving state.

(7) Disk insertion error prevention mechanism 1014 is in an open state, and shutter 120 is moved to an open position, where a disk can be inserted into disk insertion opening 1a (FIG. 53, FIG. 54).

Eject Mode (M.FLAG=EJECT)

(1) Disk transfer mechanism 1001 brings disk D to the eject position, the point where spindle hole Ds is outside of the device. Loading plates 81L, 81R are closed to disk receiving position POS. 1 (see FIG. 18).

(2) Loading plate opening/closing mechanism 1004 is in an off state, and rack member 87 is disengaged from timing pulley 15 (see FIG. 19).

(3) Damper lock mechanism 1007 is in a locked state, and optical mechanism 1006 is locked relative to base 40 (see FIG. 24).

(4) Lift mechanism 1008 brings sliding plate 75 to position DOWN-2 (see FIG. 28, FIG. 29), causing optical mechanism 1006 to move to the down position (see FIG. 37).

(5) Clamper support mechanism 1010 raises clamper 1009 to the support position (see FIG. 36, FIG. 37).
(6) Disk lock mechanism 1013 is in a locked state, and lower disk lock shaft 156 is brought to a locked position (see FIG. 45, FIG. 46).
(7) Disk insertion error prevention mechanism 1014 is in a closed state. The positioning of shutter 120 is restricted to the angle at which flap 120A engages with disk upper surface D (see FIG. 57).

Stand-by State (M.FLAG=STAND-BY)

(1) Disk transfer mechanism 1001 is moved to the open position POS.3, where timing belt 14 and friction belt 12 are separated from the outer perimeter De of disk D (see FIG. 16).
(2) Loading plate open/close mechanism 1004 is in an on state. Rack member 87 is engaged from timing pulley 15, and disk transfer mechanism is maintained in the open position POS.3 (see FIG. 23).
(3) Damper lock mechanism 1007 is in the unlocked state. Optical mechanism 1006 is elastically supported by lower and upper dampers 41 and 44 (see FIG. 27).
(4) Lift mechanism 1008 brings sliding plate 75 to position UP-2 (see FIG. 34, FIG. 35), and moves optical mechanism 1006 to the up position (see FIG. 43).
(5) Clamper support mechanism 1010 releases the support on clamper 1009, and clamper 1009 clamps disk D to turntable 102 (see FIG. 42, FIG. 42).
(6) Disk lock mechanism 1013 is in the locked state, and lower disk lock shaft 156 is moved to a locked position (see FIG. 51, FIG. 52).
(7) Disk insertion error prevention mechanism 1014 is in a closed state, and shutter 120 is moved to a closed position preventing the insertion of a disk into disk insertion opening 1a (see FIG. 56).

Stock State (M.FLAG=STOCK)

(1) Disk transfer mechanism 1001 is moved to the open position POS.3, where timing and friction belts 14 and 12 are separated from outer perimeter De of disk D (see FIG. 17).
(2) Loading plate opening/closing mechanism 1004 is in the on state. Rack member 87 is engaged with timing pulley 15, and disk transfer mechanism 1001 is maintained in the open position POS.3 (see FIG. 23).
(3) Damper lock mechanism 1007 is in the unlocked state, and optical mechanism 1006 is elastically supported by lower and upper dampers 41 and 44 (see FIG. 27).
(4) Lift mechanism 1008 brings sliding plate 75 to position UP-2 (see FIG. 34, 35) and moves optical mechanism 1006 to the up position (see FIG. 43).
(5) Clamper support mechanism 1010 releases the support on clamper 1009. Clamper 1009 is attracted to magnet 105 and is mounted on centering spindle 101 (see FIG. 44).
(6) Disk lock mechanism 1013 is in a locked state, and lower disk lock shaft 156 is brought to the lock position (see FIG. 51, FIG. 52).
(7) Disk insertion error prevention mechanism 1014 is in a closed state, and shutter 120 is brought to a closed position where disks are prevented from being inserted into disk insertion opening 1a (see FIG. 56).

The description of the states of each of the mechanisms in the play state (M.FLAG=PLAY) are identical to those in the stand-by state, and therefore they will be omitted here.

Main Flow

Figure 61:
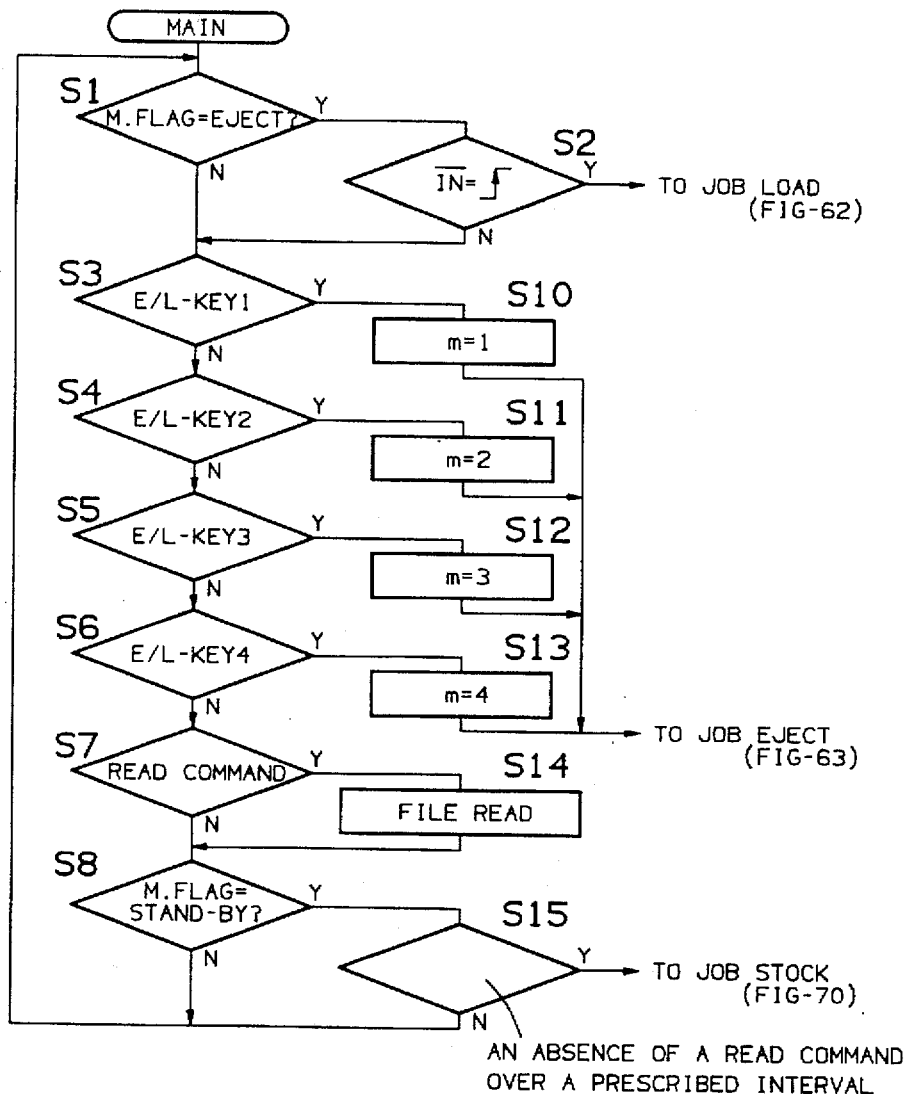
FIG. 61 is a flowchart of the main routine of system controller.

Referring to FIG. 61, when the power supply is turned on, controller 300 executes the main routine. In the loop at steps S1–S8, S15, disk insertion detection, disk removal detection, eject/load key operations and read commands from the computer are repeatedly monitored. Also, in standby mode, controller 300 checks periodically to see that there has not been a read command over a prescribed interval.

Disk Loading Operation

Figure 57:
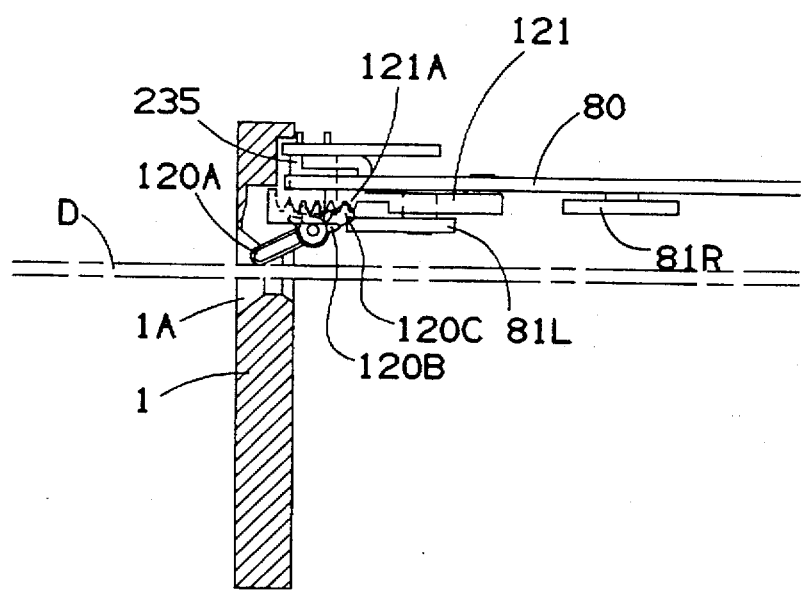
FIG. 57 is a schematic side-view of the disk insertion error preventing mechanism in the eject mode.

When disk D is inserted into disk insertion opening 1a of front panel 1, outer perimeter De of the disk engages with pulley wrap portion 14C of timing belt 14 and a disk guide wall 11E of resin material. This causes the edge of the disk to slide against guide wall 11E with the insertion of disk D, and loading plates 81L, 81R to be spread apart. Referring to FIG. 53, pin 123, disposed on loading plate 81L, moves in tandem with the opening motion of plate 81L. This causes lever 121 to rotate counterclockwise due to the pressure from spring 125, thus sealing shutter 120. Referring to FIG. 57, shutter 120 slides on top of disk D as disk D is inserted completely into the device, the lower end of flap 120A being held up by the upper surface of disk D. Since felt, compressed urethane or similar material lines the outside of flap 120A, the top surface of disk D is not damaged.

Figure 62:
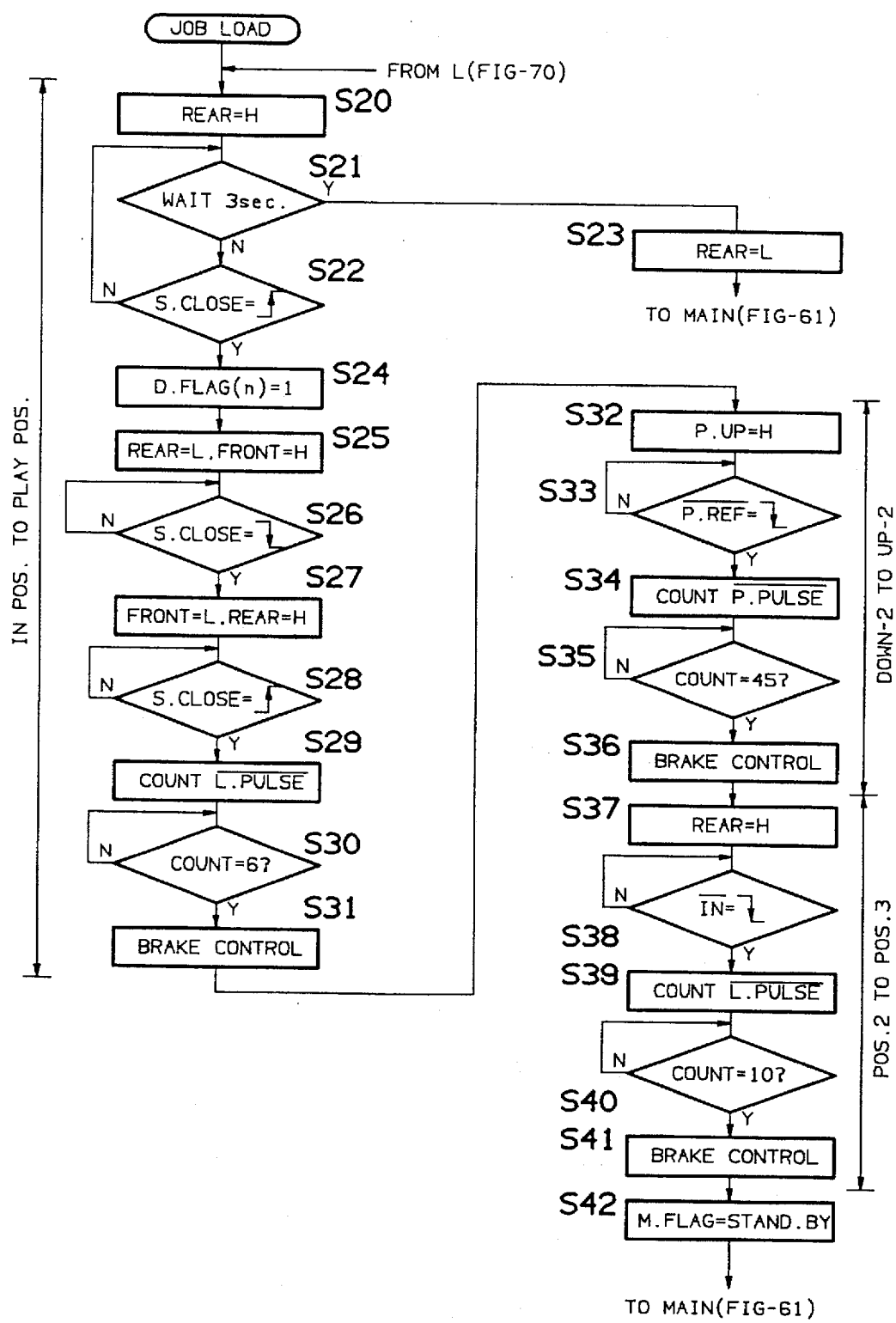
FIG. 62 is a flowchart of JOB LOAD.
Figure 63:
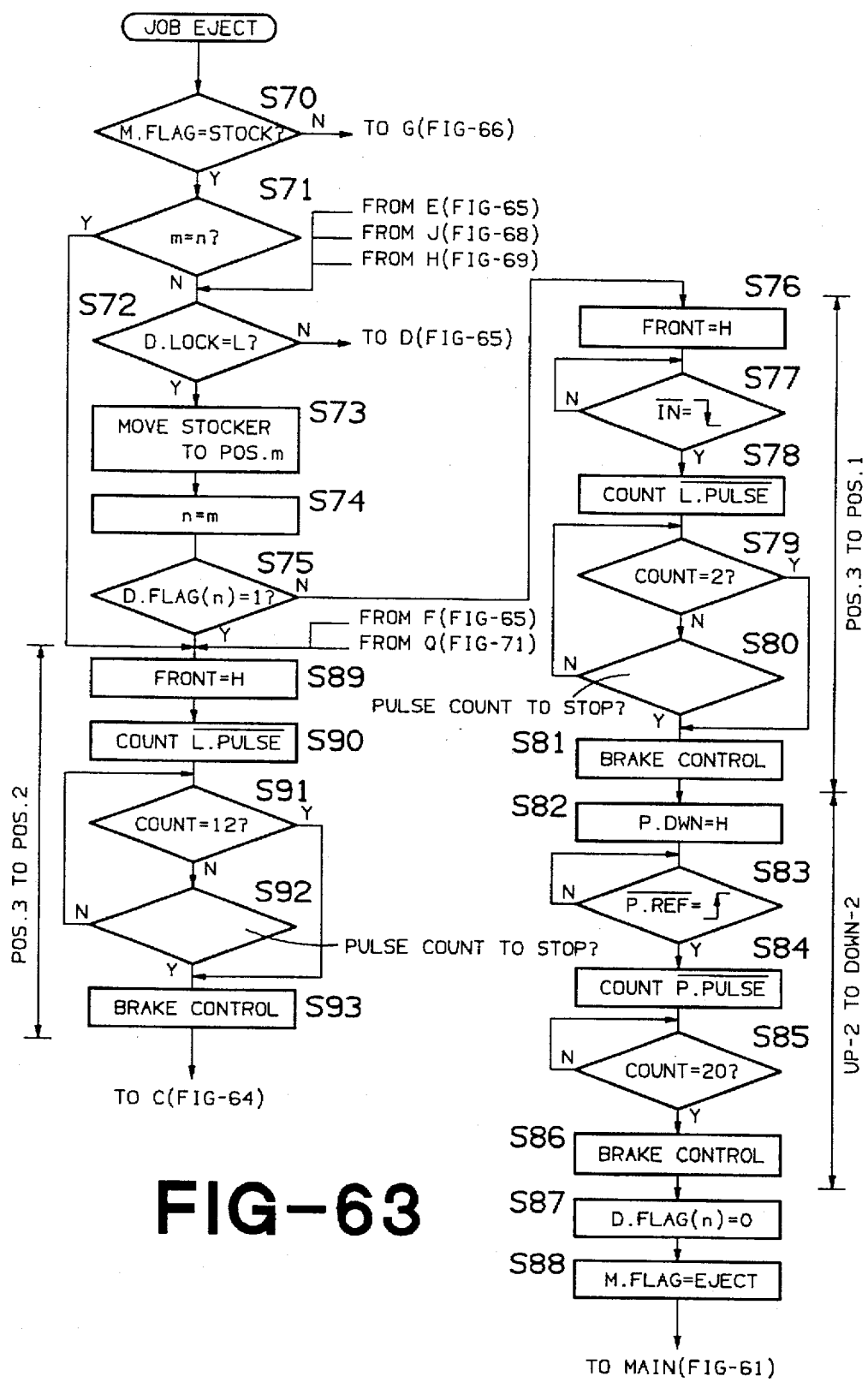
FIG. 63 is a flowchart of JOB EJECT.

Referring to FIG. 14, when disk D is pushed to position P0, the output from optical sensor 236 (signal $\overline{IN}$) changes to "H" and controller 300 goes from step S1 to procedure JOB LOAD, shown in FIG. 62, FIG. 63, via step S2. Disk D is brought to playback position in step S20–S31. First, controller 300 changes signal REAR to "H" at step S20, and then waits for signal S.CLOSE to change to "H" in three seconds or less at the loop in step S21, S22. In disk transfer mechanism 1001, when signal REAR changes to "H", timing belt 14 is rotated counterclockwise, disk D is rotated clockwise along the left side surface of friction belt 12, to move disk D toward the rear of the device.

When the disk reaches position P1 of FIG. 15, flap 120A of shutter 120 drops away from the upper surface of disk D and falls to the closed position. Signal S.CLOSE then changes to "H". Beginning at step S22, controller 300 sets disk presence flags D.FLAG(n) to 1, returns signal REAR to the "L" state and sets signal FRONT to "H". At step S26, controller 300 waits for signal S.CLOSE to change to "L".

When signal FRONT changes to "H", timing belt 14 of disk transfer mechanism 1001 is rotated clockwise, moving disk D toward the front of the device as it is rotates in the opposite direction. Disk D forces shutter 120 open toward the outside of the device. When signal S.CLOSE changes to "U", controller 300 returns signal FRONT to "L" and sets signal READ to "H" at step S27. At step S28, controller 300 waits again for signal S.CLOSE to change to "H". Thus, in disk transfer mechanism 1001, timing belt 14 is again rotated counterclockwise, and disk D is moved toward the rear of the device as it rotates in reverse.

The movement of disk D causes shutter 120 to close and changes signal S.CLOSE to "H". At step S29, controller 300 begins counting the output (signal $\overline{L.PULSE}$) from optical sensor 232. At step S30, controller 300 waits for the pulse count to reach "6". When the count reaches "6", indicating disk D has arrived at playback position P2, at step S31, controller 300 sets signal FRONT and signal REAR to "H" for a prescribed period of time (50 msec), electromagnetically braking motor 250. In the loop in steps S21, S22, if signal S.CLOSE did not change in three seconds or less, it indicates to controller 300 that the disk cannot be moved into the device, for example because the inserted disk was intentionally pulled out. At step S23, controller 300 returns signal REAR to the "L" state, stops the belt drive and returns to the main routine in FIG. 61.

In steps S26–S28, controller 300 moves disk D while rotating it in reverse, and begins counting pulses from signal L.PULSE after signal S.CLOSE has changed to "H". Thus, even if the user obstructs the closing of shutter 120 after inserting disk D all the way, or if there is slipping between disk D and timing belt 14, there is no change in the pulse count, and so disk D can be brought to the appropriate position accurately.

In steps S32–S36, controller 300 moves sliding plate 75 from position DOWN-2 to position UP-2. First, at step S32, controller 300 sets signal P.UP to "H", and at step S33, waits for the output from optical sensor 237 (signal P.REF) to change to "L". When signal P.UP changes to "H", sliding plate 75 is driven to the right of the device, and once it passes position DOWN-1, optical mechanism 1006 is moved upward toward the up position. Also, sliding plate 75 makes lower disk lock shaft 156 move downward to the unlock position, and then makes lock disk lock shaft 156 move upward to the lock position again. When signal P.REF changes to "L" due to the motion of sliding plate 75, controller 300 begins counting the output from optical sensor 233 (signal P.PULSE) at step S34. Then, at step S35, controller 300 waits for the pulse count (COUNT) to reach "45".

Figure 22:
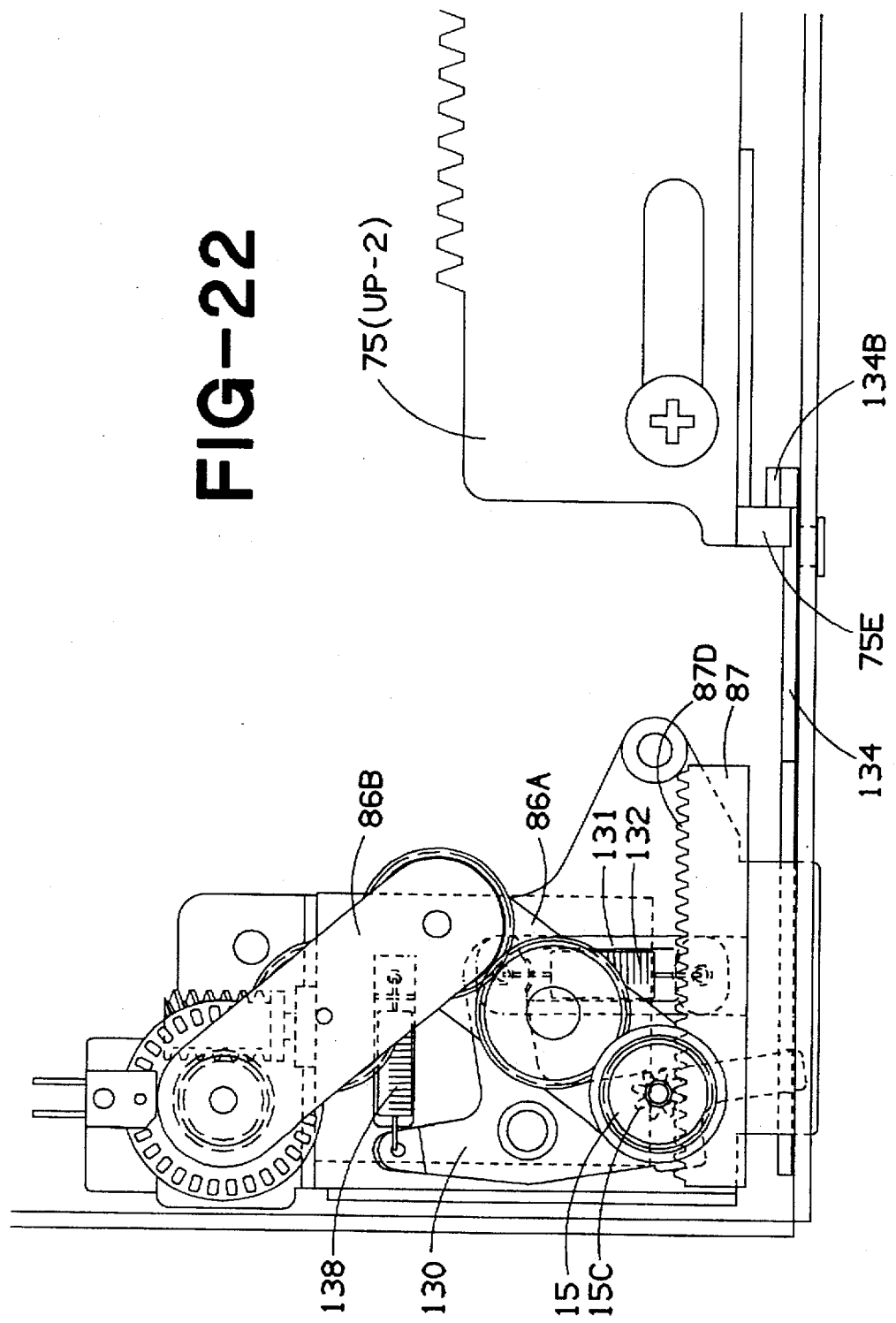
FIG. 22 is a top-view of the loading plate open/close mechanism with sliding plate 75 in position UP-2.
Figure 23:
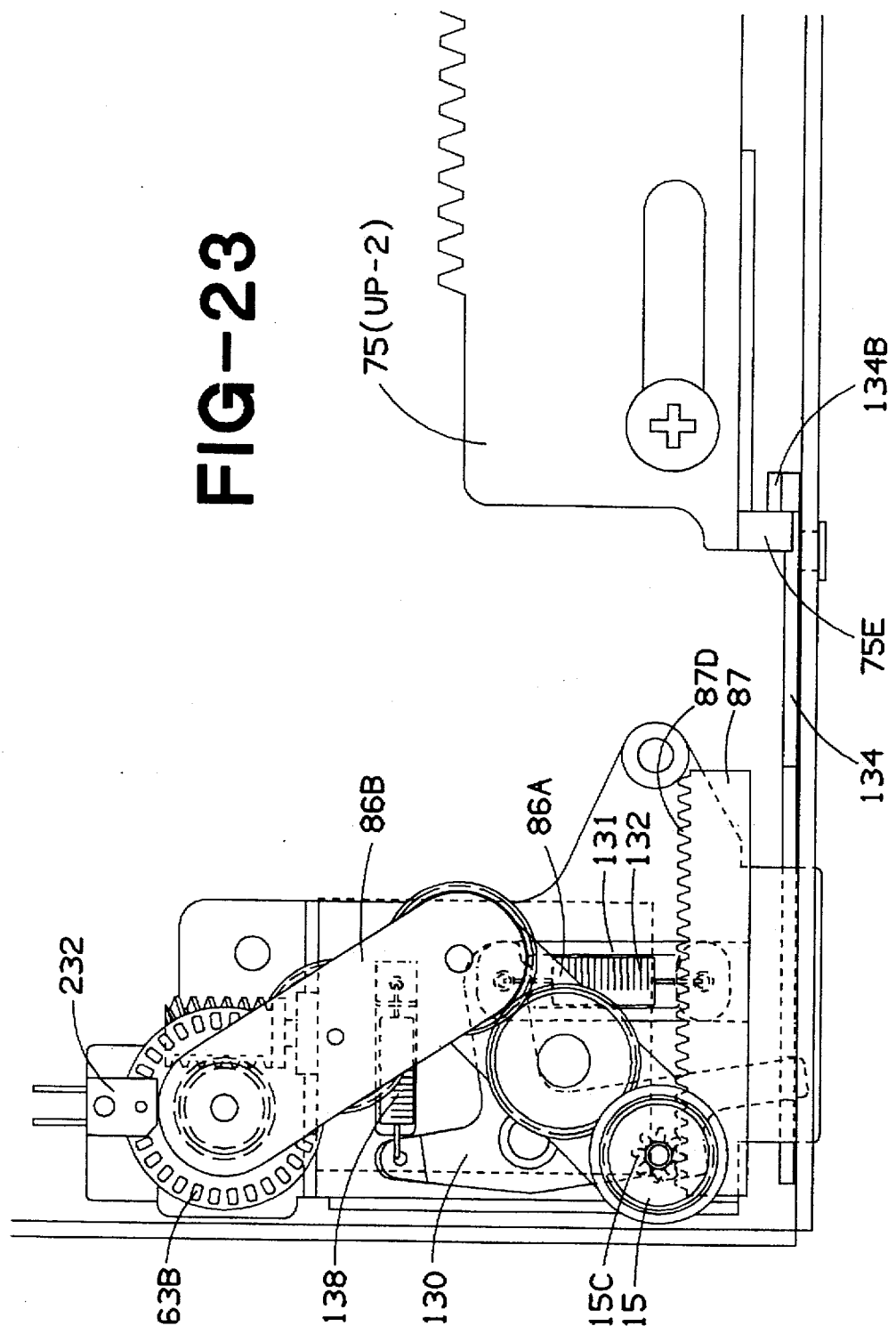
FIG. 23 is a top-view of the loading plate open/close mechanism with the loading plates in an open position POS.3.

When the pulse count reaches "45", indicating to controller 300 that the sliding plate is at position UP-2, at step S36, signal P.UP and signal P.DOWN are set to "H" for 50 msec, electromagnetically braking motor 251 to stop it. Referring to FIG. 41, once sliding plate 75 is brought to position UP-2, optical mechanism 1006 is brought to position UP, where disk D is mounted on turntable 102. Then magnet 105 attracts clamper 1009. When sliding plate 75 moves to position UP-2, damper lock mechanism 1007 is unlocked and the lock on optical mechanism 1006 is released. Thus, optical mechanism 1006 is resiliently supported with damping on damper base 40. Lower disk lock shaft 156 is moves to the lock position (FIG. 52) and rack member 87 is moves to engage with timing pulley 15 (FIG. 22).

At steps S37–S41, controller 300 moves loading plates 81L, 81R from support position POS.2 to open position POS.3. This causes belts 12 and 14 to disengage from outer perimeter De of disk D. First, at step S37, controller 300 sets signal REAR to "H", and then waits for signal IN to change to "L" at step S38. When signal REAR changes to "H", timing pulley 15 is rotated counterclockwise, causing timing pulley 15 to move along rack member 87B toward the left of the device, thereby separating loading plates 81L, 81R. At the instant timing pulley 15 begins to rotate, a clockwise rotation force is applied to disk D since timing belt 14 is still engaged with outer perimeter De of disk D. However, disk D does not move because it is held at the playback position by centering spindle 101 of turntable 102. When loading plates 81L, 81R open, clamper holders 77L, 77R are spread apart and the support on clamper 1009 is released. As a result, clamper 1009 is attracted to the turntable via magnet 105, and disk D is held against the turntable.

The opening motion of loading plates 81L, 81R causes signal IN to change to "L". At step S39, controller 300 begins counting pulses from signal L.PULSE, and waits for the pulse count to reach "10" at step S40. When the pulse count reaches "10", indicating to controller 300 that the loading plates have reached open position POS.3, at step S41, signal FRONT and signal REAR are set to "H" for 50 msec, electromagnetically braking motor 250. At step S42, mode flag M.FLAG is set to "STAND-BY". Controller 300 then returns to the main routine shown in FIG. 61.

Control Steps Corresponding to the E/L Keys

When E/L key "n" (one of the keys E/L key 1 through E/L key 4) is pressed, while the current stocker position corresponds to "n", controller 300 brings disk D at the stock or playback position to the eject position. If an E/L key corresponding to a position other than the current stocker position is pressed, stocker 1011 is transferred to the position corresponding to the E/L key, bringing disk D in the corresponding position to the eject position. If there is no disk D at the specified position, the stocker is transferred to the position indicated by the E/L key, and the loading plates 81L, 81R are brought to the disk receiving position.

Control Steps Corresponding to E/L Key Operation in Stock State

Figure 69:
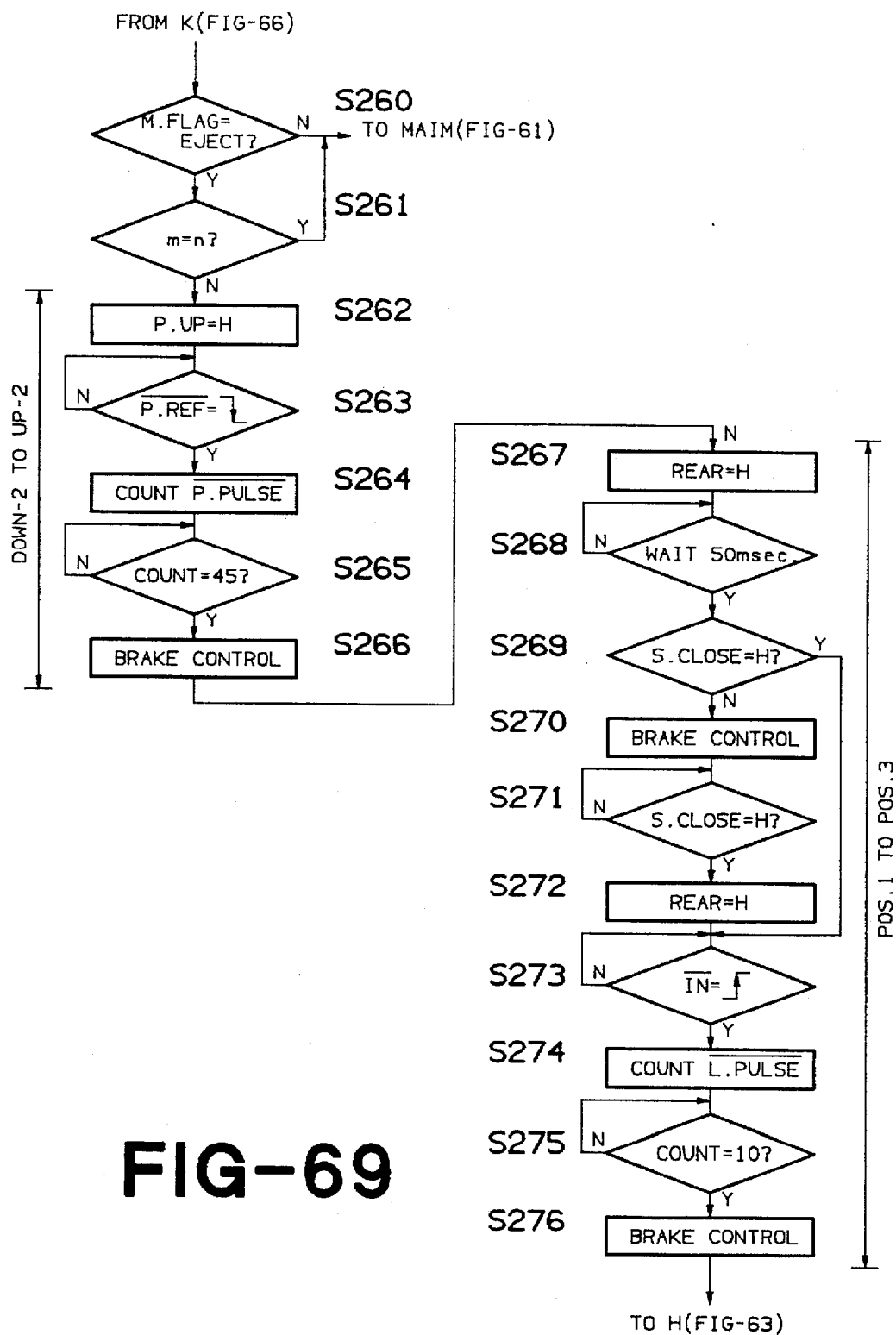
FIG. 69 is a flowchart of JOB EJECT.

The following is a description of the disk changer's response to the pressing of an E/L key during the stock state. When E/L key 1 through E/L key 4 is pressed, controller sets constant m to a corresponding value ("1" through "4") at the corresponding step in steps S10–S13. Referring to FIGS. 63 69, controller 300 proceeds to flowchart JOB EJECT. At step S70, controller 300 checks to see if M.FLAG is set to "STOCK". If M.FLAG is set to "STOCK", controller 300 proceeds to step S71, where it checks to see if the values for m and n are identical, thus determining whether an E/L key having the same number as the current stocker position was entered. If the values are identical, controller 300 executes steps S89–S93, in which the loading plates are moved from open position POS.3 to support position POS.2. At step S89, controller 300 sets signal FRONT to "H", and at step S90, counting of signal L.PULSE is initiated. At steps S91 and S92, controller 300 waits for either the pulse count to reach "12" or the pulse count to stop. The reason the pulse count was made smaller than the value "13" shown in FIG. 58 is that the belt stops right before it engages with the disk edge. The reason controller 300 checks to see if signal L.PULSE stops is that it is possible for an error in the pulse count or incorrect positioning of the loading plate to cause the belt to engage with the disk edge so that the prescribed pulse count is never reached.

When signal FRONT becomes "H", timing pulley 15 is rotated counterclockwise, causing it to move to the right of the device along rack 87B, causing loading plates 81L, 81R to converge. The dosing of loading plates 81L, 81R causes damper 1009 to be picked up by clamper holders 77L, 77R under the urging of spring 128. When the pulse count reaches "12" or when the signal L.PULSE stops, it indicates to controller 300 that the loading plates have nearly reached support position POS.2. At step S93, signal FRONT and signal REAR are set to "H" for 50 msec, electromagnetically braking motor 250.

Referring to FIG. 64, controller 300 moves sliding plate 75 from position UP-2 to position DOWN-1 in steps S94–S98. First, at step S94, controller 300 sets signal P.DWN to "H". At step S95, controller 300 waits for signal P.REF to change to "H". When signal P.DWN becomes "H", sliding plate 75 is moved toward the left of the device. Damper lock mechanism 1007 locks optical mechanism 1006 to base 40, and loading plate open/close mechanism 1004 is disengaged so that rack member 87 release and retreats from timing pulley 15. The release of rack member 87 allows spring 127 to bring timing and friction belts 14, 12 of disk transfer mechanism 1001 together slightly to a position to support disk D. The motion of sliding plate 75 causes lower disk lock shaft 156 to descend. When lower disk lock shaft moves beyond position UP-1, optical mechanism 1006 is moved downward.

When signal $\overline{\text{P.REF}}$ changes to "L", controller 300 begins counting signal P.PULSE at step S96. Controller 300 waits for the pulse count to reach "3" at step S38. When the pulse count reaches "3", it indicates to controller 300 that sliding plate 75 has reached position DOWN-1. At step S34, signal P.UP and signal P.DWN are set to "H" for 50 msec, electromagnetically braking motor 251. When sliding plate 75 reaches position DOWN-1, optical mechanism 1006 and lower disk lock mechanism 156 are brought to the down position and the unlock position respectively, to allow disk transfer within stocker 1011.

In steps S99–S102, controller 300 brings disk D, initially inside the stocker, to the eject position. First, at step S99, controller 300 sets signal FRONT to "H". Then, at step S100, controller 300 begins counting signal $\overline{\text{L.PULSE}}$. At step S101, controller 300 waits for the pulse count to reach "307". When signal FRONT becomes "H", disk transfer mechanism 1001 moves disk D moving, while it rotates counterclockwise, toward the front of the device. When the pulse count reaches "307", it indicates to controller 300 that the disk has been brought to the eject position. At step S101, signal FRONT and signal REAR are set to "H" for 50 msec and an electromagnetic brake is applied to stop the motor. According to the present embodiment, when disk D is in the eject position, spindle hole Ds of the disk is outside of disk insertion opening 1A, and belts 14 and 12 are brought together until the distance W1 between the two is the same as in the disk receiving state (112 mm).

In steps S103–S109, controller 300 moves sliding plate 75 from position DOWN-1 to position DOWN-2. First, at step S103, controller 300 sets signal P.UP to "H". At step S104, controller 300 waits for signal $\overline{\text{P.REF}}$ to change to "L". Sliding plate 75 is moved toward the right of the device. When signal $\overline{\text{P.REF}}$ changes to "L", then controller 300 sets signal P.UP to "L" and signal P.DWN to "H" at step S105. At step S106, controller 300 waits for signal $\overline{\text{P.REF}}$ to change to "L". Sliding plate 75 is moved in toward the left of the device causing signal $\overline{\text{P.REF}}$ to change to "H". Then, at step S107, controller 300 begins counting signal $\overline{\text{P.PULSE}}$, and at step S108, controller 300 waits for the pulse count to reach ; "20".

When the pulse count reaches "20", it indicates to controller 300 that the sliding plate has reached position DOWN-2. At step S109, signal P.UP and signal P.DWN are set to "H" for 50 msec, electromagnetically braking motor 251. At step S110, S111, D.FLAG(n) and M.FLAG are set to "0" and "EJECT" respectively. Controller 300 then returns to the main routine in FIG. 61.

Referring to FIG. 63, if the values of m and n are not identical at step S71, then at step S72 controller 300 checks the status of output (D.LOCK) from optical sensor 229 to see if it is at level "L", to confirm whether lower disk lock shaft 156 has been brought to the lock position. If it has been brought to the lock position, then signal D.LOCK is in the "L" state, and at step S73, controller 300 moves stocker 1011 to position POS.m, where m is specified by the E/L key entered (for example, position POS.4 if E/L key 4 was entered). When stocker 1011 has been brought to the specified position, controller 300 sets constant n to m. At step S75, controller 300 checks to see if D.FLAG(n) is "1" to confirm whether disk D is at position POS.m. If D.FLAG(n) is "1", then controller 300 proceeds to step S86 described above. Loading plates 81L, 81R are moved from open position POS.3 to support position POS.2, and disk D is brought to the eject position.

If D.FLAG(n) was "0" at step S75, then controller 300 moves loading plates 81L, 81R from open position POS.3 to disk receiving position POS. 1 in steps S76–S81. First, at step S76, controller 300 sets signal FRONT to "H". At step S77, controller 300 waits for signal $\overline{\text{IN}}$ to change to "L". When signal FRONT changes to "H", timing pulley 15 turns clockwise. This rotation causes timing pulley 15 to advance to the right of the device along rack 87B, closing loading plates 81L, 81R. When signal $\overline{\text{IN}}$ changes to "L" as a result of the loading plate motion, controller 300 begins counting signal $\overline{\text{L.PULSE}}$ at step S78. At steps S79, S80, controller 300 waits for the pulse count to reach "2" or for signal $\overline{\text{L.PULSE}}$ to stop. When the pulse count reaches "2" or signal $\overline{\text{L.PULSE}}$ stops, it indicates to controller 300 that the loading plates have been brought to disk receiving position POS. 1. At step S81, signal FRONT and signal REAR are set to "H", electromagnetically braking motor 250.

In steps S82–S86, controller 300 moves sliding plate 75 from position UP-2 to position DOWN-2. First, at step S82, controller 300 sets signal P.DWN to "H", and at step S83, controller 300 waits for signal $\overline{\text{P.REF}}$ to change to "H". Sliding plate 75 is driven to the left of the device, and optical mechanism 1006 is lowered once position UP-1 is past. Lower disk lock shaft 156 is lowered and then brought back up to the lock position. When the movement of sliding plate 75 is sufficient to change signal $\overline{\text{P.REF}}$ to "H", controller 300 begins counting signal $\overline{\text{P.PULSE}}$ at step S84. At step S85, controller 300 waits for the pulse count to reach "20".

When the pulse count reaches "20", it indicates to controller 300 that the sliding plate has been brought to position DOWN-2, and at step S86 signal P.UP and signal P.DOWN are set to "H", electromagnetically braking the motor. At steps S87, S88, controller 300 sets D.FLAG(n) and M.FLAG to "0" and "EJECT" respectively. Controller 300 then returns to the main routine.

Disk Lock Error, Retry Operation

If, in step S72, D.LOCK is not "L", then controller 300 proceeds to the flowchart shown in FIG. 65. Disk D, which is offset, is moved to a position where shutter 120 is opened, and disk D is moved again to the stock position. First, controller 300 proceeds from step S72 to step S110, and checks the number of retry attempts made. Then, in steps S121–S124, the same operations as steps S89–S93 are carried out, with loading plates 81L, 81R being moved from open position POS.3 to support position POS.2. Then, in steps S125–S129, the same operations as steps S94–S98 are carried out, with sliding plate 75 being moved from position UP-2 to position DOWN-1, and optical mechanism 1006 and lower disk lock shaft 156 being moved to the down position and the unlock position, respectively.

In steps S130–S136, controller 300 moves disk D, which is at an offset, to a position where shutter 120 is opened, and then disk D is moved to the stock position again. First, at step S130, controller 300 sets signal FRONT to "H". At step S131, controller 300 waits for signal S.CLOSE to change to "L". When signal FRONT changes to "H", disk transfer mechanism 1001 moves disk D toward the front of the device as disk D rotates counterclockwise. Disk D forces shutter 120 open, and when signal S.CLOSE changes to "L", controller 300 changes signal FRONT back to "L" and sets signal REAR to "H" at step S132. At step S133, controller 300 waits for signal S.CLOSE to change to "H" again. The rearward movement of disk D causes shutter 120 to close. When signal S.CLOSE changes to "H", controller 300 begins counting signal $\overline{\text{L.PULSE}}$ at step S134. At step S135, controller 300 waits for the pulse count to reach "160". When the pulse count reaches "160" it indicates to controller 300 that the disk has been brought to the stock position. At step S136, controller 300 sets signal FRONT and signal REAR to "H" for 50 msec, electromagnetically braking motor 250.

In steps S137–S141, controller 300 moves sliding plate 75 from position DOWN-1 to position UP-2. First, at step S137, controller 300 sets signal P.UP to "H". At step S138, controller 300 waits for signal $\overline{\text{P.REF}}$ to change to "L". Sliding plate 75 is moved to the right of the device, and when signal $\overline{\text{P.REF}}$ changes to "L", controller 300 begins counting signal $\overline{\text{P.PULSE}}$ at step S139. At step S140, controller 300 waits for the pulse count to reach "45". When the pulse count reaches "45", it indicates to controller 300 that sliding plate 75 has reached position UP-2. At step S141, signal P.UP and signal P.DOWN are set to "H" for 50 msec, electromagnetically braking motor 251.

In steps S142–S146, which perform the same operations as steps S37–S42, controller 300 moves the loading plates to open position POS.4. Referring to FIG. 63, controller 300 returns to step S72 and checks if D.LOCK has changed to "L".

Disk Lock Error, Eject Operation

If disk lock errors occur even after the retry operation described above is repeated three times, controller 300 proceeds from step S120 in FIG. 65 to step S89 in FIG. 63. Disk D, which is at an offset position, is brought to the eject position.

Operations in Response to E/L Key Entry in Stand-by Mode

The following is a description of operations that are performed when an E/L key is entered during stand-by mode. When one of E/L key 1 through E/L key 4 is pressed in stand-by mode, controller 300 sets constant m to "1" through "4" at the corresponding step in steps S10–S13, shown in FIG. 61. Controller 300 then proceeds to step S150 in FIG. 66 via step S70 in FIG. 63, and checks to see if M.FLAG is set to "STAND-BY". Since M.FLAG is set to "STAND-BY" in the stand-by state, controller 300 proceeds to step S151 and checks to see if the values for m and n are identical, thus determining if the E/L key pressed has a number identical to the current stocker position. If the numbers are the same, then in steps S152–S157, which perform the same operations as steps S89–S93, loading plates 81L, 81R are moved from open position POS.3 to position POS.2.

Then, in steps S158–S162, which perform the same operations as steps S82–S86, controller 300 moves sliding plate 75 from position UP-2 to position DOWN-2. In steps S162–S167, controller 300 brings disk D, which is at the playback position, to the eject position. First, at step S162, controller 300 sets signal FRONT to "H", and at step S163, controller 300 begins counting signal $\overline{\text{L.PULSE}}$. At step S164, controller 300 waits for the pulse count to reach "153". When signal FRONT becomes "H", disk D has moved toward the front of the device while rotated counterclockwise. When the pulse count reaches "153", it indicates to controller 300 that disk D has been brought to the eject position. At step S165, signal FRONT and signal REAR are set to "H" for 50 msec, electromagnetically braking the motor. At step S166, S167, D.FLAG(n), M.FLAG are set to "0" and "EJECT", respectively, and control returns to the main routine.

Figure 67:
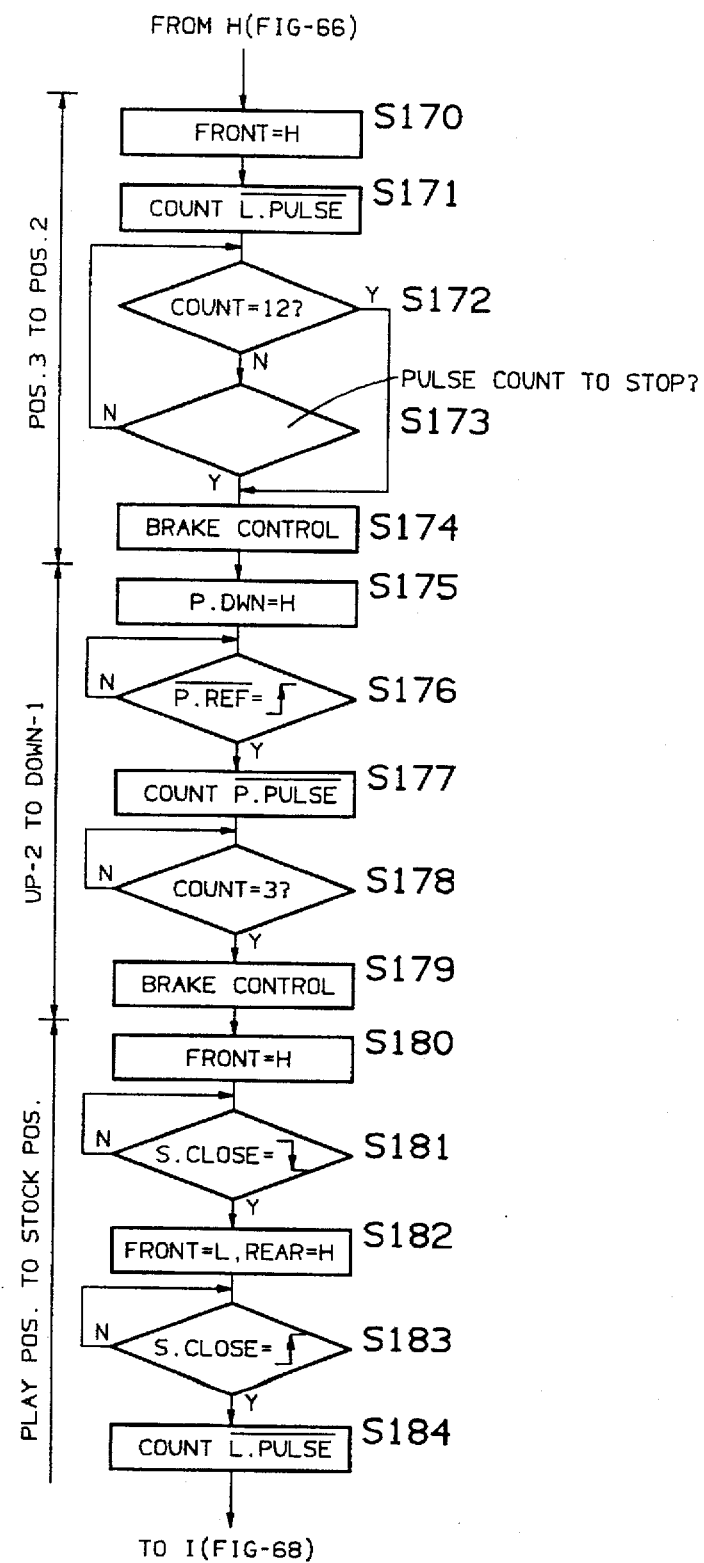
FIG. 67 is a flowchart of JOB EJECT.
Figure 68:
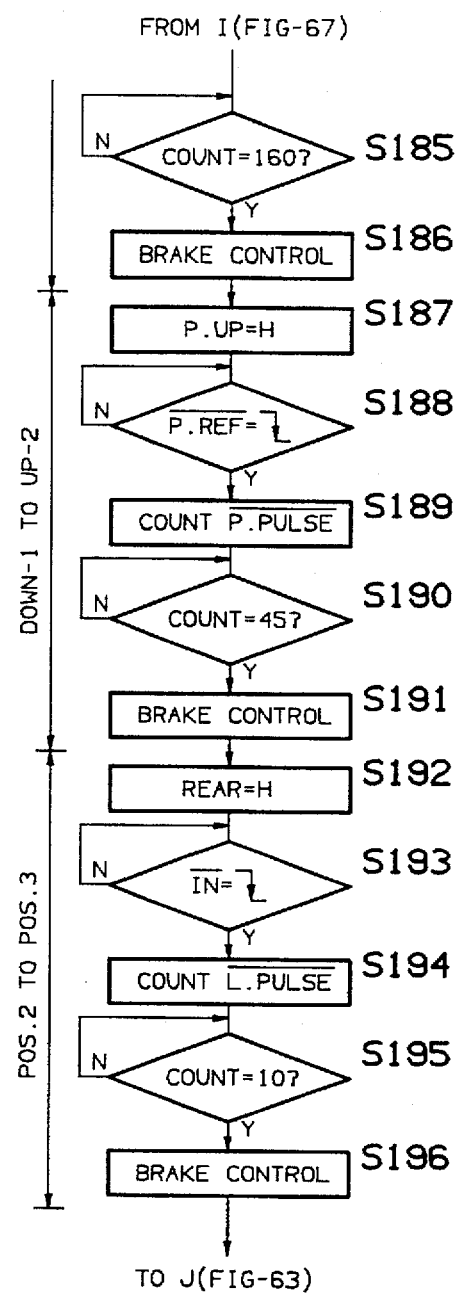
FIG. 68 is a flowchart of JOB EJECT.

If, at step S151 described above, the values for m and n were not identical, then controller 300 proceeds to step S170 shown in FIG. 67. In steps S170–S196, which perform the same operations as steps S121–S146, the following are performed: (1) loading plates 81L, 81R are moved from open position POS.3 to support position POS.2; (2) sliding plate 75 is moved from position UP-2 to position DOWN-1; (3) disk D, at the playback position, is moved to the stock position; (4) sliding plate 75 is moved from position DOWN-1 to position UP-2; (5) loading plates 8lL, 81R are moved to open position POS.3. Controller 300 then proceeds to step S72, shown in FIG. 63. Stocker 1011 is moved to the specified position POS(n), and the disk is brought to the eject position.

Operations Corresponding to E/L Key Entry in Eject Mode (M.FLAG=EJECT)

The following is a description of the operations that are performed when an E/L key is pressed in eject mode. When one of E/L key 1 through E/L key 4 is pressed, controller 300 sets constant m to the appropriate value "1" through "4" at the corresponding step in steps S10–S13. Controller 300 then proceeds to step S260 in FIG. 69 via step S70 in FIG. 63 and step S150 in FIG. 66, and checks to see if M.FLAG is set to "EJECT". Since M.FLAG is set to "EJECT", controller 300 proceeds to step S221, and checks to see if the values for m and n are the same, thus determining if the E/L key pressed and the current stocker position are identical. According to the present embodiment, disk D is ejected until distance W1 between belts 14 and 12 is reaches the distance in the disk receiving state (112 mm). Thus, the disk cannot be re-inserted into the device unless it is forced between the guides by the user. Therefore, when an identical E/L key is pressed, the controller 300 immediately returns to the main routine, ignoring the E/L key entry.

If, in step S221, the values of m and n are not identical, controller 300 proceeds to steps S262–S266, which perform the same operations as steps S32–S36. Sliding plate 75 is transferred from position DOWN-2 to position UP-2, and then at step S262, signal REAR is set to "H" and loading plates 81L, 81R are further separated. According to the present embodiment, if disk D in the eject position has not been removed, the loading plates may open in response to the E/L key entry and the disk would be unstable. The disk may fall outside of the device and be damaged, or the disk may fall inside the device and cause a malfunction.

Figure 56:
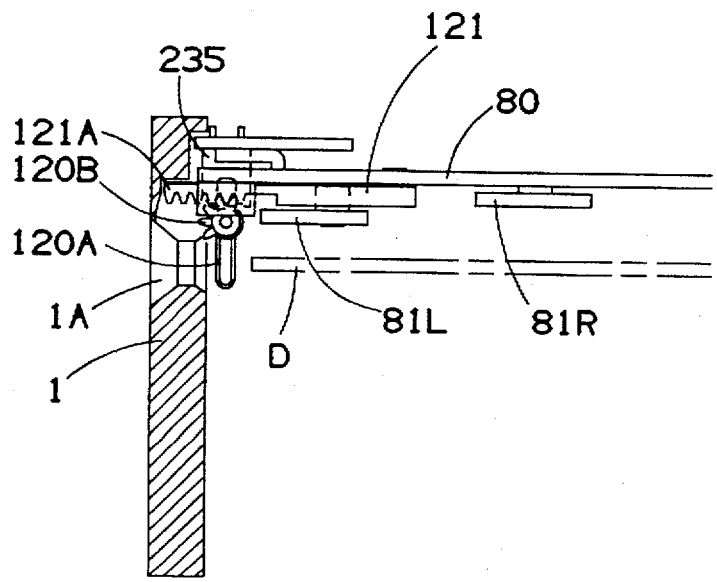
FIG. 56 is a schematic side-view of the disk insertion error preventing mechanism while the loading plates are opening.

In order to avoid this problem, controller 300 sets signal REAR to "H" at step S268 and waits for 50 msec. At step S269, controller 300 checks to see if signal S.CLOSE is "H". According to the present embodiment, after a 50 msec interval, loading plate 81L will move to a position where shutter 120 can close. If there is no disk at the eject position, shutter 120 will be closed by spring 125, as shown in FIG. 56, and signal S.CLOSE will become "H". However, if there is a disk at the eject position, shutter 120 will not completely close because flap 120A will be held up by the top surface of disk D, as shown in FIG. 57, and signal S.CLOSE will not be "H".

Thus, if signal S.CLOSE is "L", it indicates to controller 300 that a disk is present at the eject position, and at step S270, signal FRONT and signal REAR will be set to "H" for 50 msec to stop motor 250. At step S271, the disk is removed, and controller 300 waits for signal S.CLOSE to change to "H". When the disk is removed by the user, shutter 120 rotates to the closed position, setting signal S.CLOSE to "H". At step S272, controller 300 sets signal REAR to "H" again, and the loading plate is opened. At step S273, controller 300 waits for signal bar-IN to change to "H". If, at step S269, controller 300 finds that signal S.CLOSE is "H", then it jumps to step S273 and waits for signal IN to change to "H".

When signal IN changes to "L" due to the motion of the loading plate, controller 300 begins counting signal L.PULSE at step S274. At step S275, controller 300 waits for the pulse count to reach "10". Along with step S275, it would also be possible to add a step that checks to see if signal P.PULSE has stopped. When the pulse count reaches "10", it indicates to controller 300 that the loading plates have been brought to open position POS.3. At step S276, signal FRONT and signal REAR are both set to "H" for 50 msec, electromagnetically braking motor 250. Referring to FIG. 63, controller 300 proceeds to step 72 and moves stocker 1011 to specified position POS(n), as described above, and brings the disk to the eject position.

Operations Corresponding to the Read Command

Referring to FIGS. 60 and 61, when an externally connected computer 303 (FIG. 60) sends a read command, controller 300 proceeds from step S7 to step S14 in the main routine (FIG. 61). The various mechanisms are controlled as described above, to bring the selected disk D to the playback position and send the read command for the specified file to signal processing circuit 307 and servo circuit 308. The read signal generated by optical pickup amp 2 is sent to signal processing circuit 307 via RF amp 309. After EFM demodulation, deinterleaving, error correction and other necessary operations are performed, the signal is sent to externally connected computer 303 via interface circuit 302, and the prescribed data processing performed. Once the specified file has been read, controller 300 stops signal processing circuit 307 and servo circuit 308. Next M.FLAG is set to "STAND-BY" and controller 300 returns to the main routine.

Disk Stock Operation

Figure 70:
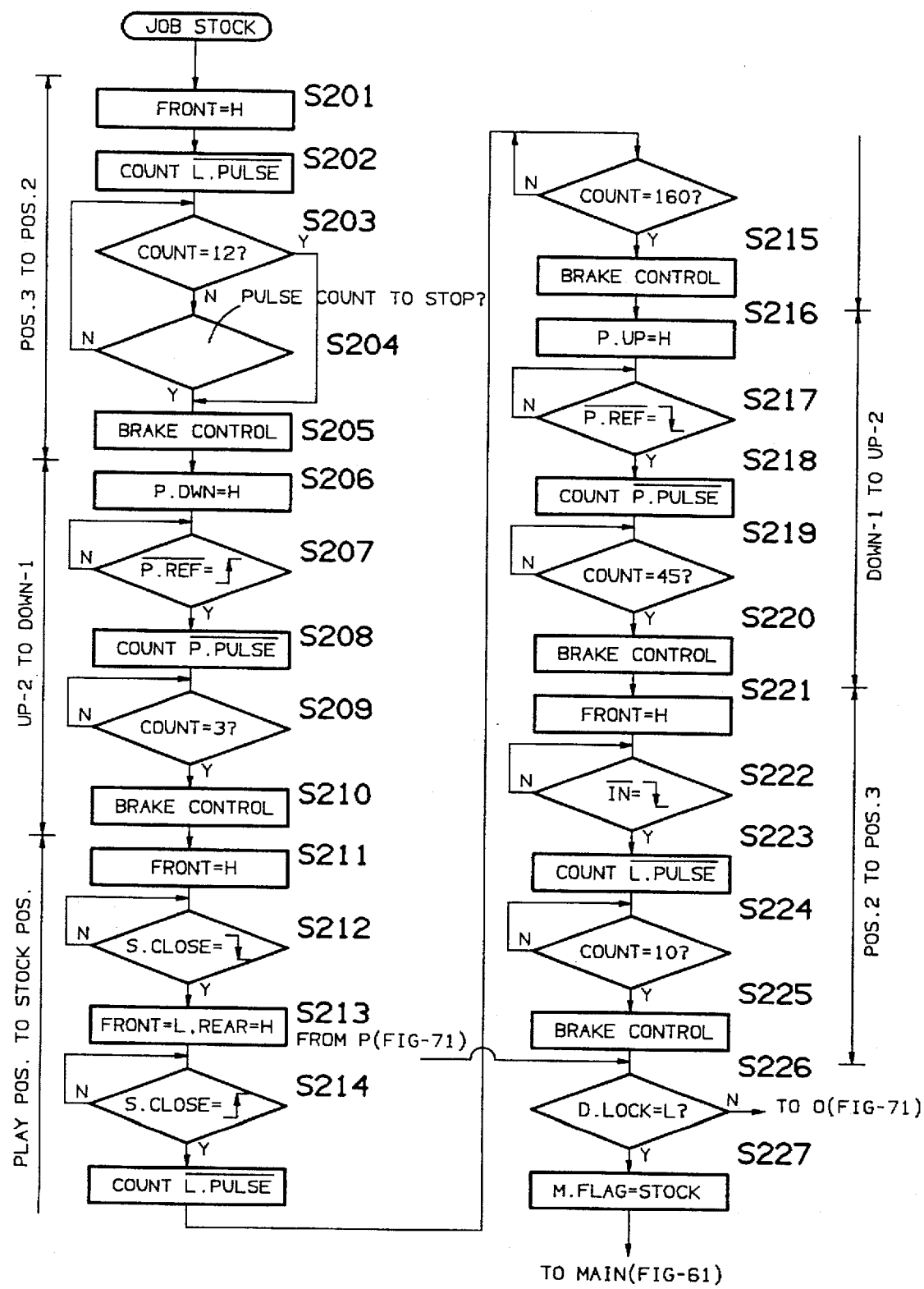
FIG. 70 is a flowchart of JOB STOCK.
Figure 71:
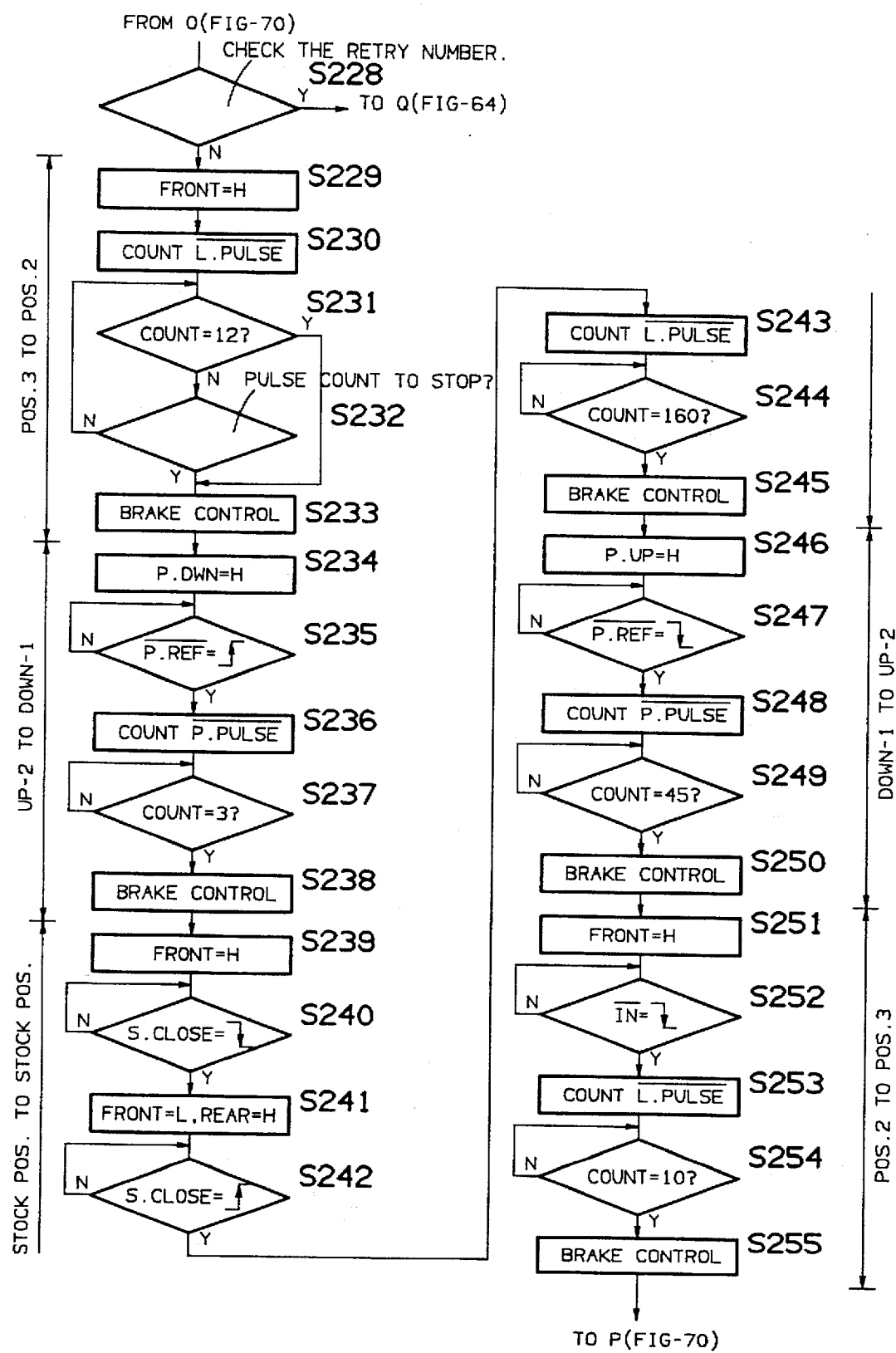
FIG. 71 is a flowchart of JOB STOCK.

If, in stand-by mode, controller 300 does not receive a read command from computer 303 for a prescribed interval, e.g. 10 minutes, then controller 300 proceeds to JOB STOCK, shown in FIG. 70 and FIG. 71, via steps S8, S15. In steps S201–S225, which perform the same operations as steps S121–S146 described above, the following operations are carried out: (1) Loading plates 81L, 81R are moved from open position POS.3 to support position POS.2; (2) sliding plate 75 is moved from position UP-2 to position DOWN-1; (3) disk D, at the playback position, is brought to the stock position; (4) sliding plate 75 is brought from position DOWN-1 to position UP-2; and (5) loading plates 81L, 81R are moved to open position POS.3. Then, at step S226, controller 300 checks to see if signal D.LOCK is "L", and if it is, M.FLAG is set to "STOCK" at step S207. Control then returns to the main routine.

If at step S226 signal D.LOCK is not "L", then controller 300 proceeds to the flowchart shown in FIG. 71. In steps S229–S225, controller 300 moves the disk, which is offset, to a position where shutter 120 is opened, and the disk is brought again to the stock position. Then, controller 300 returns to step S226 shown in FIG. 70, and signal D.LOCK is checked again. The details of the operations performed in steps S229–S225 are identical to the operations performed in steps S121–S146 described above, so the description will be omitted here.

Other Examples of Operations in Response to E/L Key Entries in the Eject Mode Referring to FIG. 69, in the flowchart described above, controller 300 checks to see if signal S.CLOSE is "L" at step S269. If signal S.CLOSE is "L", controller 300 stops the opening motion of the loading plates at step S270, and continues to wait for signal S.CLOSE to change to "H" at step S271. However, it would also be possible to have controller 300 return the loading plates to disk receiving position POS.1, move the sliding plate to position DOWN-2, and return to the main routine, thus ignoring the E/L key entry.

Figure 73:
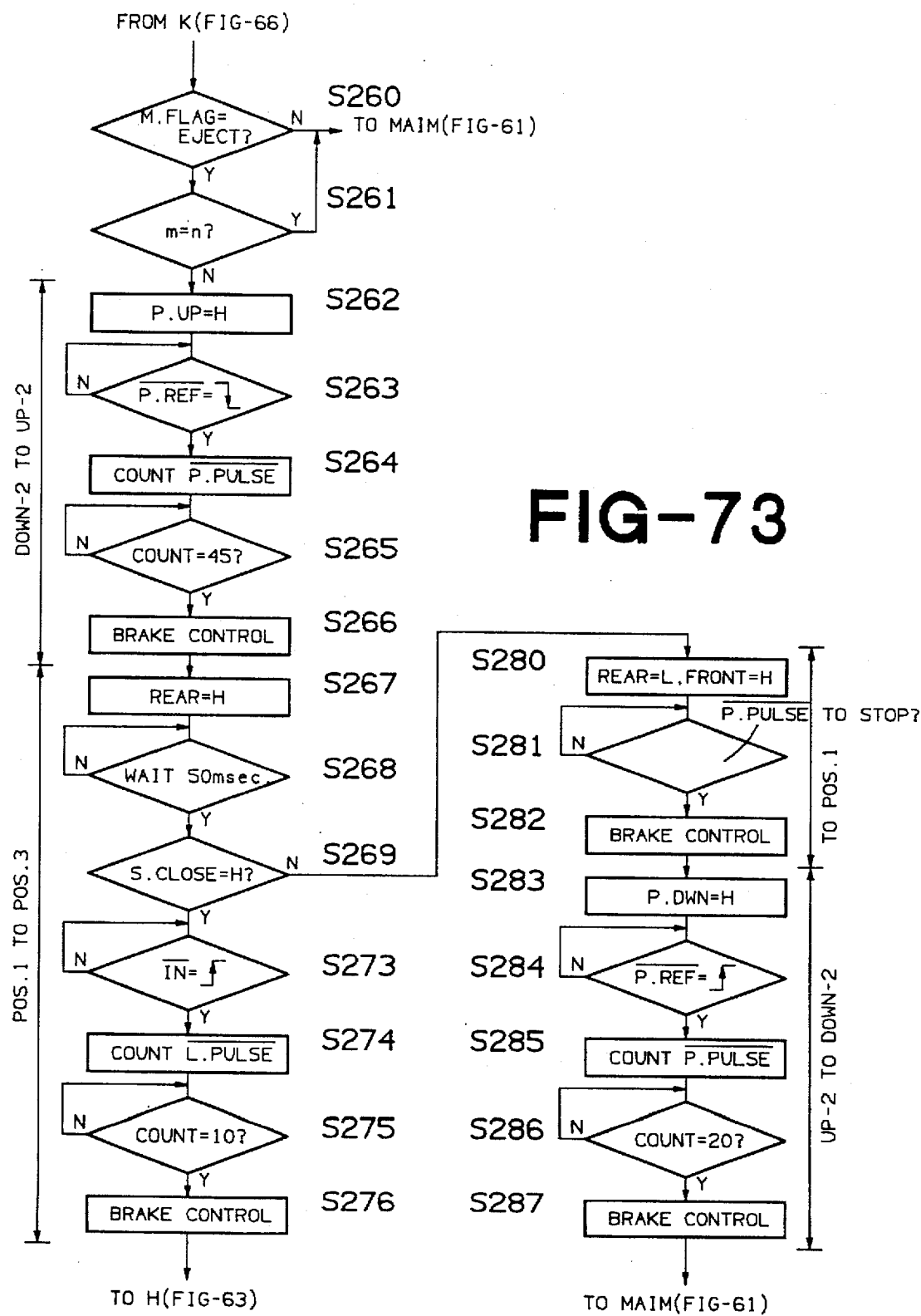
FIG. 73 is a flowchart of an alternative version of JOB EJECT.

Thus, if signal S.CLOSE is "L", controller 300 sets signal REAR to "L" and signal FRONT to "H" at step S280 so that the loading plate is closed. Controller 300 waits for signal P.PULSE to stop at step S281. When the loading plates move to receiving position POS.1 and signal P.PULSE stops, controller 300 executes steps S283–S287, which perform the same operations as steps S82–S86 described above. The sliding plate is moved from position UP-2 to position DOWN-2, and controller 300 returns to the main routine shown in FIG. 61. Steps in FIG. 73 that are identical to the steps in FIG. 63 are given the same step numbers, and their descriptions are omitted.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

For example, the preferred embodiment includes a storage magazine that moves relative to the playback and eject positions. It is noted here that alternative configurations can take advantage of the invention and these alternative fall within the compass of claims recited below. For example, the disk guides could move vertically transporting the disk to a playback position and a specified storage position without moving the stocker. Alternatively, the playback position is moved with the guides. Such an alternative configuration would be possible based on the above disclosure.

In the embodiment described above, drive-side disk guide 1002 and fixed-side disk guide 1003 are fixed to loading chassis 80 so that they can move in parallel in a direction perpendicular to the direction of disk insertion. However, it would also be possible to have the guides supported so that they can freely rotate around the rear of the device, thus allowing motion toward the disk transfer surface toward the disk insertion opening. In this case, the axis of rotation should be positioned so that the guides do not open and close when the disk is moved, excluding the cases when the disk is inserted or removed. Also, the embodiment described above connected the guides with pinion gear 85, but it would also be possible to fix one guide to the chassis and have only one be movably supported. If drive-side disk guide 1002 is fixed to the chassis, it could further simplify drive mechanism 1004, which drives timing pulley 15. In this case, moving belt 14 away from disk edge De becomes difficult, but the need for a spindle motor would be eliminated if disk rotation during playback can be performed by using belt 14 to drive the disk edge, and belt 14 would not have to be moved away from the outer disk perimeter.

Furthermore, in the embodiment described above, a disk at playback position is transferred to a position where the disk spindle hole is completely exposed outside of the device from the disk insertion opening. However, the position to which the disk is transferred does not have to result in the spindle hole being completely exposed, as long as it is possible for the user to support the disk spindle hole and the edge. Also, in the eject mode, loading plates 81L, 81R are brought to disk receiving position POS.1, but they can also be brought to an intermediate position. In this case, when the disk is removed, the two plates would move to disk receiving position POS. 1 due to the action of spring 127.

As described above, the present invention makes it possible for a disk to be transferred to a playback position without requiring the disk to be inserted deeply into the disk insertion opening. The present invention can also transfer a disk at a playback position to a position where the spindle hole of the disk is exposed from the disk insertion opening. This makes it easier to insert and remove disks. When removing a disk, the user can hold the spindle hole and edge of the disk, thus avoiding contamination of the disk recording surface.

Furthermore, in the embodiment described above, the disk transferring mechanism is configured so that the disk is transferred by belt 14, which engage with the disk edge. However, it would also be possible to transfer the disk with rollers supporting the top and bottom surfaces of the disk, as is often done in disk playback devices for automobiles. Also, it would also be possible to have a disk transferring mechanism for transferring a disk inserted from a disk insertion opening to the playback position, and a separate disk transferring mechanism for transferring a disk at the playback position to the stock position.

Also, the embodiment described above opened the loading plates and determined if a disk was present at the eject position based on the position of flap 120. However, it would also be possible to use a separate optical sensor or switch that can continuously monitor the presence of a disk at the eject position. In this case, a step would be inserted after step S261 of the flowchart in FIG. 69 that would wait for a no-disk reading at the eject position, and steps S268–S270 can be eliminated. In the flowchart in FIG. 73, a step would be inserted after step S261 to check to see if there is a no-disk reading at the eject position. If there is no disk, control proceeds to step S262, and if there is a disk, control returns to the main routine. Of course, steps S268, S269 and S280–S287 would be eliminated.

Note that in the embodiment described above, the mechanism used by the user to initiate ejection of a disk is an external switch, other possibilities are within the scope of the invention as defined by the claims. For example, the ejection command function can be conveyed by software activatable switches actuated from a host computer by mouse or keyboard. Also, although in the preferred embodiment, separate switches are used, one for each disk stored, it is clear that other possibilities exist. For example one switch could be used for scrolling through a list of holding positions and another to invoke the eject operation. Such alternatives are also within the scope of the invention.

Note that although the design of the preferred embodiment of the disk player invention includes a slot-in type of ejection position, other types of ejection positions are possible as well. For example, the disk changer may have no front plate at all and therefore no slot. Extensions of left and right side disk guides may protrude from the front of the disk player and still obtain benefits from the invention. These and other alternatives fall within the compass of the claims.

What is claimed is:

1. A disk changer, comprising:
   a chassis;
   a disk playback device attached to said chassis;
   a disk storage magazine, attached to said chassis, with multiple storage positions;
   an insertion aperture of said chassis;
   a disk transporter to transport a first disk from said multiple storage positions to said insertion aperture;
   a disk sensor, attached to said chassis in such a position that said first disk, brought to said insertion aperture by said disk transporter and remaining at said insertion aperture, is sensed by said disk sensor;
   a controller connected to said disk transporter and programmed to prevent a second disk from being transferred by said disk transporter from one of said multiple storage positions and said disk playback device to said insertion aperture when said first disk is sensed by said disk sensor.

2. A disk changer as in claim 1, wherein said controller is programmed to permit said second disk to be transferred by said disk transporter to said insertion aperture when said first disk no longer remains at said insertion aperture.

3. A disk changer as in claim 2, wherein said disk transporter comprises:
   two edge supports on said chassis, each with a surface;
   said first disk being supported between said surfaces by urging said edge supports together until their surfaces engage opposite points on an edge of said first disk.

4. A disk changer as in claim 3, wherein said disk transporter includes a belt drive with a belt having a surface that engages an edge of said first and second disks to transport said first and second disks.

5. A disk changer as in claim 1, wherein said disk transporter comprises:
   two edge supports on said chassis, each with a surface;
   said first disk being supported between said surfaces by urging said edge supports together until their surfaces engage opposite points on an edge of said first disk.

6. A disk changer as in claim 5, wherein said disk transporter includes a belt drive with a belt having a surface that engages an edge of said first and second disks to transport said first and second disks.

7. A disk transfer device, comprising:
   a chassis;
   two edge supports on said chassis, each with a surface;
   said two edge supports being aligned to support a first disk between said surfaces, said surfaces engaging opposite points on an edge of said first disk;
   said edge supports having means for moving said first disk between a first position and an eject position in which said first disk is supported between ends of said surfaces;
   said means for moving being effective to move said first disk in a first direction along said edge supports, while said first disk is supported between said surfaces, until said first disk is at said eject position;
   said means for moving being effective to continue to support said first disk at said eject position;
   a motor, drivingly connected to at least one of said surfaces;
   a disk sensor attached to said chassis and positioned to sense said first disk at said eject position; and
   a controller, connected between said disk sensor and said means for moving;

said controller being programmed to control said motor to cause said motor to transport a second disk from said first position to said eject position only after said first disk has been removed from said eject position.

8. A disk changer as in claim 7, further comprising:

a front housing element having an aperture;

said first disk extending at least partly through said aperture when said first disk is in said eject position.

9. A disk changer as in claim 8, wherein said edge supports are movably attached to said chassis and urged together to engage said edge of said first disk.

10. A disk changer as in claim 7, wherein said edge supports are movably attached to said chassis and urged together to engage said edge of said first disk.

11. A disk changer as in claim 7, further comprising:

a front housing element having an aperture;

said first disk extending at least partly through said aperture when said first disk is in said eject position; and said disk sensor including a gate that selectively blocks said aperture to prevent insertion of another disk.

12. A disk changer, comprising:

a chassis having an internal position and an eject position;

at least one support on said chassis for supporting a first disk at said eject position and a second disk at said internal position;

a disk transporter with a controller;

a disk sensor, connected to said controller, positioned on said chassis to allow said first disk's presence at said eject position to be sensed by said disk sensor; and a user-actuatable eject actuator connected to said controller;

said controller being programmed to cause said disk transporter to transport said second disk from said internal position to said eject position when said eject actuator is actuated by a user; and said controller being further programmed to prevent said second disk from being transported by said disk transporter from said internal position to said eject position when said eject actuator is actuated by said user and a presence of said first disk at said eject position is sensed by said disk sensor.

13. A disk changer as in claim 12, wherein said controller is further programmed to allow said second disk to be transported by said disk transporter from said internal position to said eject position after said eject actuator is actuated by said user, a presence of said first disk is sensed at said eject position and, subsequently, and a removal of said first disk, from said eject position, is sensed by said disk sensor.

14. A disk changer as in claim 12, wherein:

said controller is further programmed to execute a main routine in which said eject actuator's state is monitored;

said controller is further programmed to branch to a response subprogram that activates said disk transporter when said eject actuator is actuated by said user;

said controller is still further programmed to return to said main routine when said eject actuator is actuated by said user and a presence of said first disk at said eject position is sensed by said disk sensor, whereby said actuation of said eject actuator is ignored.

* * * * *